US009206948B1

(12) United States Patent
Scribante et al.

(10) Patent No.: US 9,206,948 B1
(45) Date of Patent: Dec. 8, 2015

(54) TROFFER LIGHT FIXTURE RETROFIT SYSTEMS AND METHODS

(71) Applicant: Orion Energy Systems, Inc., Manitowoc, WI (US)

(72) Inventors: John Scribante, Manitowoc, WI (US); Matthew S. Tlachac, Manitowoc, WI (US); Scott A. Green, Ponte Vedra Beach, FL (US); Brandon J. King, Manitowoc, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 0 days.

(21) Appl. No.: 14/447,329

(22) Filed: Jul. 30, 2014

(51) Int. Cl.
*F21V 21/04* (2006.01)
*F21K 99/00* (2010.01)
*F21V 21/03* (2006.01)
*F21Y 103/00* (2006.01)

(52) U.S. Cl.
CPC ... *F21K 9/17* (2013.01); *F21K 9/50* (2013.01); *F21V 21/03* (2013.01); *F21Y 2103/003* (2013.01)

(58) Field of Classification Search
CPC ............. F21S 8/026; F21S 8/04; F21S 8/043; F21V 5/007
See application file for complete search history.

(56) References Cited

U.S. PATENT DOCUMENTS

| | | |
|---|---|---|
| 3,019,333 A | 1/1962 | Pascucci |
| 3,078,366 A | 2/1963 | Winkler |
| 4,041,657 A | 8/1977 | Schuplin |
| 5,997,158 A | 12/1999 | Fischer et al. |
| 6,059,424 A | 5/2000 | Kotloff |
| 6,231,213 B1 | 5/2001 | Schmidt et al. |
| 6,739,734 B1 | 5/2004 | Hulgan |
| 6,871,983 B2 | 3/2005 | Jacob et al. |
| 7,758,207 B1 | 7/2010 | Zhou et al. |
| 7,845,824 B2 | 12/2010 | Robotham |
| 8,066,407 B2 | 11/2011 | Remus et al. |
| 8,083,369 B1 | 12/2011 | Richardson et al. |
| 8,092,044 B1 | 1/2012 | Sikora |
| 8,272,763 B1 | 9/2012 | Chinnam et al. |
| 2007/0047238 A1 | 3/2007 | Vukosic et al. |
| 2008/0266843 A1 | 10/2008 | Villard |
| 2009/0290348 A1 | 11/2009 | Van Laanen et al. |
| 2010/0091484 A1 | 4/2010 | Mayfield et al. |
| 2012/0051041 A1 | 3/2012 | Edmond et al. |
| 2012/0176784 A1 | 7/2012 | Peifer et al. |
| 2013/0148354 A1* | 6/2013 | McGehee et al. ........ 362/249.02 |
| 2013/0235568 A1 | 9/2013 | Green et al. |

OTHER PUBLICATIONS

International Search Report and Written Opinion for International Application No. PCT/US2013/029301, dated May 20, 2013, 8 pages.
International Search Report and Written Opinion for International Application No. PCT/US14/57012, dated Dec. 16, 2014, 10 pages.

* cited by examiner

*Primary Examiner* — Ismael Negron
*Assistant Examiner* — Leah S Macchiarolo
(74) *Attorney, Agent, or Firm* — Foley & Lardner LLP

(57) ABSTRACT

A retrofitting kit for retrofitting an existing troffer light fixture having a troffer housing. The kit includes an adaptor bracket and a door assembly. The adaptor bracket includes a channel configured to rest on a T-bar of a ceiling system between the T-bar and the troffer housing, a slot configured to receive a portion of a troffer door assembly, and a latch surface configured to engage with a latch. The door assembly includes a latch configured to engage the latch surface of the adaptor bracket, a hinge configured to interface with the slot of the adaptor bracket, a housing including the latch and the hinge, and a light source within the housing.

20 Claims, 46 Drawing Sheets

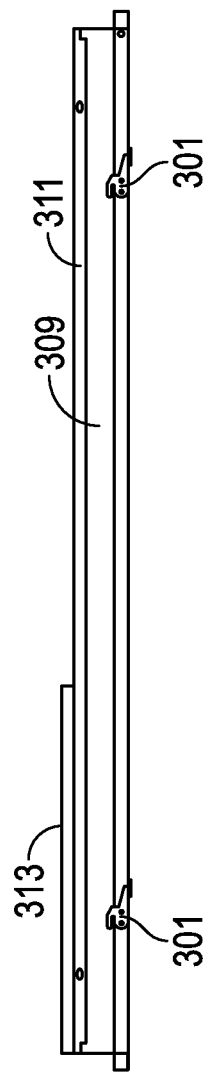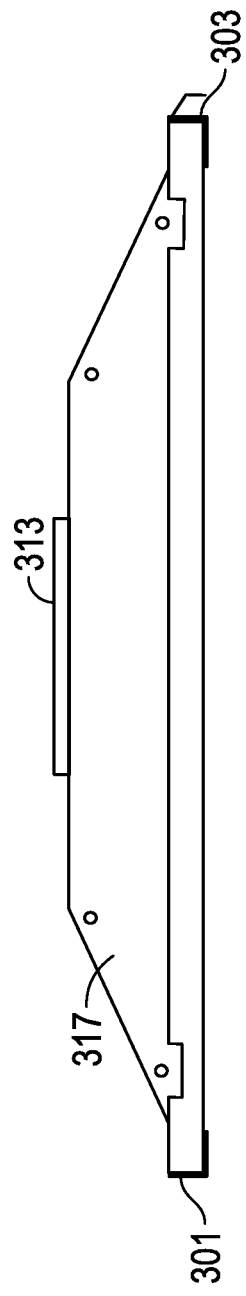
FIG. 3C
FIG. 3D

TROFFER LIGHT FIXTURE RETROFIT SYSTEMS AND METHODS

BACKGROUND

The invention relates generally to a system and method for retrofitting an existing troffer style light fixture. Existing troffer light fixtures can be retrofitted to include a more efficient light source, replace components of a damaged troffer style light fixture, and/or otherwise upgrade or replace an existing troffer light fixture.

A troffer light fixture is a generally square or rectangular tray like housing and light source which is installed in a ceiling system. The ceiling system may be a dropped ceiling, ceiling grid and tile system, or other engineered ceiling system. The troffer light fixture includes a housing which includes a top body wall and four side body walls. Mounted to the troffer housing are typically lamp sockets (e.g., for fluorescent lamps), lighting ballast which receives electrical power from wiring within the ceiling, and/or other components. The troffer light fixture may further include a door which attaches to the troffer housing. The door may be or include a lens and typically opens downward from the troffer housing. It is challenging and difficult to develop a system which allows for quick and easy retrofitting of an existing troffer light fixture. It is also challenging and difficult to develop a system which retrofits an existing troffer light fixture and reuses the existing troffer housing. Further, it is challenging and difficult to develop a system which is compatible with a variety of troffer light fixtures.

SUMMARY

One embodiment relates to a retrofitting kit for retrofitting an existing troffer light fixture having a troffer housing. The kit includes an adaptor bracket which includes a channel configured to rest on a T-bar of a ceiling system. The channel is also configured to be located between the T-bar and the troffer housing. The adaptor bracket further includes a slot configured to receive a portion of a troffer door assembly and a latch surface configured to engage with a latch. Additionally, the kit includes a door assembly which having a latch configured to engage the latch surface of the adaptor bracket and a hinge configured to interface with the slot of the adaptor bracket. The latch and the hinge are included in a housing of the door assembly, and the door assembly also includes a light source within the housing.

Another embodiment relates to an adaptor bracket for retrofitting an existing troffer light fixture. The adaptor bracket can include a channel configured to rest on a T-bar of a ceiling system. the channel can also be located between the T-bar and a troffer housing of the existing troffer light fixture. The adaptor bracket further includes a slot configured to receive a portion of a troffer door assembly and a latch surface configured to engage with a latch of the troffer door assembly.

Another embodiment relates to a door assembly for retrofitting an existing troffer light fixture. The door assembly can include a housing, a latch coupled to the housing, a hinge coupled to the housing, a light source within the housing, and a lens.

Another embodiment relates to a method for retrofitting an existing troffer light fixture having a troffer housing using a door assembly. The method includes removing a door of the existing troffer light fixture, hanging the door assembly, wiring the door assembly to a power source previously used by an existing troffer light fixture, closing the door assembly, and latching the door assembly.

BRIEF DESCRIPTION OF THE DRAWINGS

FIG. 3C is an illustration of a side view of a troffer door assembly according to an exemplary embodiment.

FIG. 3D is an illustration of an end view of a troffer door assembly according to an exemplary embodiment.

DETAILED DESCRIPTION

Figure 1:
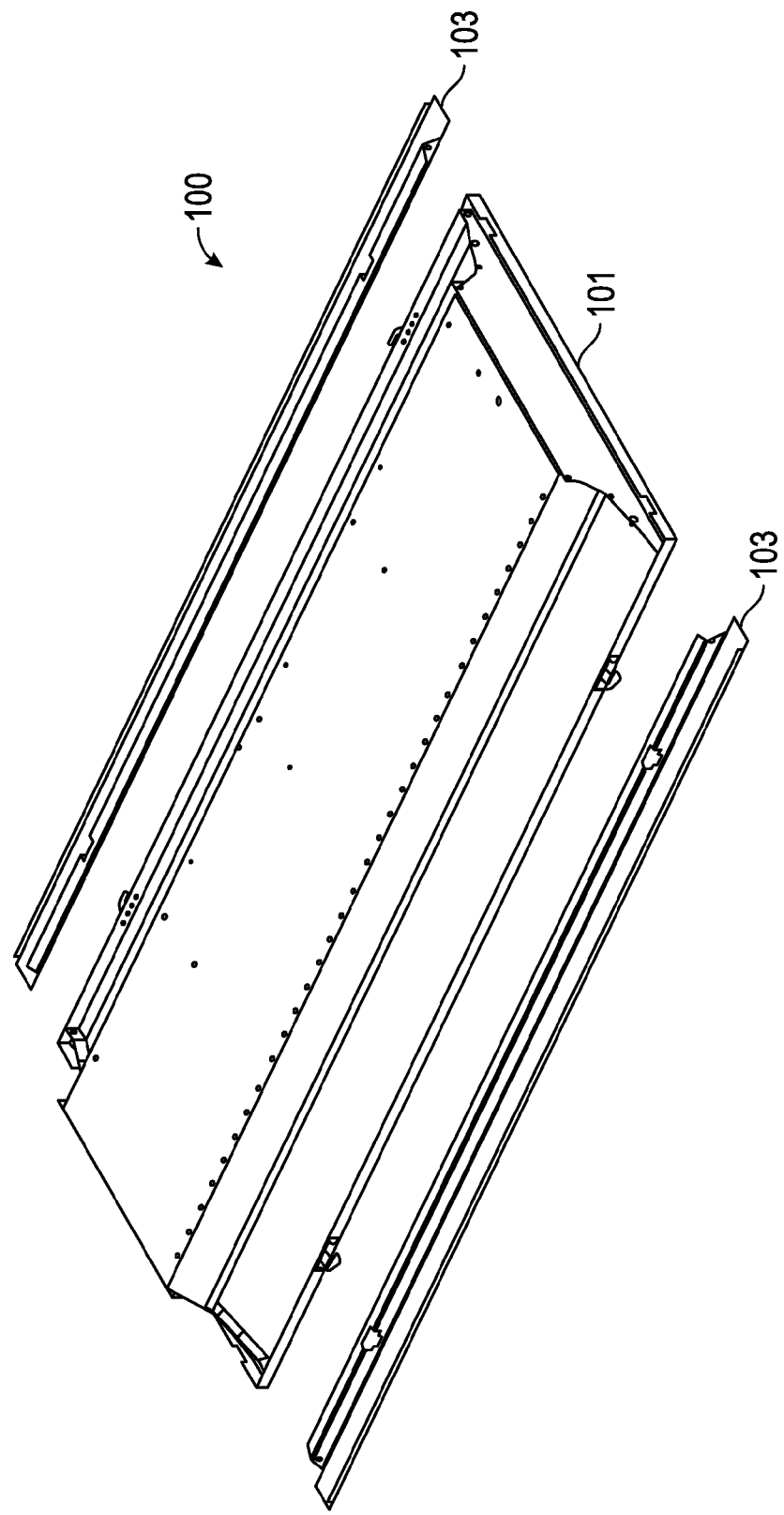
FIG. 1 is an illustration of a troffer retrofit system including a troffer door assembly and two adaptor brackets according to an exemplary embodiment.

In the following detailed description, reference is made to the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring now to FIG. 1, troffer door retrofit system 100 is shown according to one embodiment. Troffer door retrofit system 100 includes door assembly 101 and two adaptor brackets 103. Troffer door retrofit system 100 can be used to upgrade, retrofit, replace, and/or install a lighting fixture in an existing troffer housing. Adaptor brackets 103 may held into place in a ceiling system (e.g., a dropped ceiling) using a T-bar of the ceiling system and an existing troffer housing (e.g., the housing of an existing troffer light fixture which is being retrofit). Door assembly 101 can then be hung using hinges and/or latches from slots included in adaptor brackets 103 and wired to an existing wiring system (e.g., the wiring system which was supplying the existing troffer light fixture).

In alternative embodiments, troffer door retrofit system 100 includes only door assembly 101. Door assembly 101 can include hinges and/or latches which are positioned such that door assembly 101 can be hung from an existing troffer housing. For example, an existing troffer light fixture may include a door hung from slots included in the housing of the existing troffer light fixture. The door may be removed, and door assembly 101 of troffer door retrofit assembly 101 may be hung from the slots in the housing of the existing troffer light fixture. Internal components (e.g., lamps and ballast) of the existing troffer light fixture may be removed first to make room for door assembly 101 when in the closed position.

In further embodiments, troffer door retrofit system includes door assembly 101 and adaptor brackets 103, but adaptor brackets 103 may be optionally used when retrofitting an existing troffer light fixture. For example, the hinges and latches of door assembly 101 may be positioned such that door assembly 101 is compatible with a wide range of and/or a common existing troffer light fixture and its housing. The door of the existing troffer light fixture may be removed and replaced with door assembly 101 (e.g., without the use of adaptor brackets 103). If door assembly 101 is not compatible with an existing troffer housing (e.g., the hinges and or latches do not align with slots in the existing troffer housing), adaptor brackets 103 may be used. This adaptability may advantageously increase the number of existing troffer light fixture types (e.g., different configurations and/or different manufacturers) with which troffer door retrofit system 100 is compatible. Thus, troffer door retrofit system 100 may be packaged or sold with both door assembly 101 and adaptor brackets 103 to increase the number of existing troffer light fixtures which can be retrofit as described herein. In alternative embodiments, door assembly 101 and/or adaptor brackets 103 may be packaged or sold individually.

In some further embodiments, door assembly 101 includes hinges and/or latches which may be repositioned on door assembly 101. For example, the hinges and/or latches may be secured in a slot which allows longitudinal movement, and the hinges and/or latches may be secured in the desirable position by engaging a fastener (e.g., tightening a nut and bolt combination). Advantageously, this may increase the number of existing troffer light fixtures with which troffer door retrofit system 100 is compatible (e.g., door assembly 101 may be compatible with a larger range of slot configurations in existing troffer housings).

Still referring to FIG. 1, door assembly 101 can include one or more lamps which may be more efficient than the lamps in an existing troffer light fixture. For example, door assembly 101 may include light emitting diodes (LEDs) which are more efficient than the lamps of the existing troffer light fixture. The existing troffer light fixture may include lamps of other types such as florescent lamps, incandescent lamps, halogen lamps, and/or less efficient LEDs. Advantageously, troffer door retrofit system 100 may be used to replace the existing troffer light fixture (e.g., in part while retaining the existing housing, wiring, and/or other components) and its less efficient lamps with the more efficient lamps included in door assembly 101. Door assembly 101 may be wired to existing supplies, ballasts, and/or other power systems or electronics (e.g., controllers, automation systems, sensors, etc.) of the existing troffer light fixture. Thus, an existing troffer light fixture may be retrofit using troffer door retrofit system 100 such that the resulting troffer light fixture is more efficient, uses less electricity, gives of less heat, and/or includes other benefits. This may reduce the operating costs of a lighting system including one or more troffer light fixtures (e.g., a lighting system in an office building, warehouse, or home, an outdoor lighting system, and/or any lighting system including troffer light fixtures). While LED is specifically used in many of the examples described, other types of lamps or light sources (e.g., fluorescent lamps, halogen lamps, incandescent lamps, organic LEDs, incandescent lamps, discharge lamps, liquid crystal displays, plasma displays, and/or other light sources) may be used in varying embodiments.

Troffer door retrofit system 100 and door assembly 101 may include the same style lamps as an existing troffer light fixture or otherwise be approximately equivalent in parameters such as efficiency, cost to operate, lifespan, operating costs including maintenance, and/or other parameters. However, troffer door assembly 101 may include ballast, a controller, sensors, communication equipment, and/or other electronic components which are superior to those of an existing troffer light fixture or not included in an existing troffer light fixture. Retrofitting an existing troffer light fixture using troffer door retrofit system 100 may therefore provide an upgrade in electronics associated with a lighting system, sensors associated with a lighting system, control of a lighting system, automation of a lighting system, and/or otherwise upgrade a lighting system other than increasing the efficiency of the system by replacing the type of lamp used.

As an additional example, troffer door retrofit system 100 may provide a further advantage by allowing for easy replacement or repair of existing troffer light fixtures. For example, an existing troffer light fixture may break or otherwise need maintenance or repair (e.g., one or more lamps have burnt out or need replacing, ballast has been damaged or stops functioning properly, and/or other components require maintenance or repair). Troffer door retrofit system 100 may be used to replace components rather than repair them. Advantageously, this may be more cost effective than repairing the component (e.g., including or not including the long term energy savings of switching to a more efficient lamp) and may be more cost effective than replacing the entire existing troffer light fixture with one of the same type (e.g., troffer door retrofit system 100 may be comparable on cost and it may be quicker to install troffer door retrofit system 100 thereby reducing labor costs).

Figure 2A:
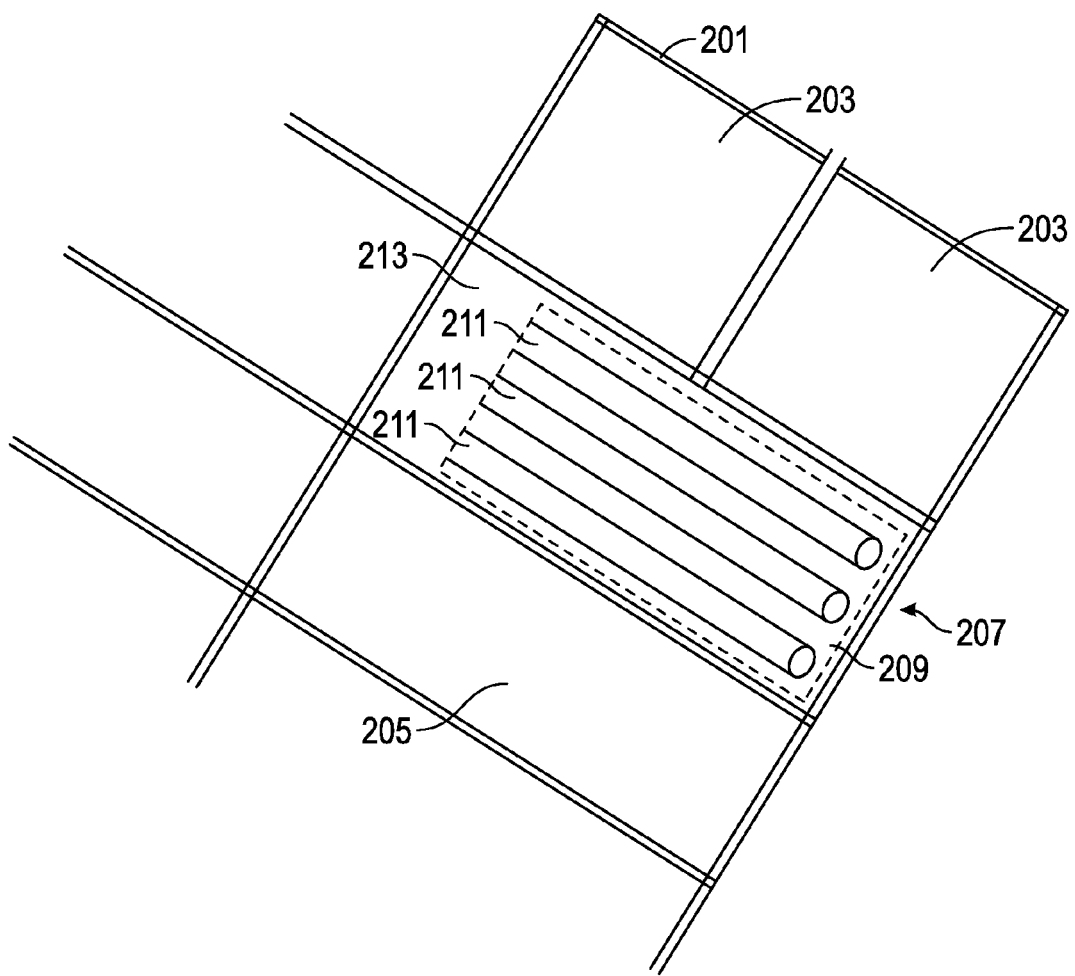
FIG. 2A is an illustration of an existing troffer light fixture in a dropped ceiling according to an exemplary embodiment.

Referring now to FIG. 2A an existing ceiling system and existing troffer light fixture are illustrated according to one embodiment. The ceiling system may be a dropped ceiling including one or more T-bars 201, 2=2 ceiling tiles 203, 2×4 ceiling tiles 205, and/or other components. The ceiling system may include one or more existing troffer light fixtures 207. As described herein, existing troffer light fixture 207 can be retrofit using troffer door retrofit system 100.

Existing troffer light fixture 207 can include components such as lens 213, troffer housing 209, lamps 211, ballast, supply wires, and/or other components.

As described in greater detail with reference to FIG. 2B, troffer housing 209 can contain, secure, and/or support the other components of existing troffer light fixture 207. Troffer housing 209 can be secured by T-bar 201 of the ceiling system. For example, troffer housing 209 may rest on T-bar 201. Troffer housing 209 may also be or include a reflector for directing light emitted from one or more lamps down from the ceiling system.

The ceiling system may include a plurality of T-bars 201 which form a ceiling grid. The ceiling grid typically has dimensions such that ceiling tiles 2' by 2' (e.g., 2×2 ceiling tile 203) and/or ceiling tiles 2' by 4' (2×4 ceiling tile 205) are supported by the T-bars 201. Existing troffer light fixture 207 is sized to be supported in one of a 2×2 grid location or 2×4 grid location. In further embodiments, the ceiling system may have other dimensions. The dimensions of other devices, systems, and components described herein may be adjusted to be compatible with the other dimensions.

Typically, troffer housing 209 of existing troffer light fixture 207 includes a plurality of slots which allow a panel or door to attach to troffer housing 209. The panel or door may open and close (e.g., using latches and hinges) to allow access to other components of existing troffer light fixture 207. For example, the panel or door may be opened to change one or more lamps 211 of existing troffer light fixture 207. The panel or door may be or include a lens 213 or louver. The panel or door may also be removable from troffer housing 209 (e.g., unlatched and the hinges removed from the slots included in troffer housing 209). As described herein, the panel or door of existing troffer light fixture 207 may be removed and door assembly 101 of troffer door retrofit system 100 may be installed using the slots included in the troffer housing 209 of the existing troffer light fixture 207.

In some embodiments, existing troffer light fixture 207 may not include slots for a panel or door or may include slots which are not compatible with door assembly 101 of troffer door retrofit system 100. Adaptor brackets 103 may be used in conjunction with troffer housing 209 in such cases.

Existing troffer light fixture 207 may be sized to be compatible with differently sized ceiling systems. For example, troffer housing 209 may be sized the same or approximately the same as 2×2 ceiling tile 203 or 2×4 ceiling tile 205. Existing troffer light fixture 207 may therefore be secured by T-bar 201 of the ceiling system in any location sized for a corresponding ceiling tile. Advantageously, door assembly 101 and/or adaptor brackets 103 of troffer door retrofit system 100 may be sized either for a 2×2 ceiling system location, a 2×4 ceiling system location, or other sized systems.

With continued reference to FIG. 2A, in some cases, lamps 211 may be florescent lamps. Florescent lamps are commonly used in troffer light fixtures (e.g., existing troffer light fixture 207). For example, existing troffer light fixtures 207 often include florescent lamps when used in such applications as industrial lighting, office space lighting, and/or other commercial or residential use with engineered ceilings (e.g., dropped ceilings). Door assembly 101 of troffer door retrofit system 100 includes LEDs in some embodiments. In such embodiments, door assembly 101 as installed as part of troffer door retrofit system 100 has several advantages over existing troffer light fixture 207 having florescent lamps 211. For example, door assembly 101 may reduce energy consumption by up to 70% or more in comparison to existing troffer light fixtures 207 having florescent lamps. Door assembly 101 and the LEDs included therein can have a longer life than florescent lamps. Therefore, maintenance related to the replacement of lamps is reduced thereby reducing maintenance costs and freeing up maintenance man hours for other tasks. LEDs of door assembly 101 also generate less heat than florescent lights thereby reducing the load on heating ventilation and air conditioning systems and reducing costs. Additionally, LEDs included in door assembly 101 include fewer hazardous waste materials than florescent lamps. As such, the LEDs of door assembly 101 are easier to recycle at the end of their life cycle than florescent lamps. Continuing the examples, the LEDs in door assembly 101 can provide a volumetric, even distribution of light with higher quality color rendering. The color temperature of LEDs may also be easily customizable and/or changed (e.g., controlled with a controller or selected during manufacture). Therefore, the light produced by door assembly 101 including LEDs may be of superior quality in comparison to light produced by florescent lamps included in existing troffer light fixture 207.

Figure 2B:
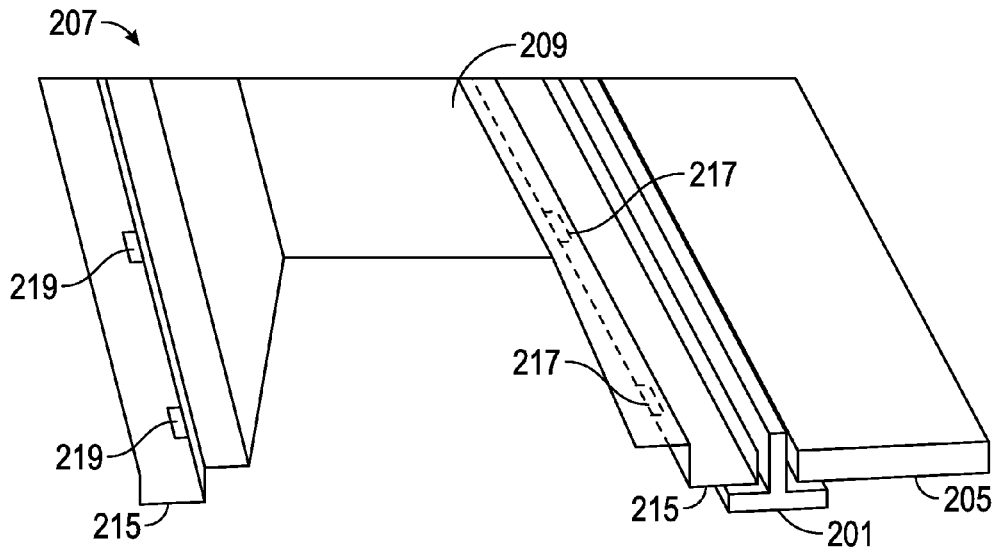
FIG. 2B is an illustration of an existing troffer housing of an existing troffer light fixture in dropped ceiling system according to an exemplary embodiment.

Referring now to FIG. 2B, a troffer housing 209 of existing troffer light fixture 207 is illustrated in relation to T-bar 201 of a ceiling system according to one embodiment. Troffer housing 209 rests on T-bar 201 of the ceiling. T-bar 201 includes a horizontal portion on which troffer housing 209 rests. Two or four sides of troffer housing 209 rest on T-bars 201; one T-bar 201 corresponding to each side of troffer housing 209. The horizontal portion of each T-bar 201 and the spacing of each T-bar 201 in the ceiling grid prevents troffer housing 209 from falling through the ceiling system. Troffer housing 209 may be prevented from shifting relative to the opening between T-bars 201 by the vertical portion of T-bar 201. This may prevent lateral movement of troffer housing 209. T-bars 201 are also configured to support ceiling tiles (e.g., 2×4 ceiling tile 205) using the same principles. T-bars 201 may be suspended or supported from a structural ceiling (e.g., as in a dropped ceiling).

Troffer housing 209 can be supported by T-bars 201 using flanges 215. Flanges 215 may have a variety of configurations. In one embodiment, flanges 215 include a first vertical portion extending downward from troffer housing 209, a horizontal portion which rests on T-bar 201, and an additional vertical portion (e.g., for preventing lateral movement of troffer housing 209 in conjunction with the vertical portion of T-bar 201). In further embodiments, flanges 215 may have other configurations. For example, flanges 215 may meet T-bar 201 at an angle (e.g., 45 degrees), flanges 215 may not include a second or additional vertical portion, etc.

As described later in more detail, adaptor brackets 103 of troffer door retrofit system 100 are configured to be held in place against T-bar 201 in some embodiments. Adaptor brackets 103 may be inserted between the horizontal portion of flange 215 and the horizontal portion of T-bar 201. Adaptor brackets 103 may be prevented from moving laterally by engaging a portion of flange 215 such as the additional vertical portion. As a result, a portion of adaptor bracket 103 may be located between the end of flange 215 (e.g., an end formed by the additional vertical portion) and the vertical portion of T-bar 201. Adaptor brackets 103 can be further configured to extend horizontally so as to avoid interference with the remainder portion of flange 215 and/or other portions of troffer housing 209.

In alternative embodiments, troffer housing 209 may be supported on T-bar 201 using the top of the vertical portion of T-bar 201 and a support mechanism attached to troffer housing 209. Troffer housing 209 may include a portion which extends at least to the horizontal portion of T-bar 201 and may overlap with T-bar 201. This may give the appearance that existing troffer light fixture 207 is flush or nearly flush with the ceiling system. In such embodiments, adaptor bracket 103 may be held in place using a combination of T-bar 201 and the above described portion of troffer housing 209 which extends near to or overlapping with the horizontal portion of T-bar 201.

From flange 215, troffer housing 209 may extend vertically and/or horizontally to a top portion. The top portion may continue until the flange and upward extension is mirrored to meet a second T-bar 201. For example and as illustrated in FIG. 2B, troffer housing 209 may have a generally trapezoidal profile with an internal space for the components of existing troffer light fixture 207 such as florescent lamps, lamp holders, and ballast. The side and/or top portions of troffer housing 209 may be or be coated with a reflective material. The reflective material may have been used to redirect light from lamps 211 downward from the ceiling and/or laterally from the fixture. In some embodiments, the light source included in door assembly 101 of troffer door retrofit system 100 is positioned so as to use the troffer housing 209 to reflect emitted light downward and/or laterally from the ceiling.

The geometry of door assembly 101 of troffer door retrofit system 100 may be configured such that a portion of door assemble 101 is contained within troffer housing 209. For example, door assembly 101 may have the same or similar profile as compared to the panel or door of existing troffer light fixture 207 when the door assembly 101 is installed and viewed from below.

Troffer housing 209 may also include slots for use with a panel or door as previously described. Troffer housing can include one or more hinge slots 217. Hinge slots 217 are configured to accept a hinge portion (e.g., an extended flange) of the panel or door. For example, hinge slots 217 may include a first opening and a second smaller opening connected to the first opening. The hinge portion of the panel or door may be shaped so as to fit through the first opening, move down, and be prevented from exiting the hinge slot by the second smaller opening which is smaller than the hinge portion of panel or door. The panel or door can then be removed from troffer housing 209 by lifting the panel or door and removing the hinge portion from larger portion of hinge slot 217 (e.g., the first opening). Hinge slot 217 can be located on flange 215.

In some embodiments, two hinge slots 217 are included in troffer housing 209. Door assembly 101 of troffer door retrofit system 100 can include two hinges (e.g., extended flanges) such that door assembly 101 can be hung from hinge slots 217. In other embodiments, troffer housing 209 may include a different number of hinge slots 217. For example, one or three hinge slots 217 may be included. Continuing the example, troffer housing 209 may include no hinge slots 217. In such cases, door assembly 101 may include a corresponding number of hinges, or adaptor brackets 103 may be used to hang door assembly 101.

Troffer housing 209 can also include one or more latch slots 219. Latch slot 219 may be an opening in troffer housing 209 (e.g., an opening in flange 215). Latch slot 219 allows a hook portion of a latch on the panel or door to extend through troffer housing 209 and hook onto or otherwise interface with a portion of troffer housing 209. For example, a hook portion of a latch may extend through latch slot 219 from below and rotate vertically to rest on or engage a horizontal portion of troffer housing 209 (e.g., flanges 215).

In some embodiments, two latch slots 219 are included in troffer housing 209. Door assembly 101 of troffer door retrofit system 100 can include two latches (e.g., rotatable latches with a grip and hook portion) such that door assembly 101 can be latched to hinge slots 217. In other embodiments, troffer housing 209 may include a different number of latch slots 219. For example, one or three latch slots 219 may be included. Continuing the example, troffer housing 209 may include no latch slots 219. In such cases, door assembly 101 may include a corresponding number of latches, or adaptor brackets 103 may be used to hang door assembly 101.

Referring now to FIGS. 3A-3E, door assembly 101 is illustrated according to one embodiment. As previously described, door assembly 101 of troffer door retrofit system 100 is hung using troffer housing 209 and/or adaptor brackets 103. The lamps within door assembly 101 can be wired to the supply for an existing troffer light fixture 207. One or more components of existing troffer light fixture 207 can be removed, and door assembly 101 can be closed and latched. As a result, existing troffer light fixture 207 is retrofitted (e.g., to include LED lamps rather than existing florescent lamps).

Figure 3A:
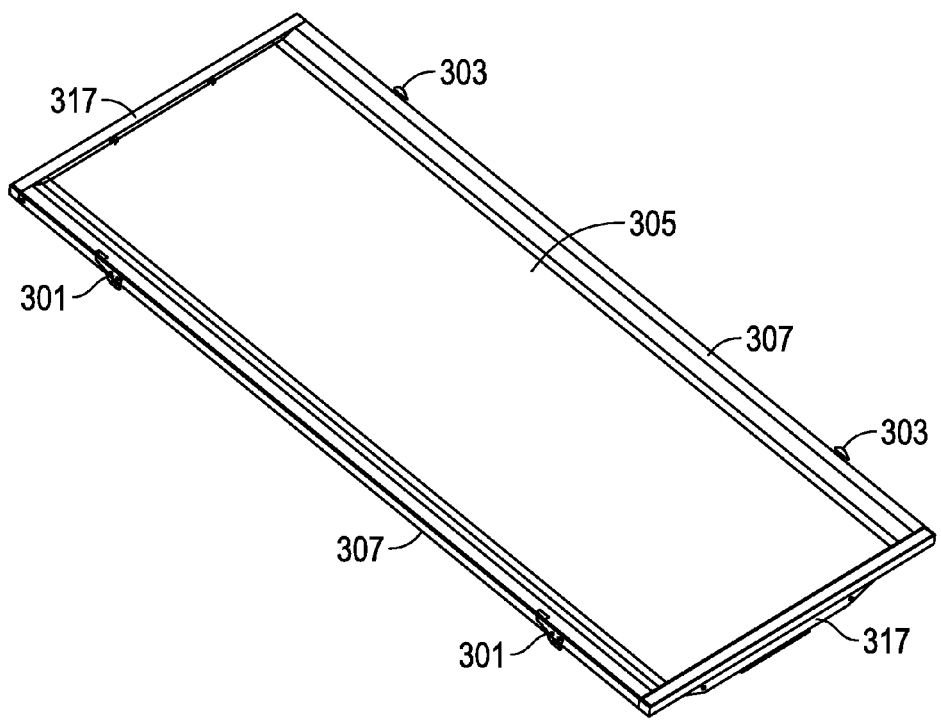
FIG. 3A is an illustration of a troffer door assembly according to an exemplary embodiment.

Referring now to FIG. 3A. door assembly 101 includes a housing which may include a plurality of components such as lower side frames 307, frame ends 317, hinges 303, latches 301, and a lens 305. Multiple components may be attached together such that door assembly 101 does not require assembly when purchased by a consumer. In other words, door assembly 101 may be manufactured using a plurality of components which are permanently or semi-permanently assembled to create door assembly 101.

The frame components may be assembled or joined such that the frame provides structural support to door assembly 101. The frame may further provide one or more mounting points or surfaces for additional components of door assembly 101. Lower side frame 307 can be joined or attached to frame ends 317. This may form a square or rectangular frame on which other components are attached or joined. Latches 301 are attached or joined to lower side frame 307. Hinges 303 are attached or joined to the opposite lower side frame 307.

In some embodiments, door assembly 101 includes lens 305. Lens 305 can be transparent or translucent such that light emitted from a light source in door assembly 101 exits lens 305 to an area below door assembly 101. Lens 305 may enhance the performance of the retrofitted troffer light fixture. For example, lens 305 may be used to diffuse light, focus light, form one or more beams, filter light, and/or otherwise alter or manipulate light emitted from a light source included in door assembly 101. Alternatively, lens 305 may not substantially alter the light exiting lens 305. In further embodiments, lens 305 protects one or more components within door assembly 101. For example, lens 305 may limit access to LEDs included in door assembly 101.

Lens 305 can be supported by and/or attached to lower side frames 307 of door assembly 101. In some embodiments, lens 305 is removable from door assembly 101. This may allow access to one or more other components of door assembly 101. For example, removing lens 305 may provide access to lamps, supply wiring, electronics, controllers, and/or other components. This allows for replacement or repair of components (e.g., replacing lamps). In some embodiments, lens 305 may rest on a portion of lower side frames 307 and/or frame ends 317. Lens 305 may be made of a deformable material (e.g., is plastically deformable) such that lens 305 may be deformed and removed from the frame of door assembly 101. Lower side frames 307 and/or frame ends 317 may include a track or channel which lens 305 is inserted into. This may secure lens 305. In alternative embodiments, lens 305 may be mounded on one or more hinges and/or include one or more latches or other features which non-permanently secure lens 305 in the frame of door assembly 101. This may allow lens 305 to be opened and provide access to internal components of door assembly 101.

Lens 305 may be made of a transparent or translucent material. In some embodiments, lens 305 is made of glass or another ceramic material. In other embodiments, lens 305 is made of acrylic or polycarbonate. Alternatively, lens 305 may be made of other polymers or plastics. In alternative embodiments, lens 305 may be a louver. In further alternative embodiments, door assembly 101 does not include a lens 305.

Figure 3B:
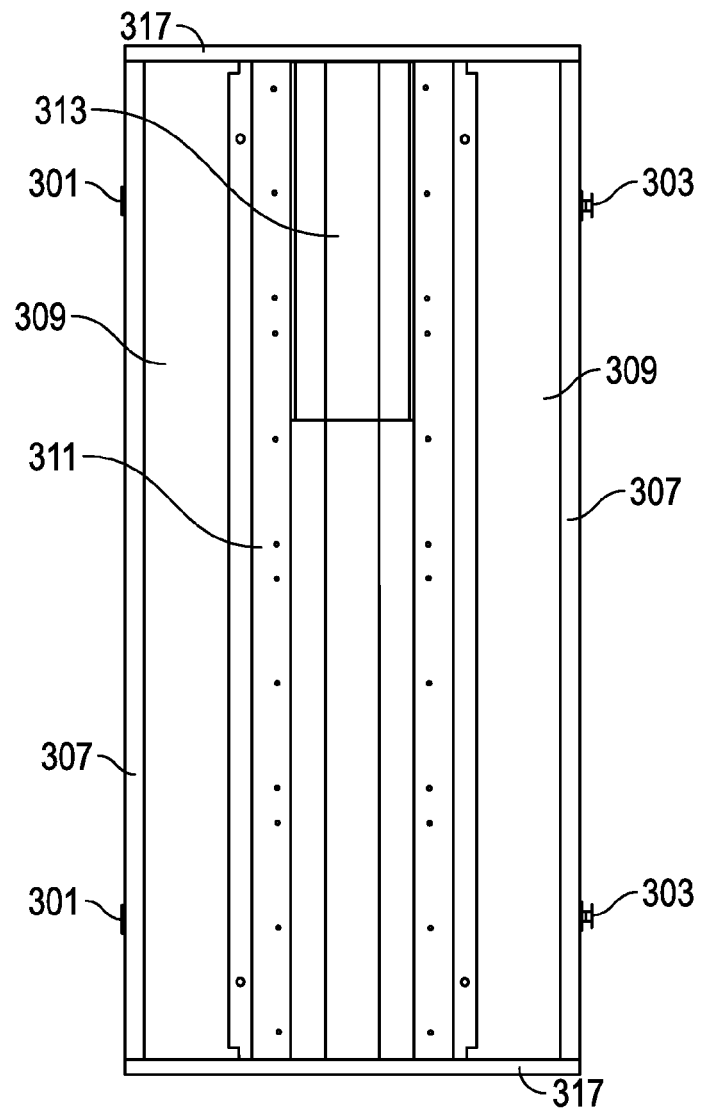
FIG. 3B is an illustration of a top view of a troffer door assembly according to an exemplary embodiment.

Referring now to FIG. 3B, a top view of door assembly 101 is illustrated according to one embodiment. Door assembly 101 may include additional components such as upper side frame 309, top portion 311, and cover 313. Upper side frames 309 may form the top of the housing of door assembly 101. As illustrated in FIG. 3D (end view), door assembly 101 may have a trapezoidal shape. Frame ends 317 form the trapezoidal ends of door assembly 101, lower side frames 307 and lens 305 form the bottom, and upper side frames 309 form the angled top portion. Referring again to FIG. 3B, upper side frames 309 are attached or joined to lower side frames 307. Upper side frames 309 may also be attached to or joined to frame ends 317. Upper frame ends 309 are further attached to top portion 311. Top portion 311 forms the top of the trapezoidal housing of door assembly 101. Located on top of top portion 311 is cover 313. Cover 313 can cover electronic components (e.g., controllers, ballast, connections to supply wires, and/or other electronics) mounted on top portion 311 or otherwise contained within the space formed by cover 313 and top portion 311.

In some embodiments, upper side frame 309 and/or top portion 311 are configured to reflect light from within door assembly 101 out through lens 305. For example, one or more of upper side frame 309 and/or top portion 311 may be coated with a reflective material on side facing lens 305. Alternatively, one or more of upper side frame 309 and/or top portion 311 may be constructed of a reflective material (e.g., a metal). In still further embodiments, door assembly 101 uses troffer housing 209 of existing troffer light fixture 207 as a reflector. For example, door assembly 101 may not include upper side frames 309, may not include upper portion 311, or side frame 309 and/or top portion 311 may include an opening to troffer housing 209 of existing troffer light fixture 207.

Referring now to FIG. 3C, a side view of door assembly 100 is illustrated according to one embodiment. Upper side frame 309 may attach to lower side frame 307 and upper portion 311. Upper side frame 309 may be angled so as to give door assembly 101 a trapezoidal shape. Advantageously, this may allow door assembly 101 to fit within troffer housing 209 of existing troffer light fixture 207. As typical troffer light fixtures have a trapezoidal housing, door assembly 101 may be compatible with a wide range of existing troffer light fixtures 207 given its shape. In alternative embodiments, door assembly 101 is shaped differently in order to be compatible with existing troffer light fixtures 207.

Referring now to FIG. 3D, an end view of door assembly 101 is illustrated according to one embodiment. The end of door assembly 101 may be formed by frame end 317. As previously described, frame end 317 may be generally trapezoidal. Hinges 303 and/or latches 301 may extend beyond the frame of door assembly 101. This may allow door assembly 101 to be hung (e.g., on troffer housing 209 of existing troffer light fixture 207 or adaptor bracket 103) and easily opened and closed.

Referring now to FIGS. 3A-3E, door assembly 101 also includes a light source (not illustrated). The light source may be any device or component configured to produce light, typically visible light, using electricity. In one embodiment, the light source is one or more LEDs. For example, the LEDs may be individual LEDs, LED ribbons including a plurality of LEDs, an LED string containing a plurality of LEDs, or another device or package including LEDs. The LEDs may be mounted anywhere in or on the housing of door assembly 101 such that light exits the housing through lens 305 or the area where lens 305 would normally be. For example, LEDs (e.g., two strips of LEDs) may be attached to the surface of top portion 311 facing lens 305. Electronics used to control or otherwise support the functions of the LEDs may be located in cover 313. A wiring harness, supply wires, and/or other electrical connections may be coupled to the LEDs to provide electrical power. The wiring harness, supply wires, and/or other electrical connections may exit cover 313. This may allow for easy retrofitting of an existing troffer light fixture 207 as the wiring harness or supply wires may be quickly connected to or wired to supply wires for the existing troffer light fixture 207. For example, the lens of the existing troffer light fixture 207 may be removed, and door assembly 101 hung from either troffer housing 209 or adaptor brackets 103. The lamps and ballast cover of the existing troffer light fixture 207 may be removed and the supply wires to the ballast disconnected. The wiring harness or supply wires of the door assembly may then be connected to the existing supply wires which were previously connected to the ballast of the existing troffer light fixture 207.

In alternative embodiments, the LEDs may be located elsewhere in or on the housing of door assembly 101. For example, the LEDs may be mounted on the side of top portion 311 facing troffer housing 209. The LEDs may extend through one or more openings in top portion 311 and into the interior of the housing of door assembly 101. As an additional example, the LEDs may be mounted on one or more of upper side frame 309. Alternatively, the LEDs may be mounted on a brace member (not illustrated) located within the housing of door assembly 101 and above lens 305. LEDs may be positioned to emit light towards lens 305 and/or towards top portion 311 and/or upper frame side 309 (e.g., these components may act as reflectors as previously described).

In other embodiments, the light source may be a lamp such as a florescent lamp or incandescent lamp. The light source may be attached to one or more components of door assembly 101 such that light is emitted within the housing and exits through lens 305. For example, the light source may be attached to the inside of top portion 311. The light source may be attached with hardware such as lamp holders. Ballast, controllers, and/or other electronics for use with the light source may be located between cover 313 and top portion 311.

Still referring to FIGS. 3A-3E, components may be attached to one another or joined together as described above. In various embodiments, various techniques may be used to assemble the components described herein. For example, screws, rivets, nuts and bolts, and/or other fasteners may be used to attach components to each other. Continuing the example, glues, drying adhesives, pressure-sensitive adhesives, contact adhesives, hot adhesives, reactive adhesives, adhesive tape, and/or other adhesives may be used to attach one component to another or otherwise join components. Components may also be attached or joined using welding or similar techniques (e.g., TIG welding, MIG welding, spot welding such as resistive spot welding, ultrasonic welding, and/or other techniques).

In some embodiments, door assembly 101 may include a single housing which is produced as one piece of material. For example, a housing (e.g., including lower side frame 307, upper side frame 309, frame ends 317, top portion 311, and/or other components) may be a single component made by stamping, machining, printing, extruding, casting, injection molding, and/or other manufacturing techniques.

Figure 3E:
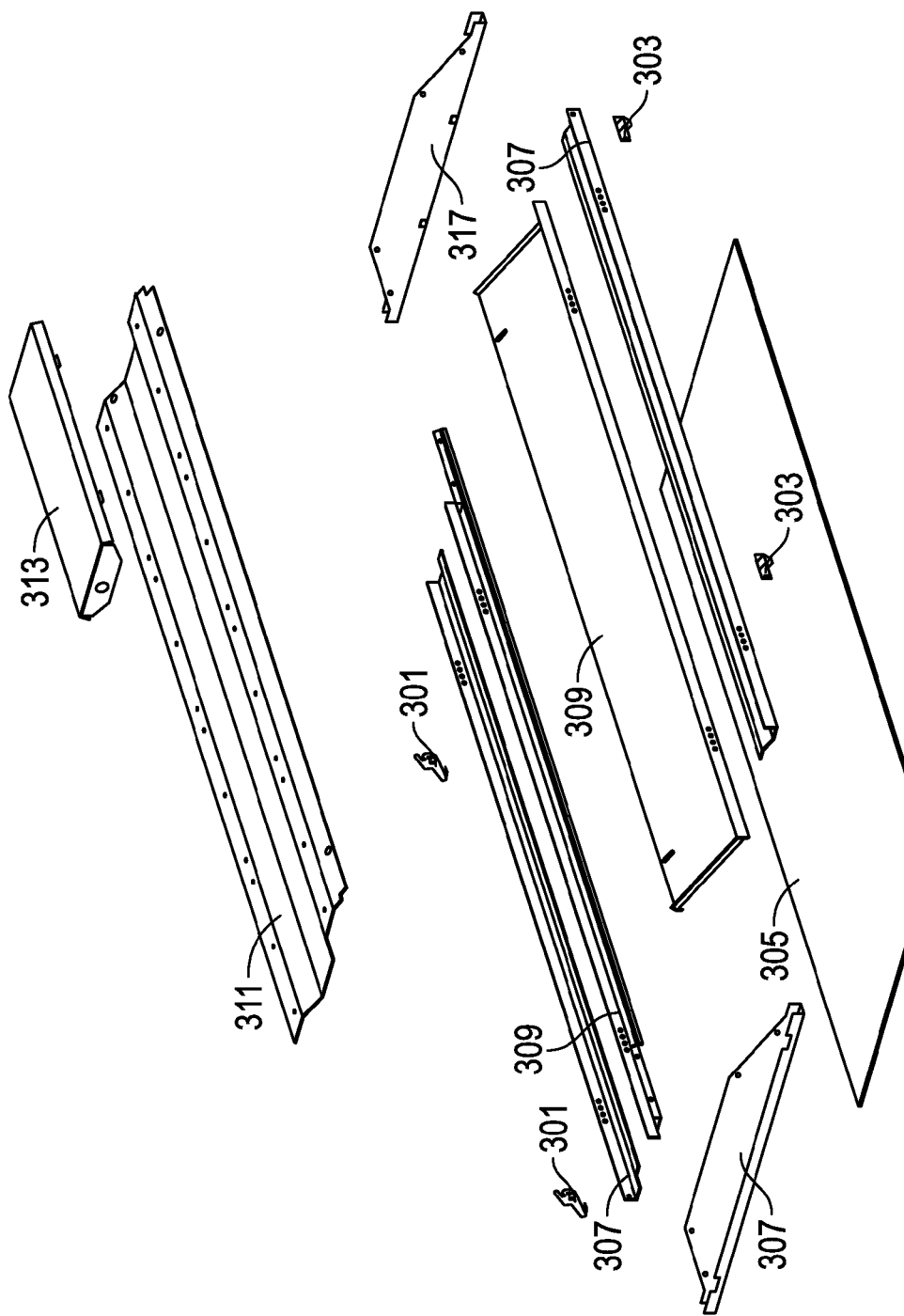
FIG. 3E is an illustration of an exploded view of a troffer door assembly according to an exemplary embodiment.

Referring now to FIG. 3E, an exploded view of door assembly 101 is shown according to one embodiment. As illustrated, components of door assembly 101 may include mounting points (e.g., indentations, holes, etc.) for attaching or joining two or more components. For example, lower side frame 307 and upper side frame 309 may both include mounting points at corresponding locations on flanges for attaching lower side frame 307 to upper side frame 309. Fasteners may be used to attach or join the two components. Similarly, attachment points on lower side frame 307 and/or upper side frame 309 may be used in conjunction with fasteners to attach hinges 303 and/or latches 301.

Lower side frames 307 and/or frame ends 317 may include channels. The channels may give the appearance that door assembly 101 is flush with T-bar 201 when installed. Lower side frames 307 may also include a flange or other horizontal surface for receiving and/or supporting lens 305. Flanges may be included in other components and used for a variety of purposes. For example, flanges may provide additional strength to components (e.g., acting as a U beam). As an additional example, flanges may provide a surface on which to apply adhesives, spot weld two components, or otherwise facilitate the joining of two components or the attachment of one component to another.

Figure 3F:
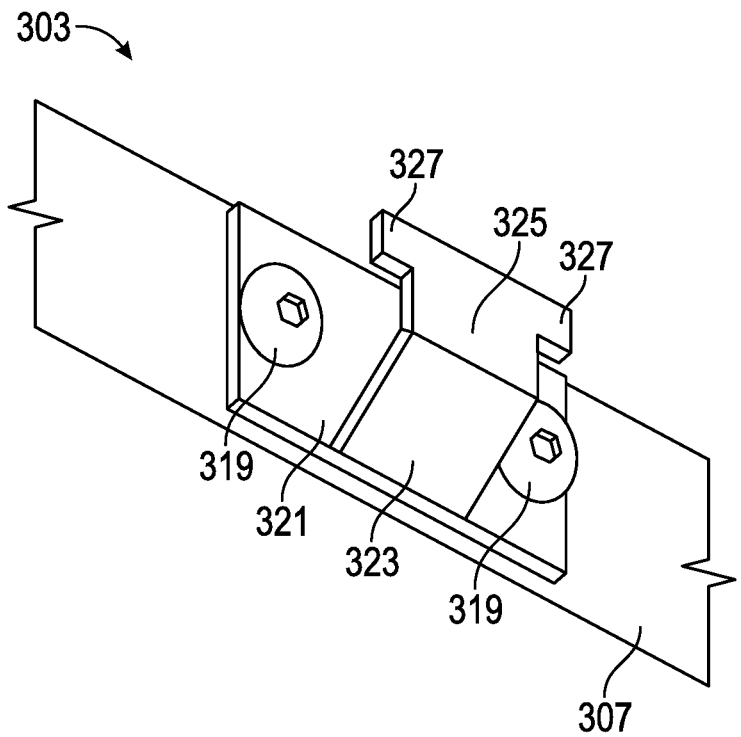
FIG. 3F is an illustration of a hinge of a door assembly according to an exemplary embodiment.

Referring now to FIG. 3F, hinge 303 is illustrated according to one embodiment. As previously discussed, hinge 303 is included in door assembly 101. One or more hinges 303 are used to hang door assembly 101 from either troffer housing 209 of existing troffer light fixture 207 or adaptor brackets 103. Thus, existing troffer light fixture 207 can be retrofit with door assembly 101.

Hinge 303 is attached to door assembly 101. In some embodiments, hinge 303 is attached to lower side frame 307. Hinge 303 is attached with fasteners 319. For example, fasteners 319 may be screws, nuts and bolts, rivets, spot welds, or other fasteners as previously described herein for use in attaching or joining components of door assembly 101. In alternative embodiments, hinge 303 may be attached to or joined with door assembly in other locations. For example, hinge 303 may be attached to or joined with frame end 317. In some alternative embodiments, fasteners 319 are not used to attach or join hinge 303 to door assembly 101. For example, adhesive may be used. Alternatively, hinge 303 may be part of a single piece making up the housing of door assembly 101. For example, hinge 303 may be part of an injection molded or milled housing.

Hinge 303 can include plate section 321. Plate section 321 may include holes, taps, or other features used to attach hinge 303 to door assembly 101. Plate section 321 may provide a surface with which to spot weld hinge 303 to door assembly 101.

Hinge 303 may include angled portion 323. Angled portion 323 can provide separation between door assembly 101 and the components to which door assembly 101 is attached (e.g., adaptor bracket 103 or troffer housing 209 of existing troffer light fixture 207). This separation allows for door assembly 101 to hinge on hinge 303. Angled portion 323 may be have an angle and/or a length such that door assembly 101 appears to be flush with the ceiling and/or troffer housing 209 of the existing troffer light fixture 207. In alternative embodiments, angled portion 323 may be vertical rather than angled, angled by a different degree, or omitted from hinge 303.

Attached to the end of angled portion 323 is locking portion 325. Locking portion 325 is configured to be inserted into a corresponding slot on either troffer housing 209 of existing troffer light fixture 207 or adaptor bracket 103. Locking portion 325 includes one or more extended portions 327. This allows locking portion 325 to be inserted into a slot having a large and small opening. Locking portion 325 including extended portions 327 is inserted into the large opening of the slot. Hinge 303 is then lowered. While door assembly 101 is hanging, extended portions 327 prevent hinge 303 from exiting the slot as extended portions 327 make locking portion 325 larger than the small opening of the slot. Hinge 303 can be removed from the slot by lifting and pulling door assembly 101.

In alternative embodiments, other hinges 303 are used. For example, hinge 303 may be attached with fasteners or other techniques to troffer housing 209 or adaptor bracket 103. In other alternative embodiments, hinge 303 may function as previously described herein but have a different geometry. For example, locking portion 325 may act as a hook which hooks onto a corresponding portion of troffer housing 209 or adaptor bracket 103. As an alternative embodiment, hinge 303 may be replaced by a flexible connector which is attached to both door assembly 101 and troffer housing 209 or adaptor bracket 103. For example, door assembly 101 may be secured to troffer housing 209 or adaptor bracket 103 with a tie.

Figure 3G:
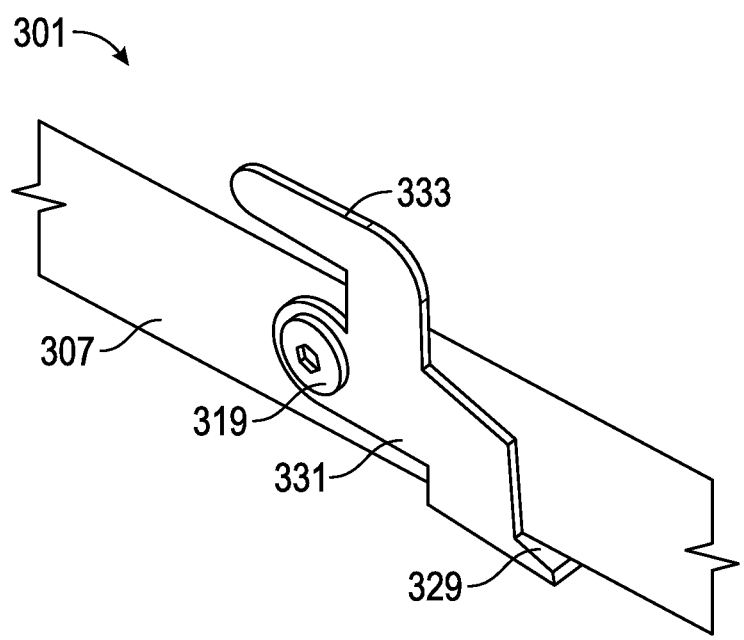
FIG. 3G is an illustration of a latch of a door assembly according to an exemplary embodiment.
Figure 3H:
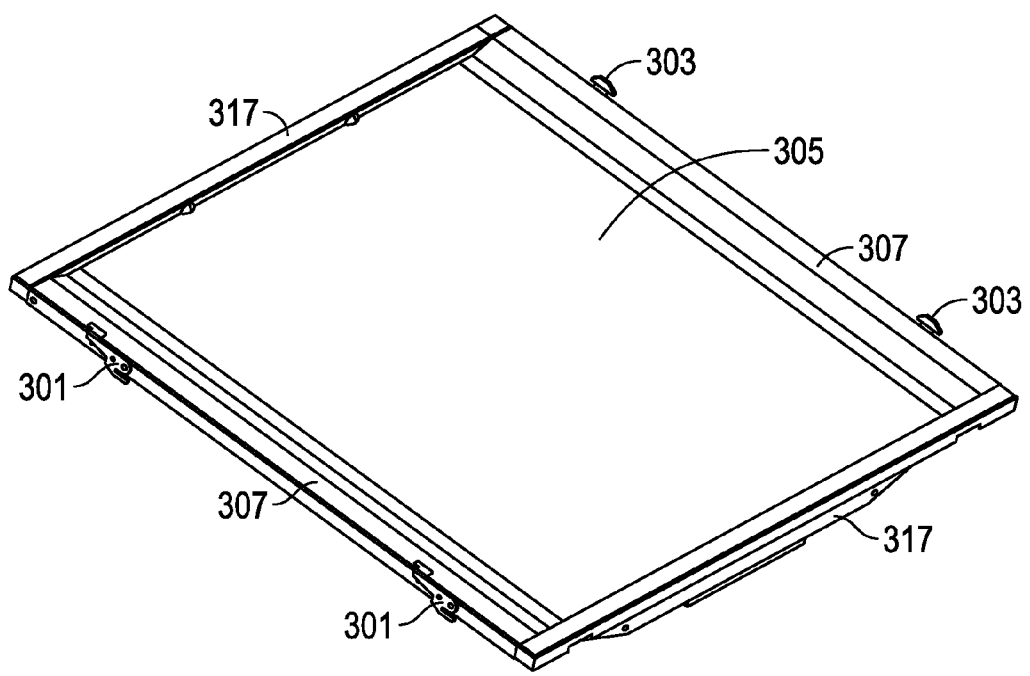
FIG. 3H is an illustration of a troffer door assembly according to an exemplary embodiment.
Figure 3I:
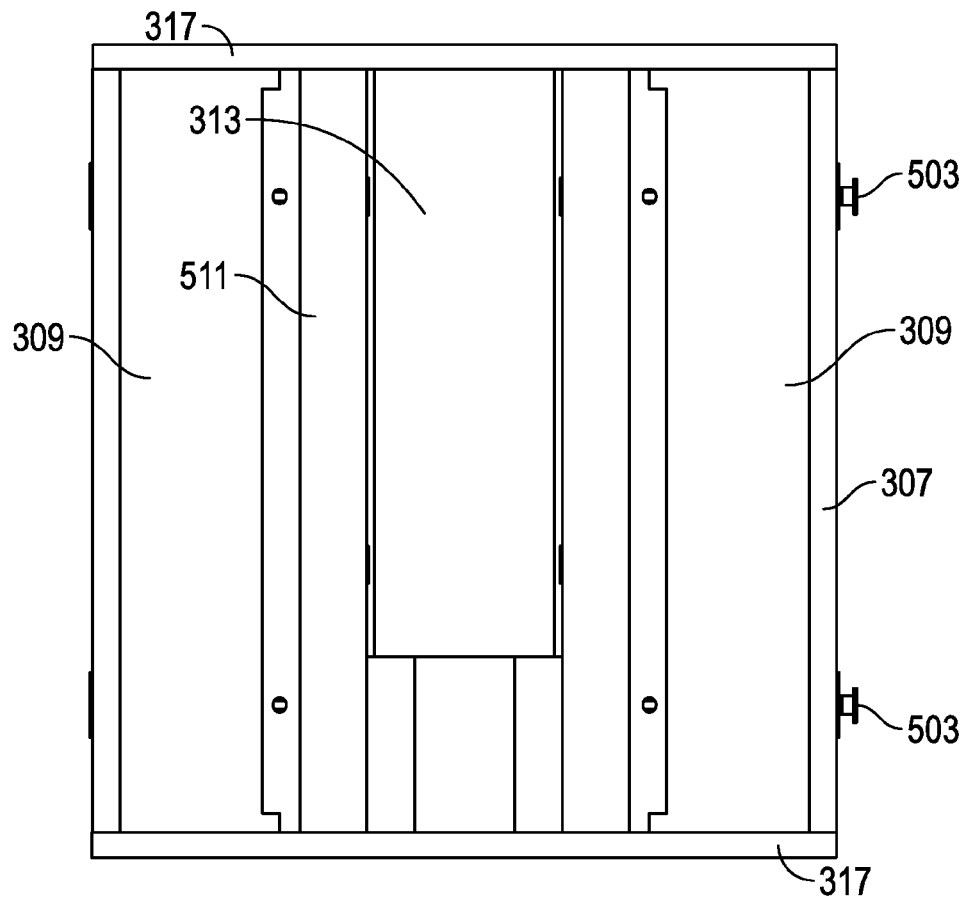
FIG. 3I is an illustration of a top view of a troffer door assembly according to an exemplary embodiment.
Figure 3J:
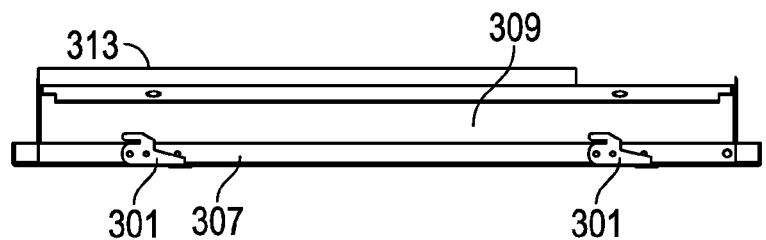
FIG. 3J is an illustration of a side view of a troffer door assembly according to an exemplary embodiment.
Figure 3K:
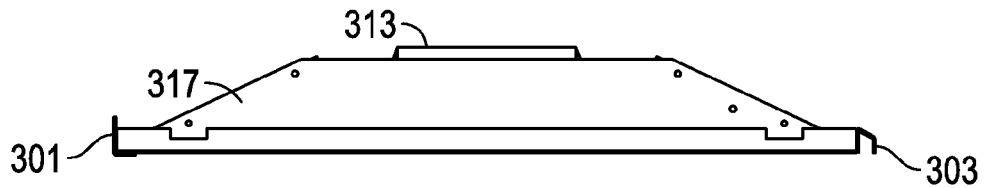
FIG. 3K is an illustration of an end view of a troffer door assembly according to an exemplary embodiment.

Referring now to FIG. 3G, latch 301 is illustrated according to one embodiment. As previously described, latch 301 is attached to or included in door assembly 101. Latch 301 secures door assembly 101 in the closed position by interfacing with troffer housing 209 of existing troffer light fixture 207 or adaptor bracket 103.

Latch 301 is attached to door assembly 101. In some embodiments, latch 301 is attached to lower side frame 307. Latch 301 is attached with fasteners 319. For example, fasteners 319 may be screws, nuts and bolts, rivets, spot welds, or other fasteners as previously described herein for use in attaching or joining components of door assembly 101. In alternative embodiments, latch 301 may be attached to or joined with door assembly in other locations. For example, latch 301 may be attached to or joined with frame end 317. In some alternative embodiments, fasteners 319 are not used to attach or join latch 301 to door assembly 101. For example, adhesive may be used.

Latch 301 includes handle portion 329. Handle portion 329 extends lower than the frame of door assembly 101. For example, handle position 329 extends below lower side frame 307. Handle portion 329 may be parallel to and in contact with the bottom surface of lower side frame 307 when latch 301 is engaged. This may give the appearance of latch 301 being flush with door assembly 101. Additionally, it may reduce the chance of latch 301 being accidently disengaged. Handle portion 329 may include a lip or slanted portion which makes handle portion 329 easier to grasp while latch 301 is engaged.

Latch 301 also includes body portion 331. Body portion 331 may include holes, taps, or other features used to attach hinge 303 to door assembly 101.

Latch 301 further includes hook portion 333. Hook portion 333 is configured as a hook to engage with a surface and prevent door assembly 101 from swinging open. For example, hook portion 333 may be inserted through a slot on troffer housing 209 of existing troffer light fixture 207 or adaptor bracket 103. After hook portion 333 is inserted into the slot, latch 301 may be rotated to the engaged position (e.g., as illustrated) using handle portion 329. This rotates hook portion 333 such that hook portion extends out of the slot and over a horizontal surface (e.g., a latch surface) of either troffer housing 209 of existing troffer light fixture 207 or adaptor bracket 103. Hook portion 333 is therefore positioned such that hook portion 333 does not fit through the slot.

Fastener 319 may provide sufficient friction or resistance to rotation such that latch 301 does not move from the engaged position to the disengaged position under the weight of door assembly 101. Fastener 319 may keep latch 301 in position until actuated by applying a force on handle portion 329.

In alternative embodiments, other latches 301 are used. For example, latch 301 may be a stationary component in relation to door assembly 101 such as a magnet or magnetic material. A section of either troffer housing 209 or adaptor bracket 103 may be or include magnetic material or a magnet. This can allow door assembly 101 to be secured using magnetic force between latch 301 and the corresponding magnetic material or magnet. In other alternative embodiments, latch 301 may be mechanical as previously described, but latch 301 may have a different geometry.

Referring generally to FIGS. 3A-3G, the components of door assembly 101 described herein may be made of a variety of materials and using a variety of manufacturing techniques. In some embodiments, one or more components are made of a metal or a plurality of metals. For example, components may be made of aluminum, steel, tin, and/or other metals or alloys. In some embodiments, one or more components are made of plastics or polymers. For example, components may be made of or include acrylic, polycarbonate, polyvinyl chloride, or other polymers. In further embodiments, one or more components may be made of ceramic materials.

Referring now to FIGS. 3H-3K, an alternative embodiment of door assembly 101 is illustrated according to one embodiment. An isometric view, top view, side view, and end view are shown respectively. Door assembly 101 can be sized squarely rather than as a rectangle as previously illustrated in FIGS. 3A-3G. Door assembly 101 may be square in order to operate with ceiling systems having tiles and existing troffer light fixtures 207 which are 2×2, 1×1, or have other square dimensions. This is in contrast to the door assembly illustrated in FIGS. 3A-3G which is sized as a rectangle for use in a rectangle ceiling system or rectangle existing troffer light fixture 207 (e.g., an existing 2×4 troffer light fixture).

The components of square door assembly 101 may be the same components as those in the rectangular door assembly 101 previously described but resized. Some components may remain the same size (e.g., hinge 303, latch 301, cover 313, the light source, etc.). Adaptor brackets 103 may be similarly resized for use with square door assembly 101.

Referring now to FIGS. 4A-4E, an alternative embodiment of door assembly 101 described with reference to FIGS. 3A-3G is illustrated. A curved lens 405 (e.g., a contour lens) may be used rather than a flat lens. Cover 313 may be replaced as the location of door assembly 101 electronics. In its place, electronics housing 413 and electronics cover 415 can be used. The description of like components made in reference to FIGS. 3A-3G applies to like components illustrated and described with reference to FIGS. 4A-4E. Similarly, description of additional components (e.g., the light source), materials, attachment or joining techniques, and functions or operation applies as well.

Figure 4A:
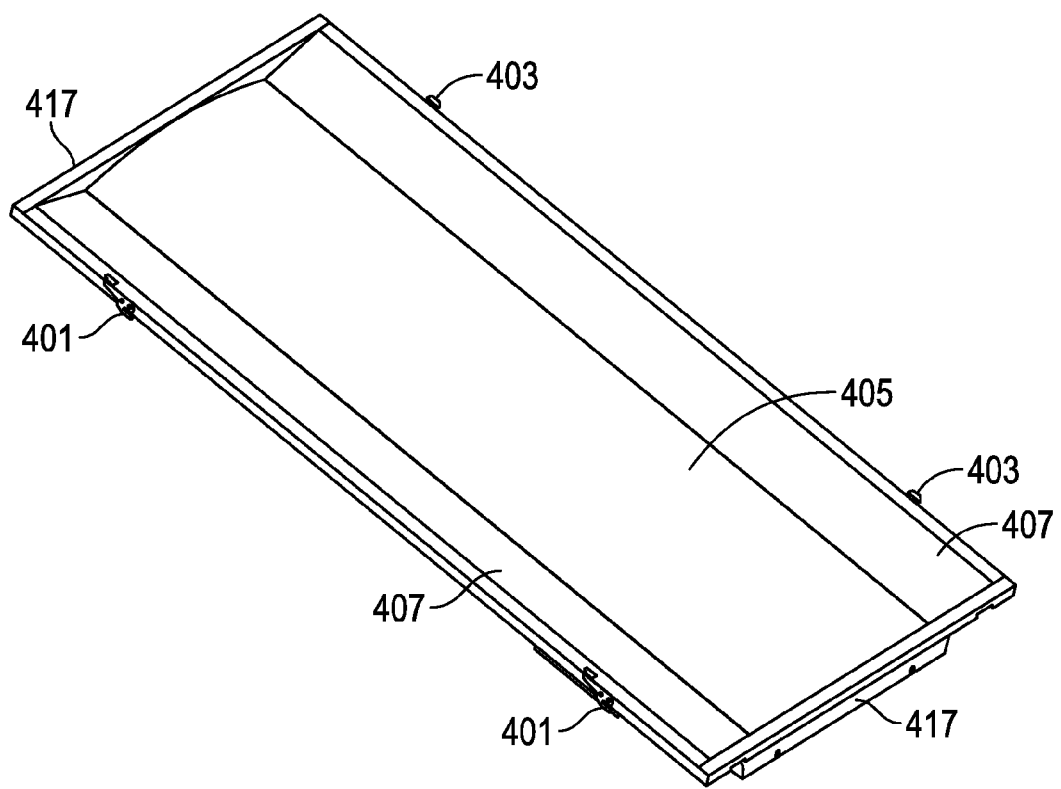
FIG. 4A is an illustration of a troffer door assembly having a curved lens according to an exemplary embodiment.

Referring now to FIG. 4A, door assembly 101 can include latches 401, hinges 403, and frame ends 417. These components may be as previously described. Together with lower side frame 407, frame ends 417 may form the basic frame of door assembly 101. Lower frame sides 407 may differ from previously described lower frame sides 307 to accommodate curved lens 405. As illustrated, lens 405 may be curved in contrast to the flat lens illustrated by lens 305.

Figure 4B:
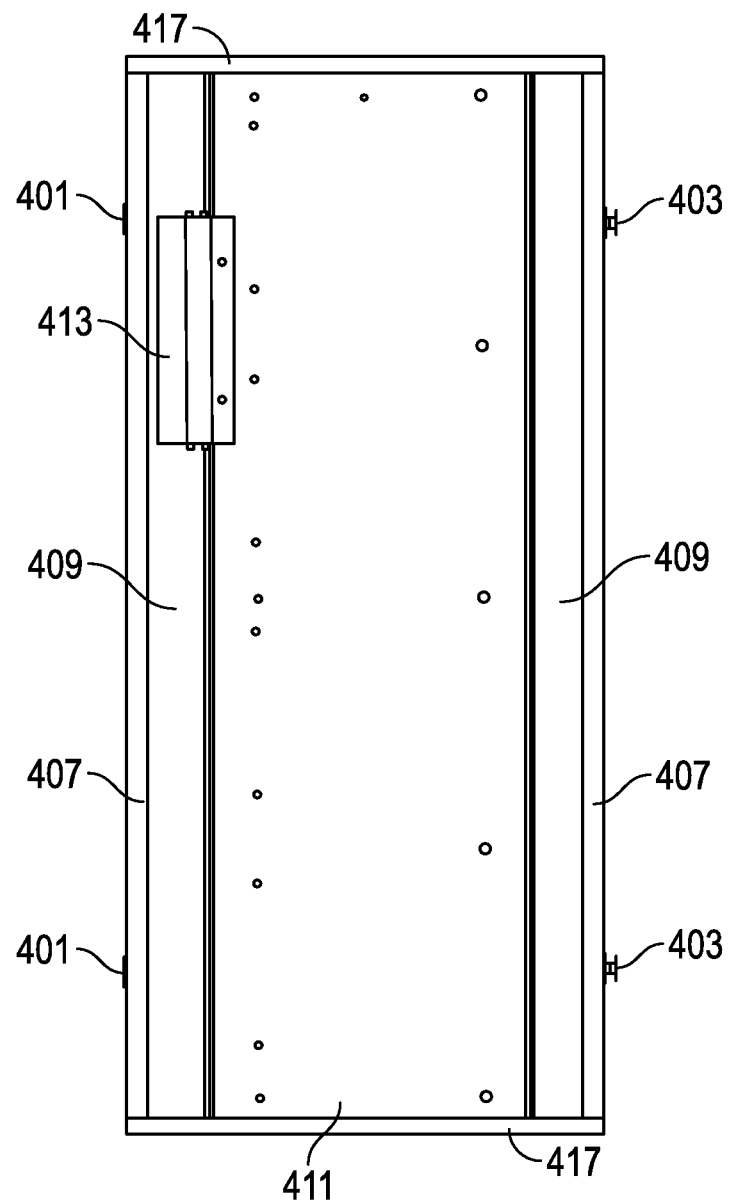
FIG. 4B is an illustration of a top view of a troffer door assembly having a curved lens according to an exemplary embodiment.

Referring now to FIG. 4B, door assembly 101 can also include upper side frames 409 and top portion 411. These components may complete the housing of door assembly 101. Electronics housing 413 may be mounted on top portion 411, upper side frame 409, or a combination thereof. Electronics housing 413 may perform the functions of cover 313 previously described. For example, electronics housing 413 may include electronic components related to the light source included in door assembly 101. Electronics housing 413 may also include wiring for connecting door assembly 101 to an existing power supply such as supply wires disconnected from existing troffer light fixture 207. The wiring may extend from an opening in electronics housing 413.

Figure 4C:
FIG. 4C is an illustration of a side view of a troffer door assembly having a curved lens according to an exemplary embodiment.

Referring now to FIG. 4C, a side view of door assembly 101 is illustrated according to an embodiment including electronics housing 413. Lower side frame 407 may be attached or joined with upper side frame 409. Upper side frame 409 may be attached to or joined with top portion 411. Electronics housing 413 may be mounted such that electronics housing is located along side upper side frame 409. This may allow electronics housing 413 to be lower than top portion 411 or extend not substantially above top portion 411. Advantageously, this may reduce the overall height of door assembly 101. Therefore, door assembly 101 may be compatible with a greater number of troffer housings 209 of existing troffer light fixtures 207. In some cases, the lower overall height of door assembly 101 may reduce the number of components which are removed from existing troffer light fixture 207 during the retrofit process. For example, the lower overall height of door assembly 101 may allow for ballast of existing troffer light fixture 207 to remain.

Figure 4D:
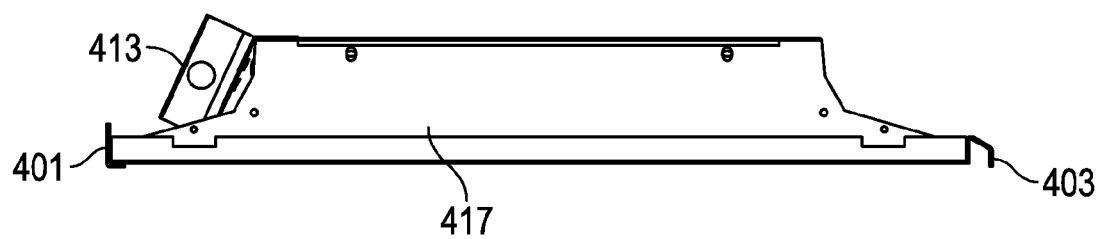
FIG. 4D is an illustration of an end view of a troffer door assembly having a curved lens according to an exemplary embodiment.

Referring now to FIG. 4D, an end view of door assembly 101 is illustrated according to an embodiment including electronics housing 413. As previously discussed, electronics housing 413 may be located such that the overall height of door assembly 101 is not substantially increased by including electronics and/or wiring.

Figure 4E:
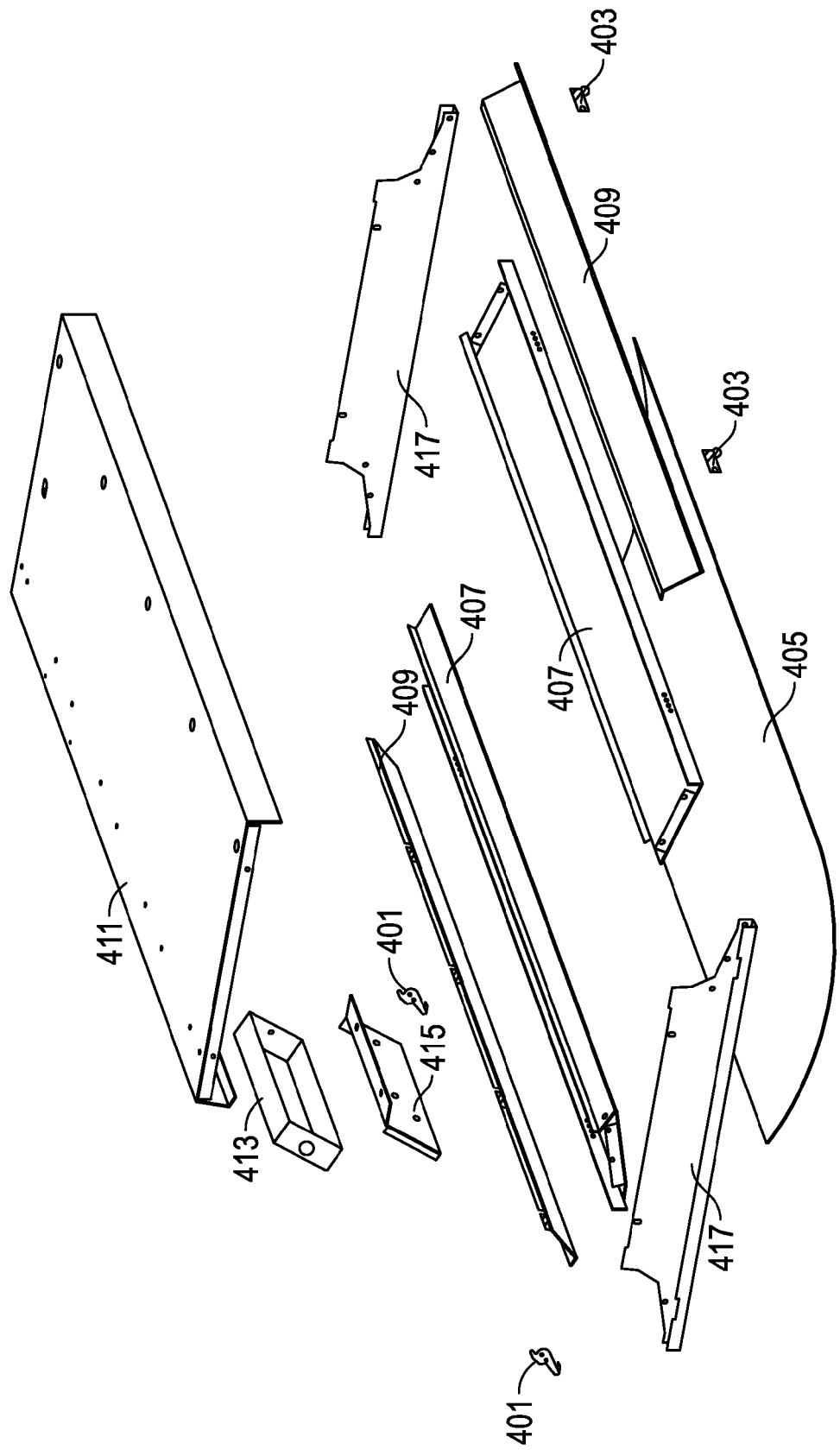
FIG. 4E is an illustration of an exploded view of a troffer door assembly having a curved lens according to an exemplary embodiment.
Figure 4F:
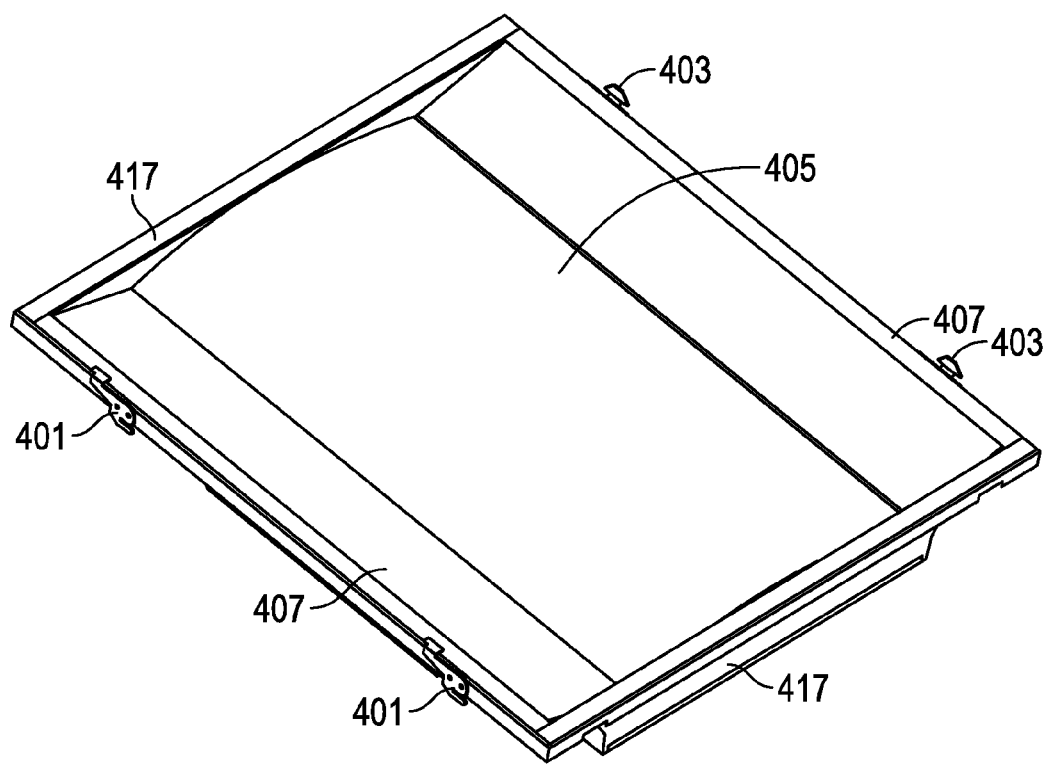
FIG. 4F is an illustration of a troffer door assembly having a curved lens according to an exemplary embodiment.
Figure 4G:
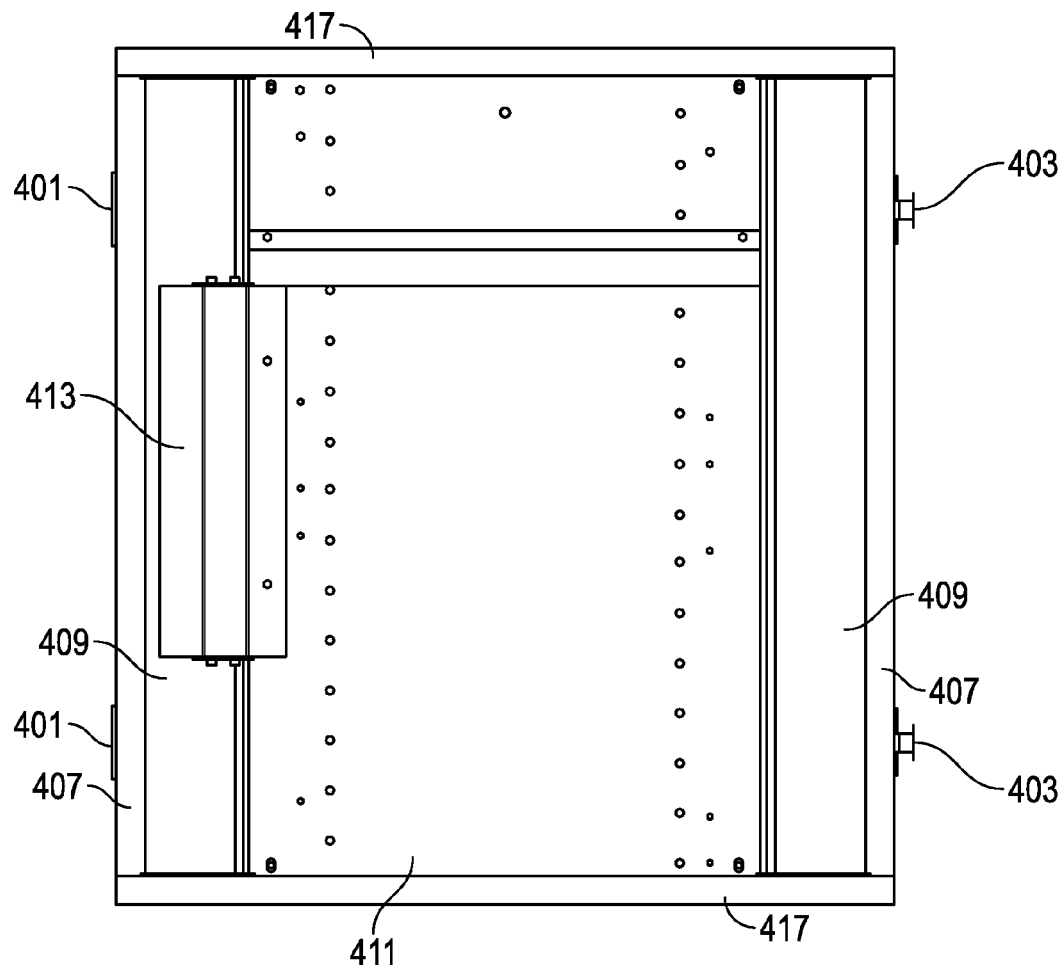
FIG. 4G is an illustration of a top view of a troffer door assembly having a curved lens according to an exemplary embodiment.
Figure 4H:
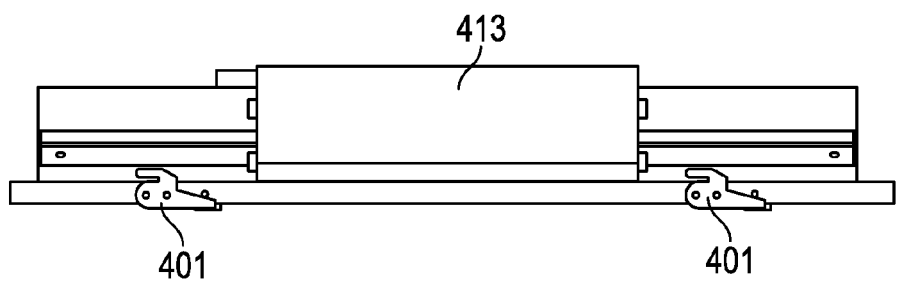
FIG. 4H is an illustration of a side view of a troffer door assembly having a curved lens according to an exemplary embodiment.
Figure 4I:
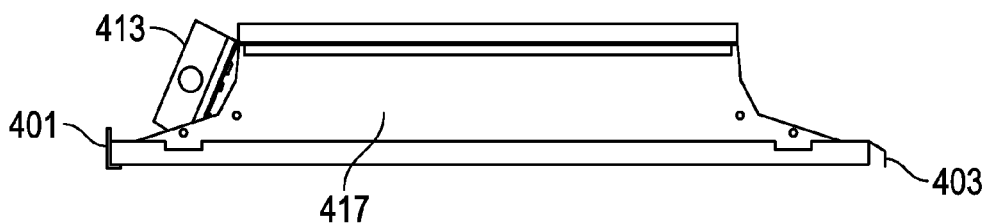
FIG. 4I is an illustration of an end view of a troffer door assembly having a curved lens according to an exemplary embodiment.

Referring now to FIG. 4E, an exploded view of door assembly 101 is shown according to one embodiment. Door assembly 101 may include electronics cover 415. Electronics cover 415 may attach to electronics housing 413. Electronics cover 415 can include a flange for attaching or joining electronics cover 415 and electronics housing 413 to another component of door assembly 101 (e.g., top portion 411).

As previously discussed, lower side frame 407 may be configured to support, secure, retain, or otherwise interface with curved lens 405. For example, lower side frame 407 may extend further toward the center of door assembly 101 than lower side frame 307. Lower side frame 407 may also include a flange or other receiving portion in order to retain curved lens 405.

Curved lens 405 (e.g., a contour lens) may be inserted and/or removed from door assembly 101 as previously described with reference to lens 305. In alternative embodiments, curved lens 405 is fixed and cannot be removed. Curved lens 405 or other contour lens may provide an aesthetic advantage over a flat lens. In some embodiments, curved lens 405 (e.g., a contour lens) may focus emitted light, form a beam of emitted light with a desired geometry or beam pattern, or otherwise effect the light emitted from door assembly 101.

Referring now to FIGS. 4F-4I, an alternative embodiment of door assembly 101 is illustrated according to one embodiment. An isometric view, top view, side view, and end view are shown respectively. Door assembly 101 can be sized squarely rather than as a rectangle as previously illustrated in FIGS. 4A-4E. Door assembly 101 may be square in order to operate with ceiling systems having tiles and existing troffer light fixtures 207 which are 2×2, 1×1, or have other square dimensions. This is in contrast to the door assembly illustrated in FIGS. 4A-4E which is sized as a rectangle for use in a rectangle ceiling system or rectangle existing troffer light fixture 207 (e.g., an existing 2×4 troffer light fixture).

The components of square door assembly 101 may be the same components as those in the rectangular door assembly 101 previously described but resized. Some components may remain the same size (e.g., hinge 403, latch 401, electronics housing 413, the light source, etc.). Adaptor brackets 103 may be similarly resized for use with square door assembly 101.

Referring now to FIGS. 5A-5E, an alternative embodiment of door assembly 101 described with reference to FIGS. 3A-3G is illustrated. Two lenses 505 and a center lens 506 may be used rather than a flat lens 305 previously described. The description of like components made in reference to FIGS. 3A-3G applies to like components illustrated and described with reference to FIGS. 5A-5E. Similarly, description of additional components (e.g., the light source), materials, attachment or joining techniques, and functions or operation applies as well.

Figure 5A:
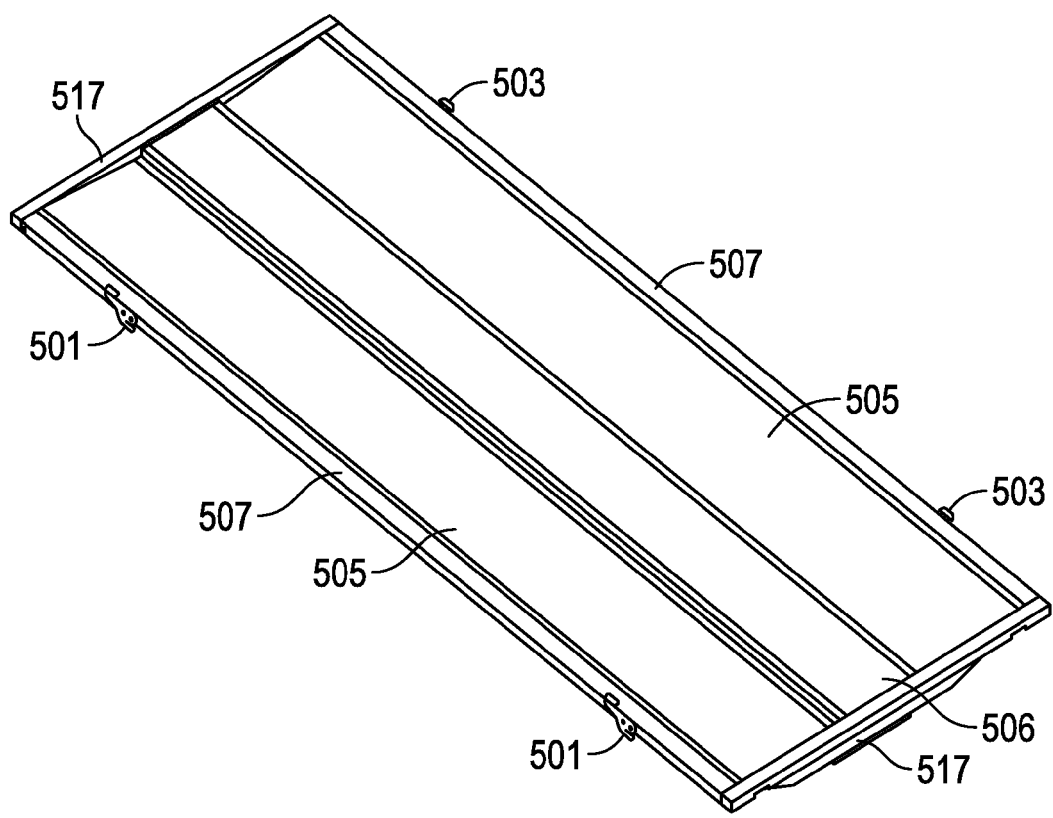
FIG. 5A is an illustration of a troffer door assembly having three lenses according to an exemplary embodiment.

Referring now to FIG. 5A, door assembly 101 can include a plurality of lenses. Two lenses 505 may be located on the sides on center lens 506. The three lens setup may provide several advantages. For example, the use of lenses 505 and center lens 506 may improve the aesthetic appearance of door assembly 101. Lenses 505 and center lens 506 may allow for a more complex beam pattern for the light emitted by door assembly 101. For example, lenses 505 may be used to direct light towards the sides of door assembly 101 and center lens 506 may be used to direct light below door assembly 101. Each lens (e.g., lenses 505 and center lens 506) may have different properties in some embodiments. For example, center lens 506 may be configured to produce a narrow beam while lenses 505 are configured to produce wide beams. Continuing the example, the three lenses may be configured to produce light of varying color temperatures or intensities.

In further embodiments, lens 506 may be a faux lens. For example, lens 506 may be opaque or less transparent than lenses 505. Lens 506 may provide a mounting surface for the light source within door assembly 101. Advantageously, this may allow the light source to be directed upward. Light emitted from the light source may be reflected from upper side frames 509 down through lenses 505 and center lens 506 if not completely opaque. The configuration of door assembly 101 described herein can provide a volumetric, even-distribution of light.

In alternative embodiments, lenses 505 and center lens 506 may be oriented other than with the long axes parallel with the long axis of door assembly 101. For example, lenses 505 and center lens 506 may be perpendicular to the long axis of door assembly 101.

Figure 5B:
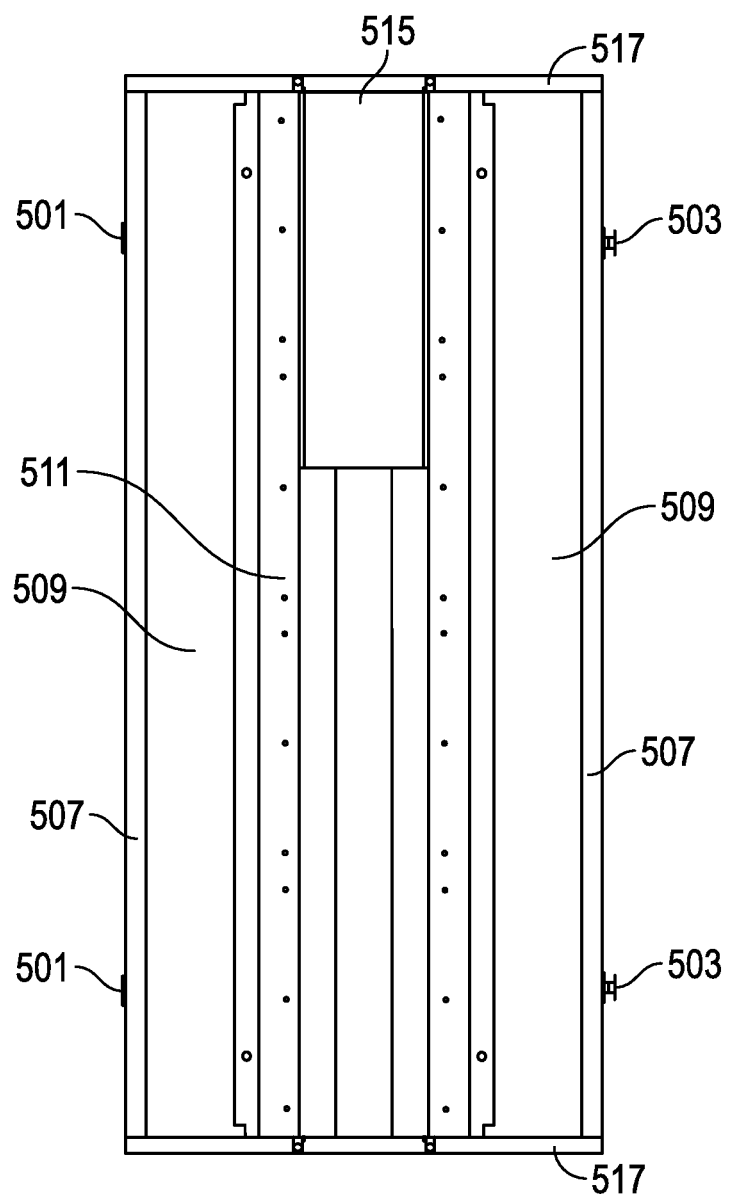
FIG. 5B is an illustration of a top view of a troffer door assembly having three lenses according to an exemplary embodiment.

Referring now to FIG. 5B, the housing of door assembly 101 can include lower side frame 507, upper side frame 509, frame ends 517, and top portion 511. Door assembly 101 further includes hinges 503 and latches 501. These components may function as described with reference to lower side frame 307, upper side frame 309, frame ends 317, top portion 311, hinges 303 and latches 301 and FIGS. 3A-3G. Cover 515 may function as cover 313 previously described.

Figure 5C:
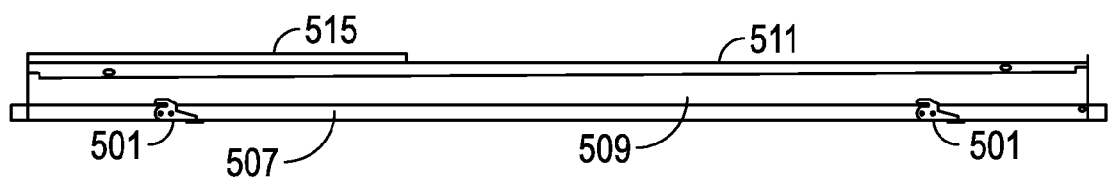
FIG. 5C is an illustration of a side view of a troffer door assembly having three lenses according to an exemplary embodiment.
Figure 5D:
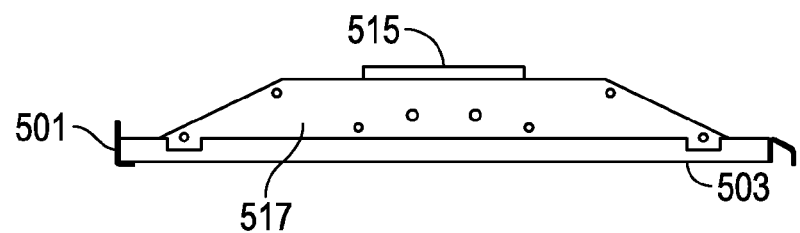
FIG. 5D is an illustration of an end view of a troffer door assembly having three lenses according to an exemplary embodiment.

Referring now to FIGS. 5C and 5D, a side view and end view, respectively, of door assembly 101 are illustrated according to one embodiment. Door assembly 101 may have the same or substantially similar shape and geometry as door assembly 101 described with reference to FIGS. 3A-3G.

Figure 5E:
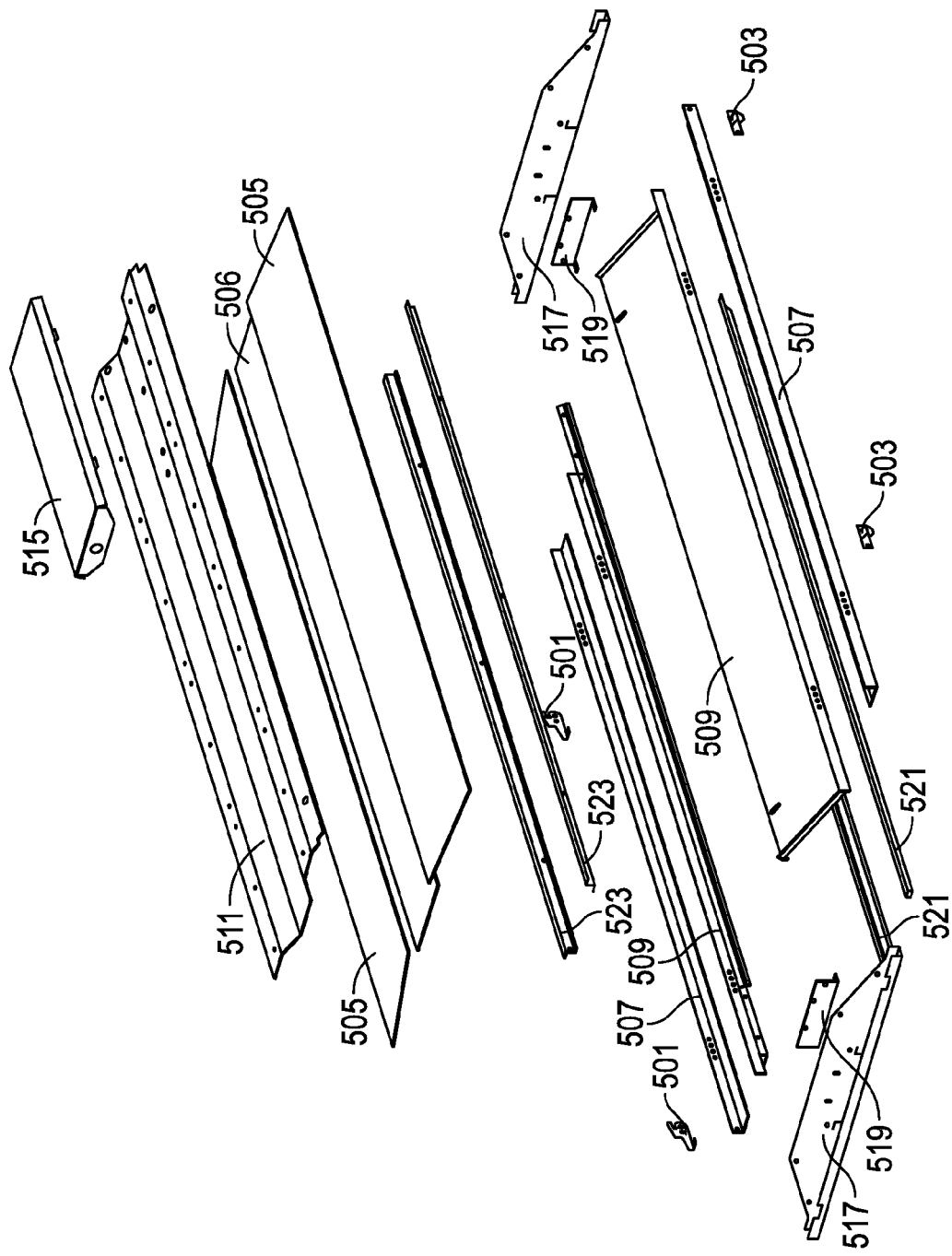
FIG. 5E is an illustration of an exploded view of a troffer door assembly having three lenses according to an exemplary embodiment.
Figure 5F:
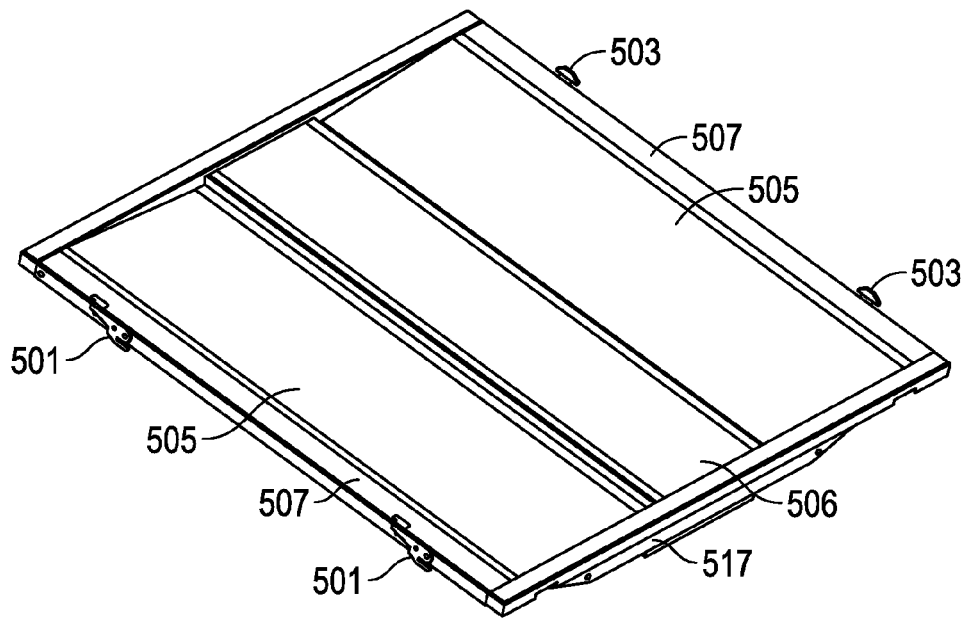
FIG. 5F is an illustration of a troffer door assembly having three lenses according to an exemplary embodiment.
Figure 5G:
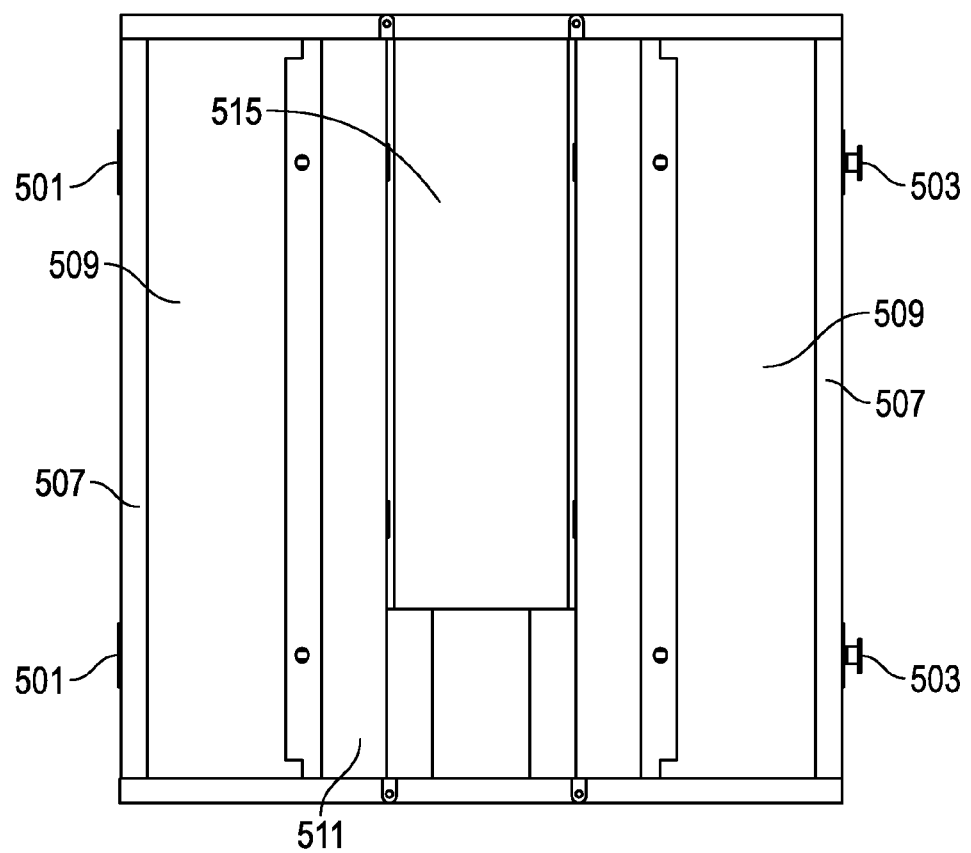
FIG. 5G is an illustration of a top view of a troffer door assembly having three lenses according to an exemplary embodiment.
Figure 5H:
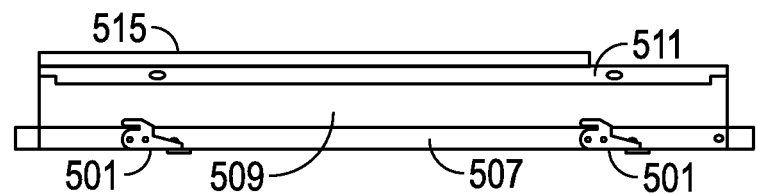
FIG. 5H is an illustration of a side view of a troffer door assembly having three lenses according to an exemplary embodiment.
Figure 5I:
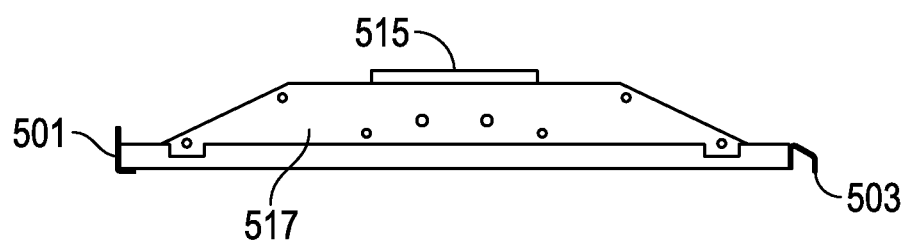
FIG. 5I is an illustration of an end view of a troffer door assembly having three lenses according to an exemplary embodiment.

Referring now to FIG. 5E, an exploded view of door assembly 101 is shown according to one embodiment including three lenses. The housing of door assembly 101 is formed by lower side frames 507, upper side frames 509, frame ends 417, and top portion 511. Attached to top portion 511 is cover 515. Held herein may be the electronic components of door assembly 101.

Lenses 505 are supported, secured, and/or retained in part by lower side frames 507. Lenses 505 angle upward from lower side frame 507 to be supported by support members 523. Support members 523 are attached or joined to lens bracket 519. Support members 523 are attached to or joined to lens bracket 519 and are shaped such that lenses 505 are elevated above center lens 506 at lens bracket 519. This provides lenses 505 with the angled configuration previously described herein.

Also attached to lens brackets 519 are groove members 521. Grove members 521 may be L shaped. Groove members 521 create a channel in which center lens 506 is supported. In some embodiments, center lens 506 is free to move vertically relative to groove members 521. This may allow center lens 506 to be removed from door assembly 101 and/or provide access to door assembly 101 by lifting center lens 506.

Groove members 521 may be mounted to lens bracket 519 such that center lens 506 is positioned below lenses 505 where they are supported by lens bracket 519 and/or support members 523.

Lens bracket 519 is attached to or joined to frame ends 517. Lens bracket 519 provides support to lenses 505 and center lens 506 along with any additional support or positioning components. In alternative embodiments (e.g., embodiments in which lenses 505 and center lens 506 are perpendicular to the long axis of door assembly 101), lens bracket 519 can be attached to or joined to other components of door assembly 101.

Referring now to FIGS. 5F-5I, an alternative embodiment of door assembly 101 is illustrated according to one embodiment. An isometric view, top view, side view, and end view are shown respectively. Door assembly 101 can be sized squarely rather than as a rectangle as previously illustrated in FIGS. 5A-5E. Door assembly 101 may be square in order to operate with ceiling systems having tiles and existing troffer light fixtures 207 which are 2×2, 1×1, or have other square dimensions. This is in contrast to the door assembly illustrated in FIGS. 5A-5E which is sized as a rectangle for use in a rectangle ceiling system or rectangle existing troffer light fixture 207 (e.g., an existing 2×4 troffer light fixture).

The components of square door assembly 101 may be the same components as those in the rectangular door assembly 101 previously described but resized. Some components may remain the same size (e.g., hinge 503, latch 501, cover 515, the light source, etc.). Adaptor brackets 103 may be similarly resized for use with square door assembly 101.

Generally, one or more of the previously described features or components of door assembly 101 can be combined with features or components from alternatively described embodiments. For example, the user of three lenses described with respect to FIGS. 5A-5E may be combined with the use of a side mounted or portioned electronics housing as described with reference to FIGS. 4A-4E. Other combinations and embodiments are possible.

Figure 6A:
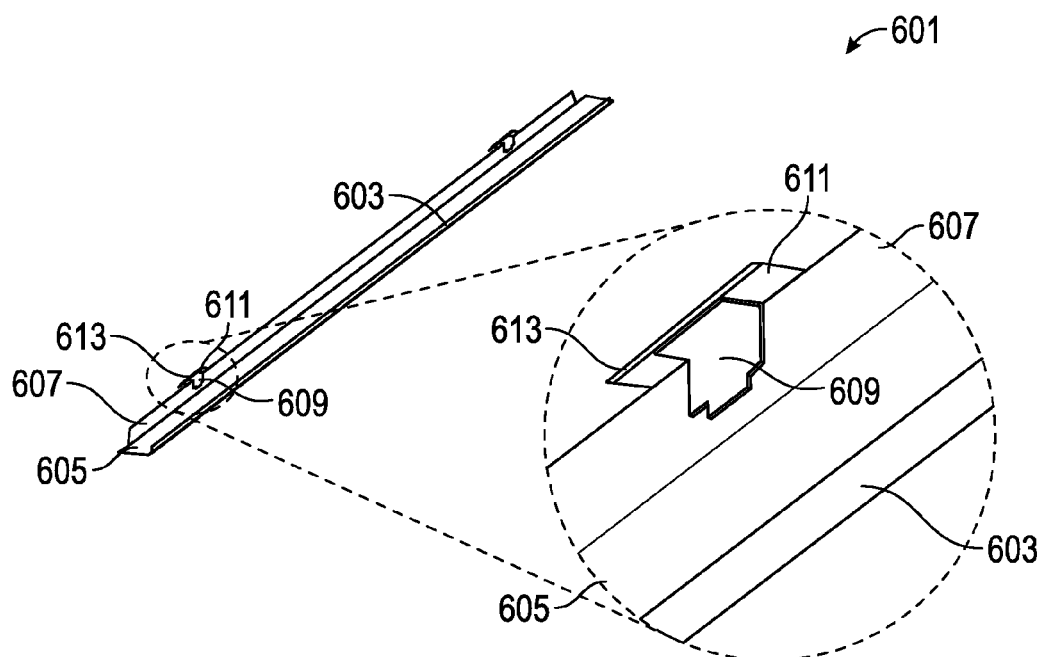
FIG. 6A is an illustration of an adaptor bracket according to an exemplary embodiment.
Figure 6B:
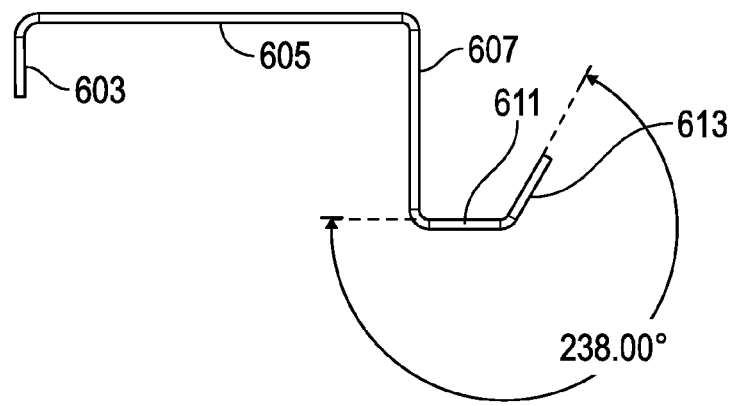
FIG. 6B is an illustration of a profile view of an adaptor bracket according to an exemplary embodiment.
Figure 6C:
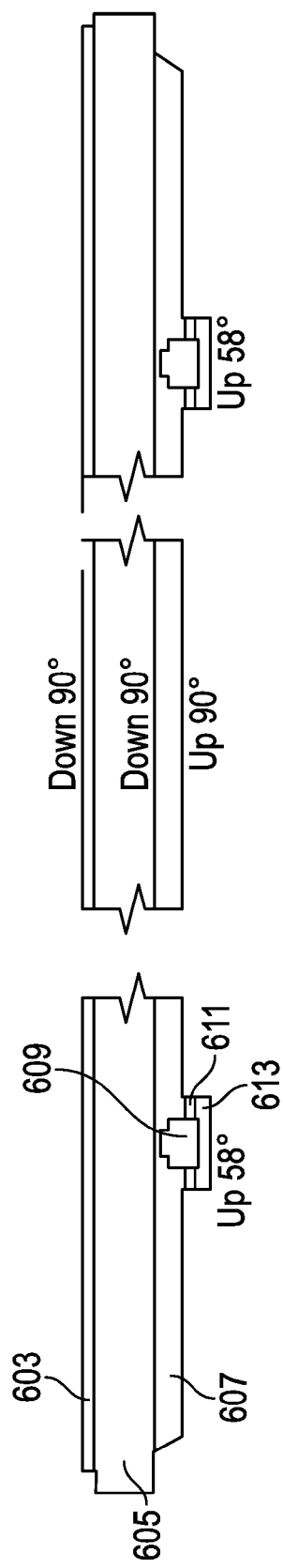
FIG. 6C is an illustration of an unfolded adaptor bracket according to an exemplary embodiment.

Referring now to FIGS. 6A-6C, adaptor bracket 601, one embodiment of adaptor bracket 103 previously described herein, is illustrated according to an exemplary embodiment. As previously described herein, adaptor bracket 103, and the embodiment of adaptor bracket 601 illustrated herein, is configured for use in retrofitting an existing troffer light fixture 207. Adaptor bracket 601 can be placed between a troffer housing 209 of an existing troffer light fixture 207 and a T-bar 201 of a ceiling system. Troffer housing 209 keeps adaptor bracket 601 in place in some embodiments (e.g., the weight of troffer housing 209). Adaptor bracket 601 includes a plurality of slots 609 which accept both a hinge 303 and latch 301 depending on which is inserted into slot 601. Door assembly 101 is hung from the slots 609 on one adaptor bracket 601 using hinges 303 and is latched in a closed position by securing latches 301 through slots 609 on a second adaptor bracket. The second adaptor bracket 601 is located on the opposite side of troffer housing 209 from the first adaptor bracket 601.

Advantageously, the use of two adaptor brackets 601 allows door assembly 101 to be hung under troffer housings 209 of existing troffer light fixtures 207 which do not include slots aligning with or compatible with both the hinges 303 and latches 301 of door assembly 101. This increases the number of existing troffer light fixtures 207 which can be retrofit. Additionally, adaptor brackets 601 are configured, in some embodiments, such that slots 609 can accept either a latch 301 or hinge 303 of door assembly 101. The slots 609 on adaptor brackets 601 may also be spaced such that each slot 609 (of two slots 609) is an equal distance from the end of adaptor bracket 601 closet to that slot 609. Advantageously, these characteristics allow two adaptor brackets 601 to be installed without regard for which side of troffer housing 209 they are installed on. Door assembly 101 can be hung on either bracket, and door assembly 101 will be able to latch closed using the other adaptor bracket 601. This may provide a benefit or advantage by simplifying the instillation process. An installer does not need to keep track of two different adaptor brackets. Additionally, this may provide an advantage in that a plurality of existing troffer light fixtures 207 can be retrofit with door assemblies 101 such that all door assemblies 101 open in the same direction. This may simplify any maintenance which is required. Furthermore, this configuration of the adaptor brackets 601 may provide a benefit or advantage by simplifying the manufacturing process. For example, a single type of die or mold may be used.

Referring now to FIG. 6A, adaptor bracket 601 is illustrated along with a more detailed view of slot 609 and the surrounding portions according to one embodiment. Adaptor bracket 601 may be generally U shaped with a channel 605, lip 603, and side 607. Channel 605 is configured (e.g., sized) to accept a portion of troffer housing 209 of an existing troffer light fixture 607. For example, the end of troffer housing 209 or a flange of troffer housing 209 can rest on or in channel 605. The weight of troffer housing 209 may secure adaptor bracket 601 against a T-bar 201 of the ceiling system.

In some embodiments, adaptor bracket 601 includes lip 603. Lip 603 can engage with an end or flange of troffer housing 209. Lip 603 can prevent adaptor bracket 601 from sliding horizontally and away from T-bar 201. Troffer housing 209 may push against lip 603 in the direction of T-bar 201.

Figure 10A:
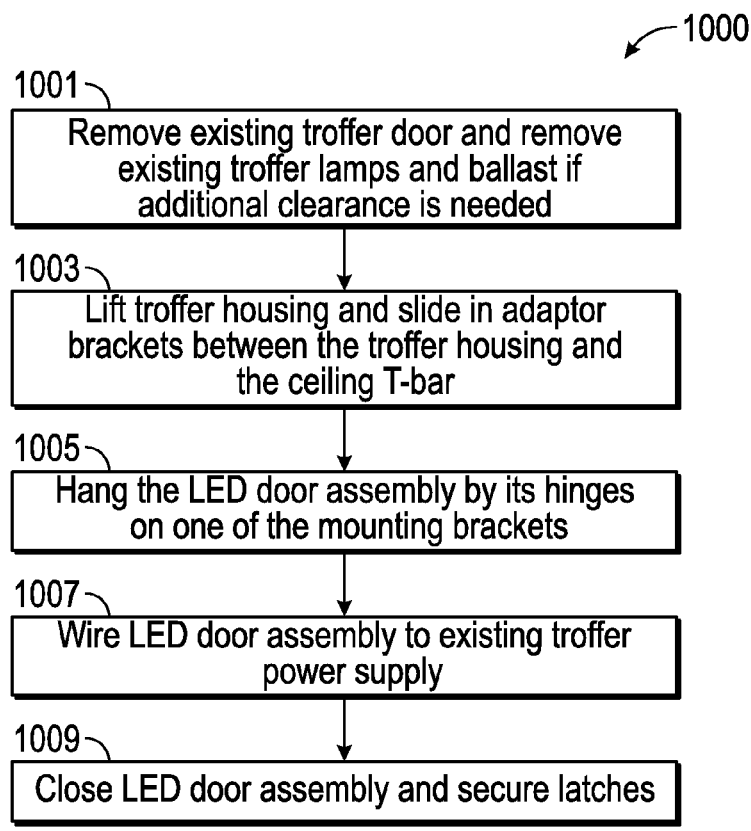
FIG. 10A is an illustration of flow chart for retrofitting an existing troffer light fixture using a door assembly and adaptor brackets according to an exemplary embodiment.
Figure 10B:
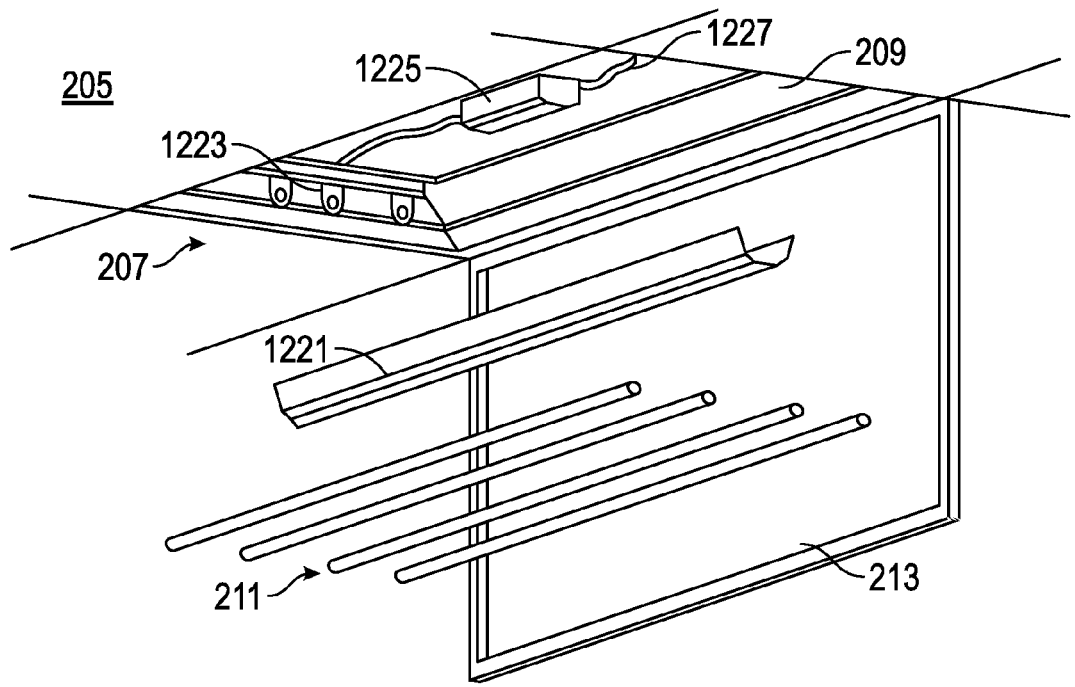
FIG. 10B is an illustration of an existing troffer light fixture and components which may be removed according to an exemplary embodiment.
Figure 10C:
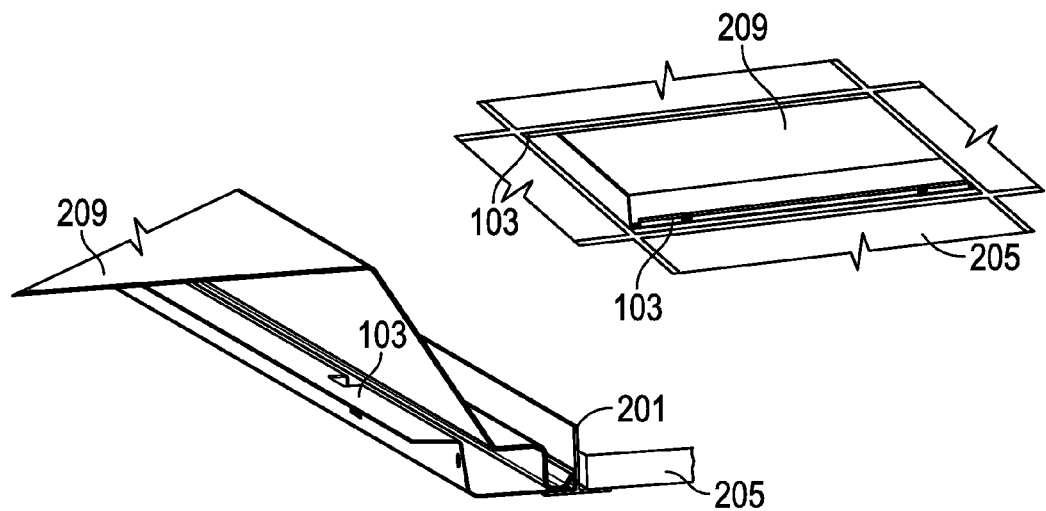
FIG. 10C is an illustration of an adaptor bracket inserted between a troffer housing and a T-bar according to an exemplary embodiment.

Referring now to FIGS. 6A and 10C, adaptor bracket 601 can include a channel 605 which extends beyond T-bar 201. Channel 605 may extend from T-bar 201 such that side 607 is positioned to extend within troffer housing 209. Advantageously, this may allow slots 609 of adaptor bracket 601 to be higher than the lowest surface of troffer housing 209. This allows door assembly 101 to be mounted using slots 609 in such a way as door assembly 101 is flush or nearly flush with troffer housing 209. This may improve the aesthetics of an existing troffer light fixture 207 retrofit using troffer door retrofit system 100.

In alternative embodiments, side 607 may be at an angle to channel 605. This may allow channel 605 to be narrower (e.g., approximately the width of the end or flange of troffer housing 209). Side 607 can extend vertically and horizontally such that slot 609 is positioned within troffer housing 209. In further alternative embodiments, side 607 may be at a downward angle relative to channel 605. This may lower slot 609 relative to troffer housing 209 of existing troffer light fixture 207. Advantageously, this may provide move clearance for door assembly 101 to fit at least partially within troffer housing 209 when hung and closed. This may make troffer door retrofit system 100 compatible with a wider variety of existing troffer light fixtures 207.

Referring again to FIG. 6A, side 607 includes slot 609. Slot 609 is configured to accept hinge 303 of door assembly 101 such that door assembly 101 can be hung from adaptor bracket 601 using slot 609. Slot 609 is configured to have a large opening and a small opening. As previously described, the large portion of the opening allows hinge 303, including extended portions 327 to be inserted through slot 609. Slot 609 also includes a smaller portion. When hinge 303 is lowered after being inserted into slot 609, the smaller portion of slot 609 prevents hinge 303 from exiting slot 609 (e.g., extended portions 327 are larger than the smaller opening of slot 609).

Slot 609 also extends to and into latch surface 611. Latch surface 611 is a horizontal surface onto which hook portion 333 of latch 301 engages. Hook portion 333 of latch 301, when engaged, cannot exit slot 609 due to interference of latch surface 611. When latch 301 is in a disengaged position, hook portion 333 is rotated vertically and can exit slot 609.

In alternative embodiments, latch surface 611 is at an angle to side 607. In further alternative embodiments, slot 609 does not extent into latch surface 611. For example, latch surface 611 may contain, be made of, or include magnetic material or a magnet. Latch 301 may include a magnet as previously described for securing door assembly 101 to adaptor bracket 601.

In some embodiments, adaptor bracket 601 further includes flange 613. Flange 613 may extend at a downward angle from latch surface 711. Flange 613 may prevent accidental removal of hinge 303 from slot 609 by partially overhanging slot 609 and limiting access thereto. In other embodiments, adaptor bracket 601 does not include flange 613.

Figure 7:
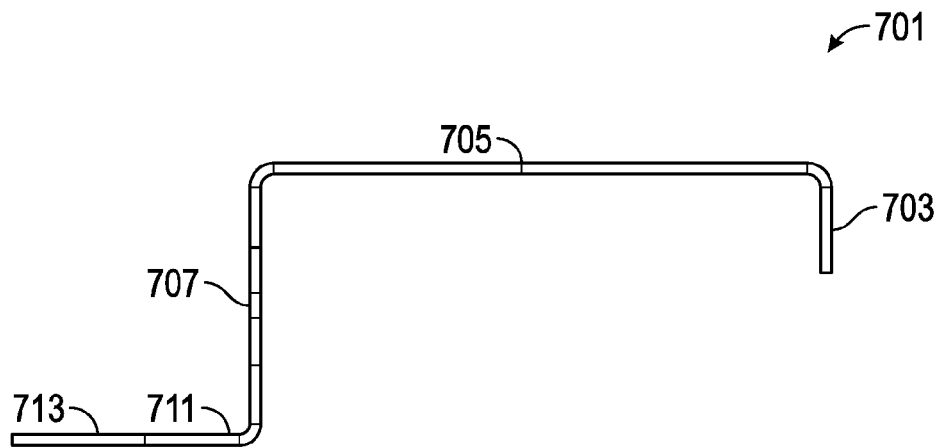
FIG. 7 is an illustration of a profile view of an adaptor bracket according to one embodiment.

Referring now to FIG. 7, a profile 701 of an embodiment of adaptor bracket 301 having no flange is illustrated according to one embodiment. The adaptor bracket 103 includes lip 703, channel 705, side 707, latch surface 711 and a slot (not pictured). These components may have the same characteristics as those discussed with reference to FIGS. 6A-6C. Latch surface 711 extends from side 711. Any flange portion 713 is not at an angle to latch surface 711. Effectively, adaptor bracket 103 does not include a flange 713 but rather has an elongated latch surface 711. Latch surface 711 can run for the entire length of adaptor bracket 103, or a substantial, majority, or supermajority portion thereof. Advantageously, this may simplify manufacturing of adaptor bracket 103 as material. For example, material may not be removed to form two distinct latch surfaces 711 (e.g., as illustrated in FIG. 6A with reference to latch surfaces 611). Fewer cuts may be required to produce adaptor bracket 601. In embodiments where the latch surface 711 runs for the entire or a large portion of the length of adaptor bracket 103, an additional advantage may be provided in that latch surface 711 (or latch surface 611 as illustrated in FIG. 6A) covers the empty space between door assembly 101 and troffer housing 209 of the existing troffer light fixture 207. This can provide a befit in that contaminants may be prevented, in whole or in part, from entering the ceiling system, airflow may be prevented, in whole or in part, from exiting the ceiling system (e.g., in a plenum rated ceiling application), and/or the retrofit light fixture may have a more aesthetically pleasing appearance.

Referring again to FIG. 6A, as illustrated, latch surface 611 and/or flange 613 may run for only a portion of the length of adaptor bracket 601. This may allow for the use of adaptor bracket 601 and troffer door retrofit system 100 with plenum rated ceilings (e.g., ceiling systems in which air returning to or being supplied by a heating ventilation and/or air condition system moves through the plenum space created by the drop ceiling and the structural ceiling). The ceiling system in which the troffer door retrofit system 100 is installed may be used to circulate air in the building containing the ceiling system. To provide for air returns or air supply to or from the plenum space in the ceiling system, adaptor bracket 601 can be vented. Latch surface 611 and/or flange 613 may run for only a portion of the length of adaptor bracket 601 to provide for venting. When hung using hinges 303, latches 301, and the corresponding slots 609 and latch surfaces 611 of adaptor brackets 601, door assembly 101 may be separated from adaptor bracket 601 by a distance. In some embodiments, this distance is substantially the width of attachment surface 611 and/or flange 613. Therefore, in embodiments in which latch surface 611 and/or flange 613 do not run the entire length of adaptor bracket 601, a vent space is created between door assembly 101 and adaptor bracket 601. Advantageously, this vent space may be used as an air supply or air return for use in a plenum ceiling system (e.g., for return of room air and/or supply of conditioned air in a heating ventilation and/or air conditioning system). This feature of some embodiments of troffer door retrofit system 100 can be used to add additional supplies or returns when retrofitting existing troffer light fixtures 207 of a plenum ceiling system. This feature can also be used to retrofit existing troffer light fixtures 207 which include a supply or return for use in a plenum ceiling system.

In alternative embodiments, lip 603 of adaptor bracket 601 engages with T-bar 201. For example, lip 603 may be or include a hook which engages the vertical portion of T-bar 201. The hook portion of lip 601 may slip over the vertical portion of T-bar 201. Advantageously, this may prevent adaptor bracket 601 from moving horizontally relative to T-bar 201. Furthermore, adaptor bracket 601 may be held in place by the hook portion without relying on or using the weight of troffer housing 209 to secure adaptor bracket 601.

In other alternative embodiments, adaptor bracket 601 does not rest on or connect to T-bar 201. For example, adaptor bracket 201 may be mounted to troffer housing 209 of an existing troffer light fixture 207. Adaptor bracket 601 may include a hook, latch or other mechanism to attach adaptor bracket 601 to troffer housing 209 using existing slots in troffer housing 209.

Referring now to FIG. 6B, a profile view of adaptor bracket 601 is illustrated according to one embodiment. Adaptor bracket 601 may be produced by folding sheet metal in some embodiments. The result may be the profile as illustrated. Lip 603 may be at a 90 degree angle relative to channel 605. Side 607 may be at an additional 90 degree angle relative to channel 605. A further 90 degree fold from side 607 may create latch surface 611. And, a 58 degree fold can create flange 613. These angles are illustrative only. Other angles may be used to define the portions of adaptor bracket 601 described herein. The angles described herein may be include radii or be chamfered in some embodiments.

Referring now to FIG. 6C, adaptor bracket 601 is illustrated prior to being folded according to one embodiment. A piece of sheet metal may be cut to provide the shape and dimensions of adaptor bracket 601. Slot 609 may also be cut from the sheet metal. The sheet metal may then be folded to create adaptor bracket 601 as described herein.

In some embodiments, adaptor bracket 601 is made of metal as previously described. For example, adaptor bracket 601 may be made of or include galvanized steel, aluminum, or other metals or alloys. In other embodiments, adaptor bracket 601 may be made of other materials. For example, adaptor bracket 601 may be made of polymers such as acrylic, polyvinyl chloride, or other plastics. As previously discussed, adaptor bracket 601 may be made using folding techniques. In other embodiments, adaptor bracket 601 may be made using other techniques. For example, adaptor bracket 601 may be made using techniques such as injection molding, casting, machining, and/or a combination of these and other techniques.

Figure 8A:
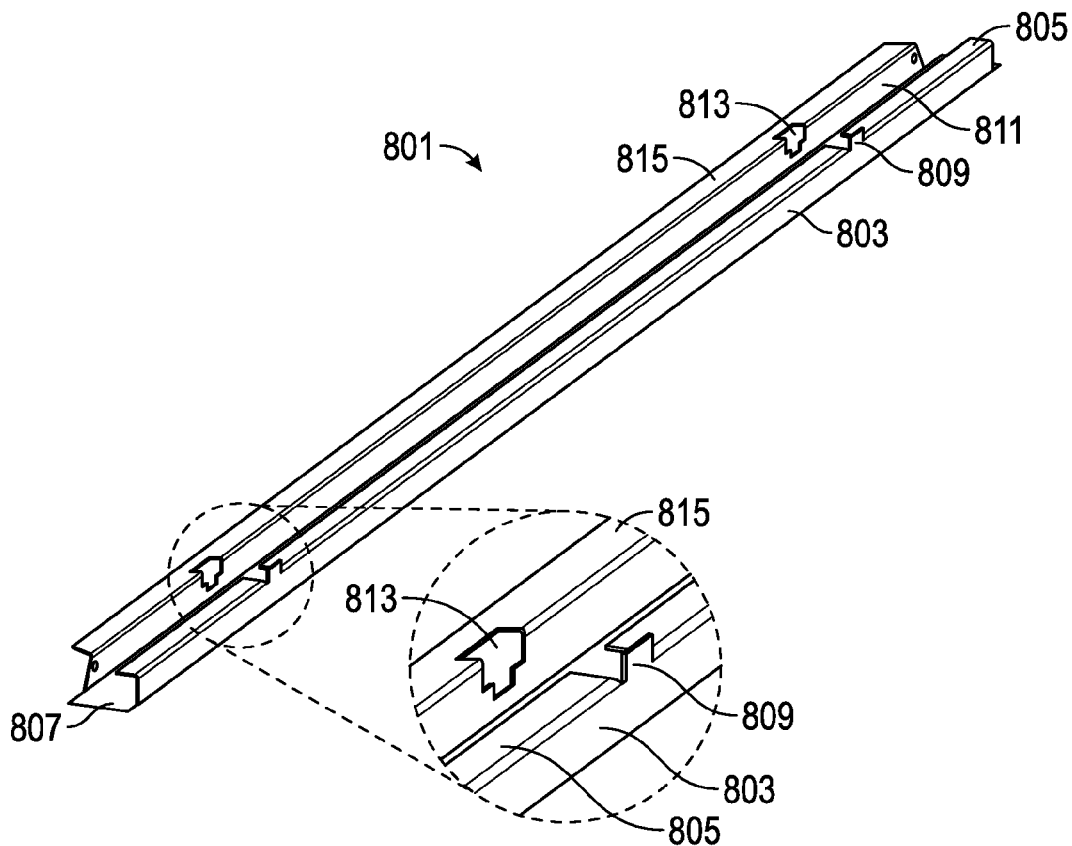
FIG. 8A is an illustration of an alternative adaptor bracket according to an exemplary embodiment.
Figure 8B:
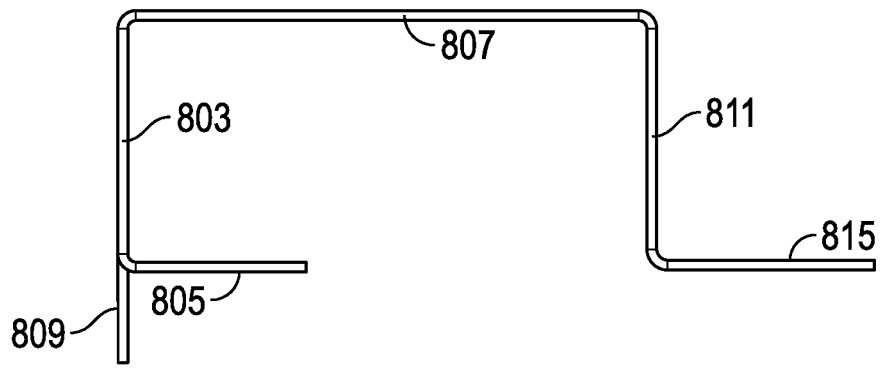
FIG. 8B is an illustration of a profile view of an alternative adaptor bracket according to an exemplary embodiment.
Figure 8C:
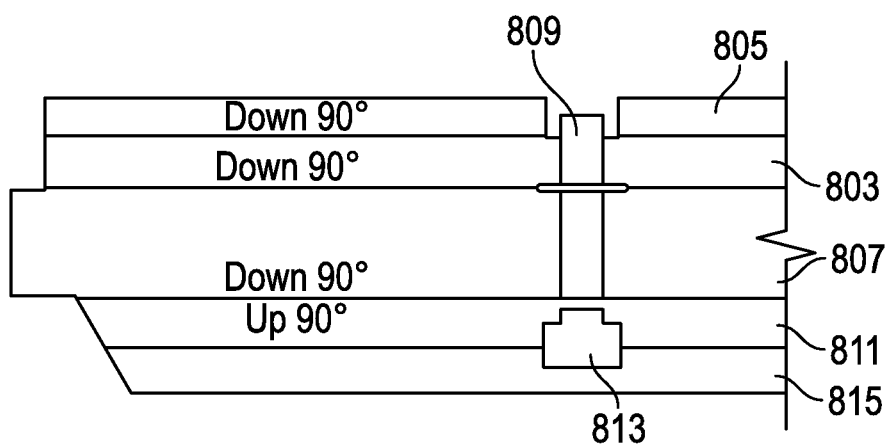
FIG. 8C is an illustration of an alternative unfolded adaptor bracket according to an exemplary embodiment.

Referring now to FIGS. 8A-8C, adaptor bracket 801, one embodiment of adaptor bracket 103 previously described herein, is illustrated according to an exemplary embodiment. Adaptor bracket 801 is configured to rest, at least partially, on T-bar 201. Adaptor bracket 801 is further configured to engage with an end or flange of a troffer housing 209 of an existing troffer light fixture 207. As previously described, adaptor bracket 801 includes slots 809 which allows door assembly 101 to be hung from or latched to adaptor bracket 801. Generally, the description of adaptor bracket 601 with reference to FIGS. 6A-6C is applicable to adaptor bracket 801. For example, the materials and manufacturing techniques may be the same. Additionally, similar parts may perform similar functions.

Referring now to FIG. 8A, adaptor bracket 801 includes channel 807, first side 803, and second side 811. The end of or a flange of a troffer housing 209 of an existing troffer light fixture 207 can be received by these components. This may allow the weight and geometry of troffer housing 209 to keep adaptor bracket 801 in place on T-bar 201. Channel 807 can rest on T-bar 201.

In some embodiments, first side 803 prevents adaptor bracket 801 from moving horizontally and away from T-bar 201. Troffer housing 209 and first side 803 interfere with one another such that horizontal movement away from T-bar 201 is prevented. In some embodiments, first side 803 may be in contact or nearly in contact with the vertical portion of T-bar 201. This may prevent or substantially limit horizontal movement of adaptor bracket 801 towards T-bar 201 as T-bar 201 and first side 803 would interfere.

In some embodiments, adaptor bracket 801 further includes flange 805. Flange 805 can extend from first side 803 over channel 807. In some embodiments, flange 805 engages with and end of or flange of troffer housing 209. Flange 805 may assist in preventing adaptor bracket 801 from moving relative to troffer housing 209 and/or T-bar 201. Flange 805 may also prevent troffer housing 209 from inadvertently exiting channel 807.

First side 803 and flange 805 may include one or more tabs 809. Tabs 809 and flanges 805 can be used to elevate the troffer housing 209 of an existing troffer light fixture 207 which is being retrofit with troffer door retrofit system 100. The troffer housing 209 can rest on top of flange 805. This lifts the troffer housing 209 to a higher position than as installed (e.g., resting on T-bar 201). Channel 807 rests on T-bar 201 with flange 805 elevated above channel 807 and T-bar 201 by first side 803. The troffer housing 209 is elevated above T-bar 201 as it rests on flange 805. Tabs 809 advantageously prevent adaptor bracket 801 from sliding horizontally and away from T-bar 201. Tabs 809 can contact the edge of troffer housing 209 resting on flange 805 and this interference prevents adaptor bracket 801 from becoming disengage from T-bar 201 and/or troffer housing 209.

Advantageously, lifting troffer housing 209 of existing troffer light fixture 207 higher in relation to the T-bar 201 provides additional space in which to hang door assembly 101. This provides an advantage in that troffer door retrofit system 100 is compatible with existing troffer light fixtures 207 with a shallower troffer housing 209. The troffer housing 209 is lifted by adaptor bracket 801 including flange 805 providing more space to hang door assembly 101. Therefore, troffer door retrofit system 100 is compatible with a wider range of existing troffer light fixtures 207. Additionally, the additional space provided by adaptor bracket 801, may reduce, partially or completely, the number of components (e.g., ballast, ballast cover, lamps, etc.) which are removed from existing troffer light fixture 207 to make room for door assembly 101 when closed (e.g., latched and extending into troffer housing 209).

Adaptor bracket 801 can provide an additional advantage in that adaptor bracket 801 can be used for standard retrofitting and retrofitting in which additional space is needed. A single adaptor bracket 801 can be used for either case, reducing the types of adaptor brackets 103 which are manufactured or provided. In a standard installation, troffer housing 209 can be inserted into adaptor bracket 801 such that the edge of troffer housing 209 rests in channel 807 and is secured by first side 803 and/or flange 805. In an installation in which additional space is desired, troffer housing 209 can be lifted and placed on adaptor bracket 801. The edge of troffer housing 209 can rest on top of flange 805. The edge of troffer housing 209 can be secured with tabs 809.

Adaptor bracket 801 further includes second side 811, latch surface 815, and slot 813. As described with reference to corresponding components in FIGS. 6A-6C, these components allow door assembly 101 to be hung from adaptor bracket 801 or latched to adaptor bracket 801 using hinges 303 and latches 301 respectively.

Referring now to FIG. 8B, a profile view of adaptor bracket 801 is illustrated according to one embodiment. Adaptor bracket 801 may be produced by folding sheet metal in some embodiments. The result may be the profile as illustrated latch surface 815 may be at a 90 degree angle to second side 811 which in turn is at a 90 degree angle from channel 807, First side 803 may also be at a 90 degree angle from channel 807. Tab 809 may continue at the same angle as first side 803 relative to channel 807. Flange 805 may be at a 90 degree angle from first side 803. These angles are illustrative only. Other angles may be used to define the portions of adaptor bracket 801 described herein. The angles described herein may be include radii or be chamfered in some embodiments.

Referring now to FIG. 6C, a portion of adaptor bracket 801 is illustrated prior to being folded according to one embodiment. A piece of sheet metal may be cut to provide the shape and dimensions of adaptor bracket 801. Slot 813 may also be cut from the sheet metal. The sheet metal may then be folded to create adaptor bracket 801 as described herein.

Generally, one or more of the previously described features or components of adaptor brackets 103 can be combined with features or components from alternatively described embodiments. Other combinations and embodiments are possible.

Figure 9:
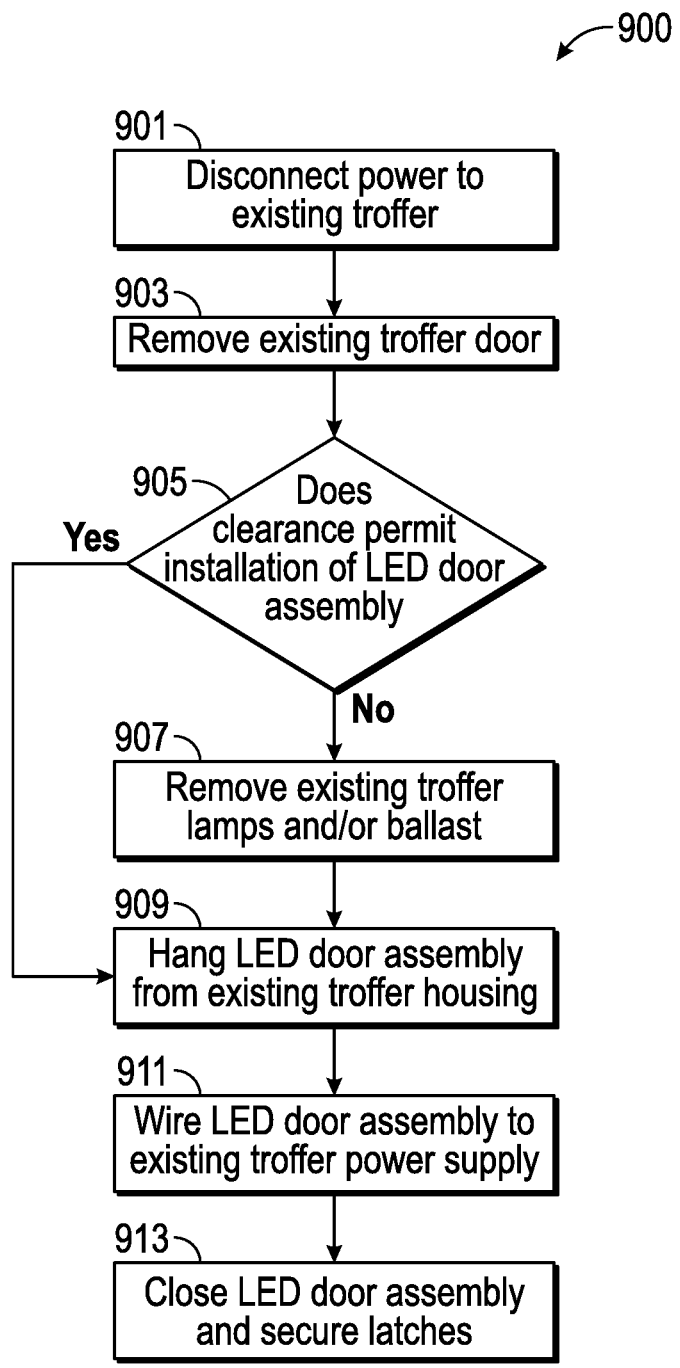
FIG. 9 is an illustration of flow chart for retrofitting an existing troffer light fixture using a door assembly according to an exemplary embodiment.

Referring now to FIG. 9, a flow chart of method 900 for retrofitting an existing troffer light fixture 207 using troffer door retrofit system 100. An installer disconnects power to the existing troffer light fixture 207 (901). For example, an installer may turn off a light switch which controls the electrical supply (e.g., interrupts the electrical supply) to existing troffer light fixture 100. As an alternative example, an installer can disconnect power to existing troffer light fixture 207 using a breaker.

The installer can remove the door of the existing troffer light fixture 207 (903). In some embodiments, the installer removes the door after disconnecting the power. In alternative embodiments, the installer removes the door prior to turning of the power. As previously described herein, the existing troffer light fixture 207 can include a door. The door may be or include the lens or a louver of the existing troffer light fixture 207. Removing the door can include unlatching the door from the troffer housing 209 of the existing troffer light fixture 207. Removing the door can also include unhinging the door from the troffer housing 209. For example, the hinges of the door may be lifted out of slots included in the troffer housing 209.

The installer may determine if clearance in the housing 209 of the existing troffer light fixture 207 is sufficient to permit installation of door assembly 101 (905). This can include taking one or measurements. This may also or alternatively include consulting an instruction manual with instructions for retrofitting a particular existing troffer light fixture 207. For example, the instruction manual may have been prepared with the knowledge of the clearances of many types of existing troffer light fixtures 207. Based on the particular make or model of the existing troffer light fixture 207 being retrofit, the instructions may instruct the installer that clearance does or does not permit installation of door assembly 101 without removing one or more components of existing troffer light fixture 207.

If clearance does not permit installation of door assembly 101, the installer can remove lamps, a ballast cover, and/or the ballast of existing troffer light fixture 207 (907). Removing these components, a subset of these components, and/or other components of existing troffer light fixture 207 can provide sufficient clearance for the installation of door assembly 101.

If clearance does permit instillation of door assembly 101, lamps, a ballast cover, ballast, and/or other components of existing troffer light fixture 207 may be left within troffer housing 209.

The installer can hang the door assembly 101 from the existing troffer housing 207 (909). As previously described herein, the hinges 303 of door assembly 101 can be configured to operate with slots of a troffer housing 209 of the existing troffer light fixture 207. Hanging door assembly 101 from the troffer housing 209 can include inserting hinges 303 of the door assembly 101 into a slot on troffer housing 209. Door assembly 101 can then be lowered such that hinges 303 do not exit the slots in troffer housing 209.

The installer can wire door assembly 101 to a power supply for the existing troffer light fixture 207 (909). This can include first removing power supply wires from the ballast or another component of the existing troffer light fixture 207. The power supply wires may then be wired (e.g., joined to, using a twist-on wire connector) a power supply wire for door assembly 101. The power supply wire for door assembly 101 may be extending from a cover 313, electronics housing 413, or other portion of door assembly 101. The installer may also complete any wiring for other components of door assembly 101. For example, the installer may wire other electronics of door assembly 101 such as controllers and sensors to existing or newly installed components related to existing troffer light fixture 207. Alternatively, door assembly 101 can be wired to already existing components such as controllers or sensors included in or related to existing troffer light fixture 207.

The installer can close door assembly 101 and secure latches 301 of door assembly 101 (913). This can include positioning latches 301 of door assembly 101 in the disengaged position. The door assembly 101 can be closed by pivoting it on hinges 303. As door assembly 101 is closed, latches 301 can enter slots included in troffer housing 209. The latches can then be positioned in a closed position such that latches 301 interact with troffer housing 209 to prevent door assembly 101 from opening.

If at any point prior to or during the performance of method 900, the installer determines that the hinges 303 and/or latches 301 of door assembly 101 do not align with or are otherwise incompatible with troffer housing 209 of existing troffer light fixture 207, the installer may use adaptor brackets 103 to perform the retrofit. Additionally, if the installer determines that there is insufficient clearance even after removing components of existing troffer light fixture 207, the installer can use adaptor brackets 103 to perform the retrofit.

As described above and elsewhere herein, an existing troffer light fixture 207 can be retrofit using only door assembly 101. In other embodiments described later and elsewhere herein, an existing troffer light fixture 100 can be retrofit using adaptor bracket 103 as well. Advantageously, either method of retrofitting can be performed without the use of tools. For example, no fasteners, drills, screwdrivers, wire cutters, or other tools are required to complete the retrofit. In some embodiments, even the twist-on wire connector may be salvaged from existing troffer light fixture 207. In one embodiment, no tools are required to attach any component (e.g., adaptor bracket 103) to troffer housing 209 of existing troffer light fixture 207. Advantageously, retrofitting without the use of tools may decrease the time taken to perform the retrofit. This may reduce costs and/or otherwise speed up the retrofitting of one or a plurality of existing troffer light fixtures 207. The retrofit methods described herein may also allow for retrofitting of an existing troffer light fixture 207 without disruption of existing ceiling tiles and/or without the removal of existing fixtures. This may reduce the complexity and/or risk of damage from the retrofit process.

Referring now to FIGS. 10A-10E, a retrofit method is described and illustrated according to an exemplary embodiment. This retrofit method includes the use of adaptor brackets 301. As previously described, this method may be a continuation of the method for retrofitting using door assembly 101 only (e.g., adaptor brackets 103 become necessary to retrofit existing troffer light fixture 207) in some embodiments.

Referring now to FIG. 10A, a flow chart for method 1000 of retrofitting an existing troffer light fixture 207 using adaptor bracket 103 is illustrated according to an exemplary embodiment. An installer may remove the door of an existing troffer light fixture 207 and may optionally remove components such as lamps, a ballast cover, ballast, and/or other components from the existing troffer light fixture 207 (1001). The installer can disconnect power to the existing troffer light fixture 207 prior to this if power has not already been disconnected. As previously described, components of existing troffer light fixture 207 may be removed if there is not sufficient clearance for door assembly 101. With additional reference to FIG. 10B, troffer door 213 may be removed by unlatching troffer door 219 from troffer housing 209. While troffer door 213 is hanging or after it has been removed (e.g., by lifting it from slots in troffer housing 209), the installer can remove components of existing troffer light fixture 207 such as lamps 211, ballast cover 1221, lamp holders 1223, and/or ballast 1225. If clearance permits, these components may be abandoned inside troffer housing 209 of the existing troffer light fixture 207.

Referring again to FIG. 10A, the installer can lift troffer housing 209 and slide in adaptor brackets 103 between troffer housing 209 and T-bar 201 (1003). With reference to FIG. 10C, One side of troffer housing 209 can be lifted. While lifted, adaptor bracket 203 can be inserted between troffer housing 209 and T-bar 201. The Troffer housing 209 can then be lowered. This process can be repeated for the second adaptor bracket 103.

Figure 10D:
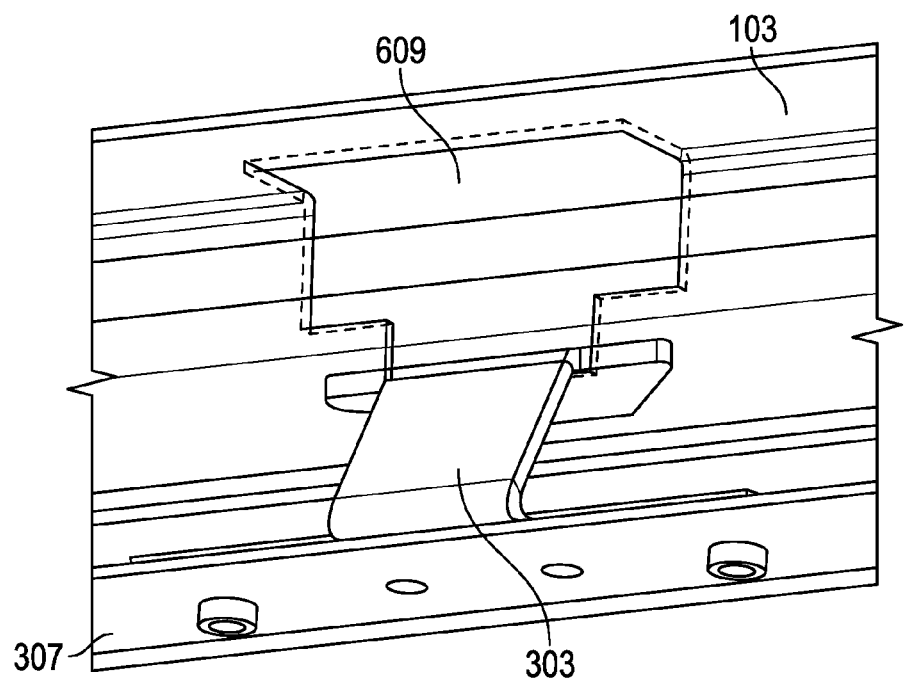
FIG. 10D is an illustration of a hinge of a door assembly inserted into a slot of an adaptor bracket according to an exemplary embodiment.
Figure 10E:
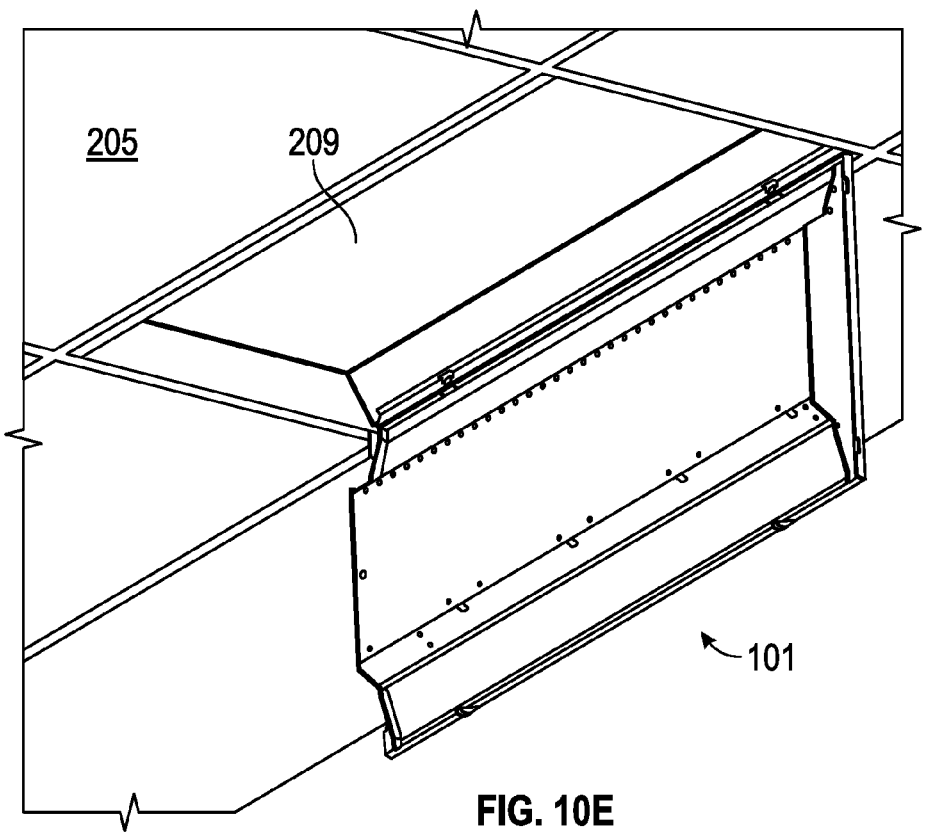
FIG. 10E is an illustration of a door assembly hung from an adaptor bracket according to an exemplary embodiment.

Referring again to FIG. 10A, the installer can hang door assembly 101 using hinges 303 from one of the adaptor brackets 103 (1005). With reference to FIGS. 10D and 10E, this can include inserting hinge 303 through slot 609 of adaptor bracket 103. Door assembly 101 can be lowered such that hinge 303 does not exit slot 609 of adaptor bracket 103.

Referring again to FIG. 10A, the installer can wire door assembly 101 to the power supply of existing troffer light fixture 207 (1007). With reference to FIG. 10B, Existing troffer light fixture 207 power supply wires 1227 may be removed from ballast 1225. Power supply wires 1227 can then be connected to supply wires extending from door assembly 101.

Figure 10F:
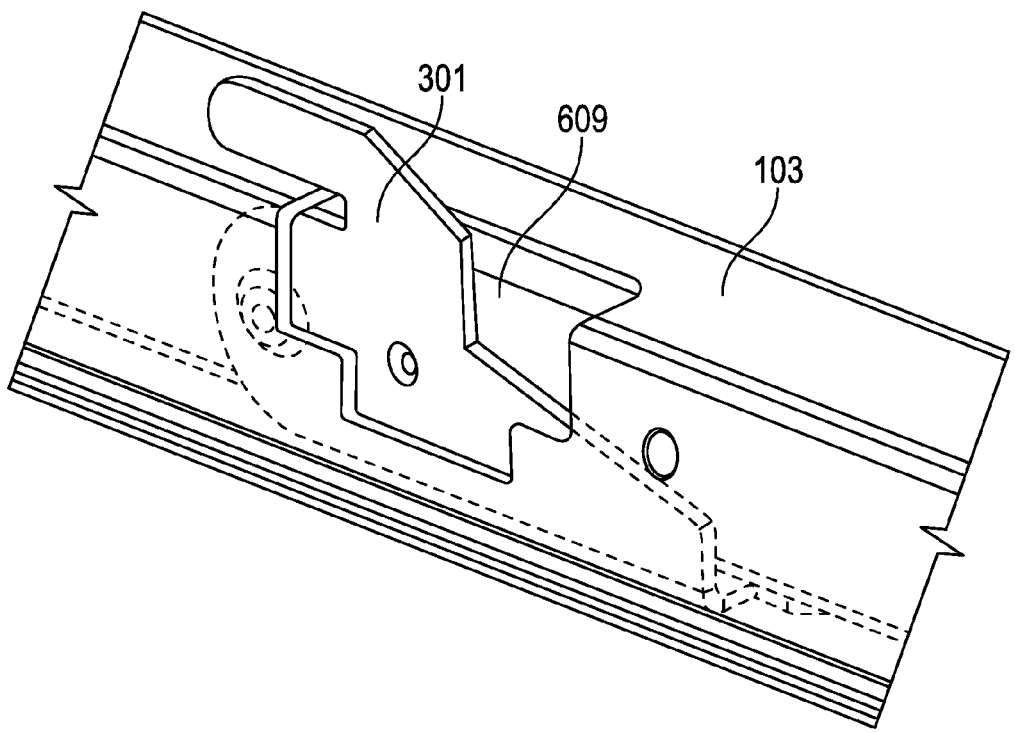
FIG. 10F is an illustration of a hinge of a door assembly engaged with an adaptor bracket according to an exemplary embodiment.
Figure 10G:
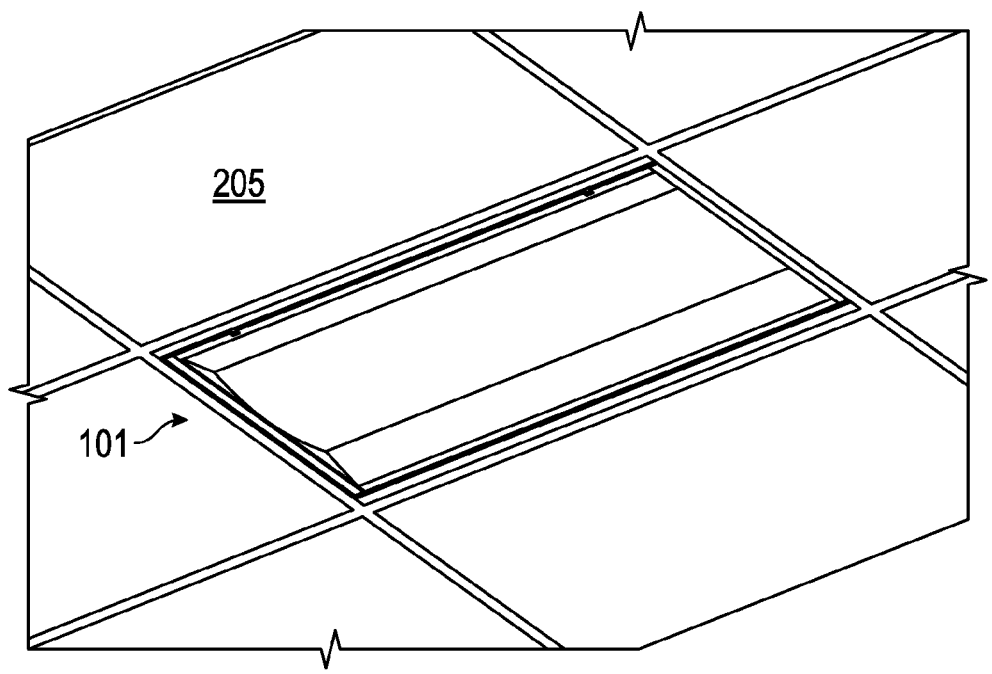
FIG. 10G is an illustration of an existing troffer light fixture which has been retrofit with a door assembly and adaptor brackets according to an exemplary embodiment.

Referring again to FIG. 10A, the installer can close door assembly 101 and secure latches 301 (1009). With reference to FIG. 10F, the installer inserts latches 301 through slot 609 of adapter bracket 103 while latches 301 are in the disengaged position and while closing door assembly 101. The installer then rotates latches 301 to the engaged position and latches 301 engage with a portion of the adaptor bracket 301. Referring now to FIG. 10G, this results in a retrofitted existing light fixture having door assembly 101.

Figure 11:
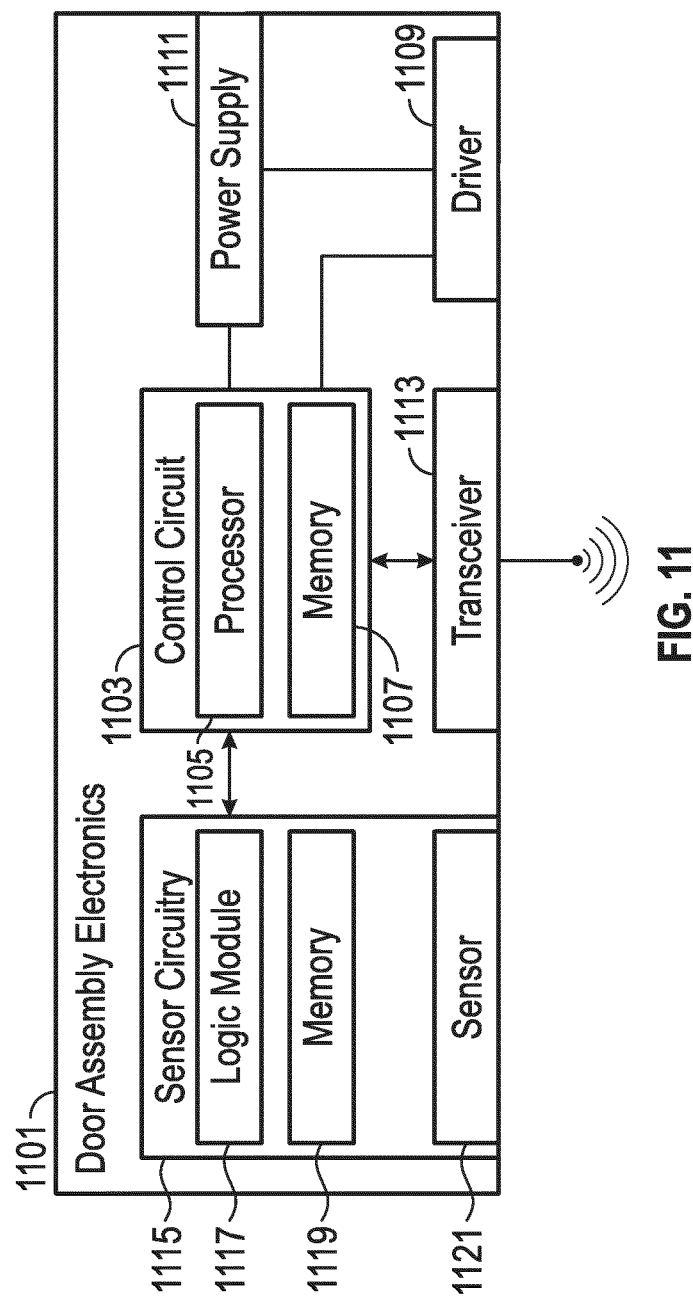
FIG. 11 is a block diagram illustrating the components of door assembly electronics included in the door assembly according to an exemplary embodiment.
Figure 12A:
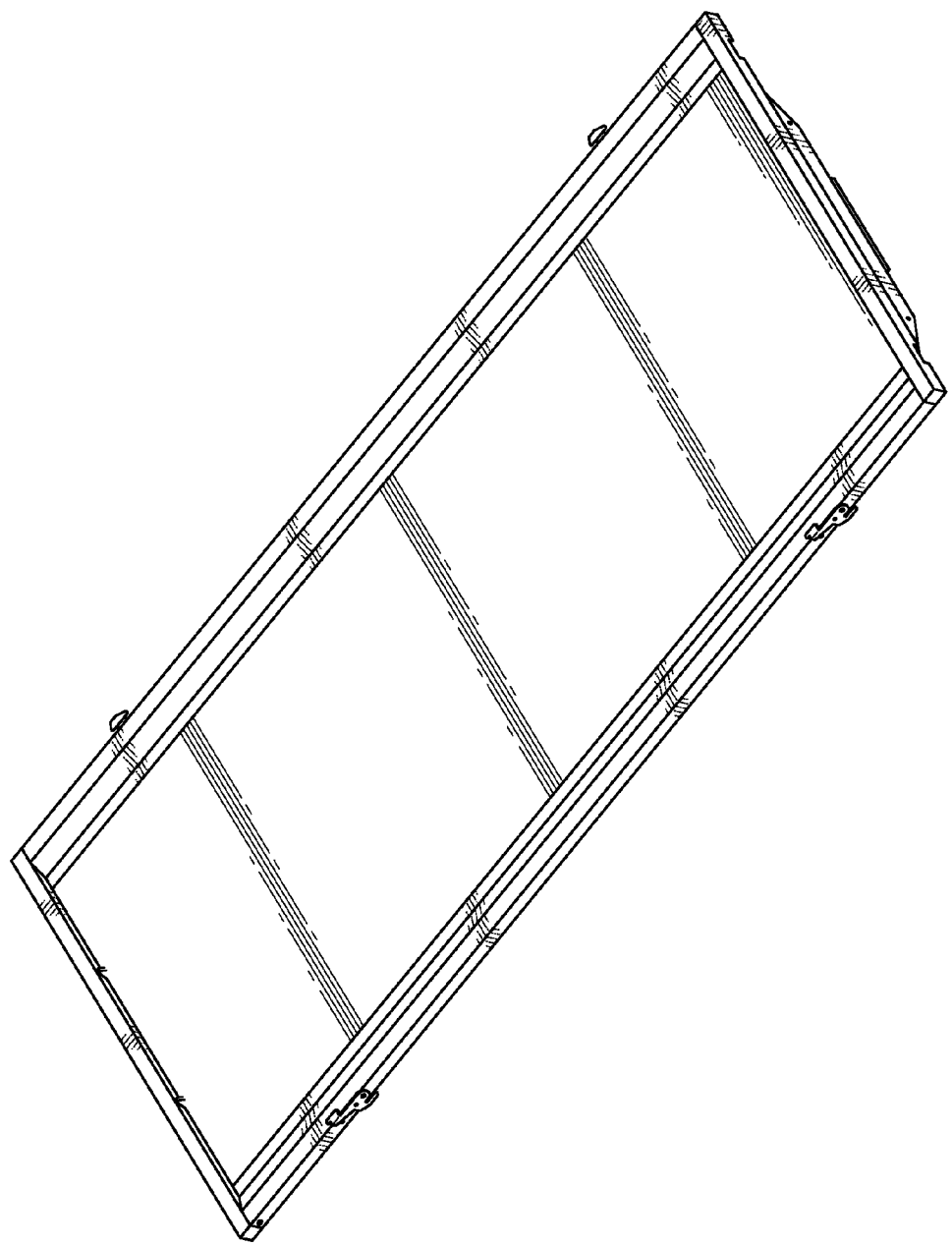
FIG. 12A is a bottom, rear, left perspective view of a door assembly having a single lens according to an exemplary embodiment.
Figure 12B:
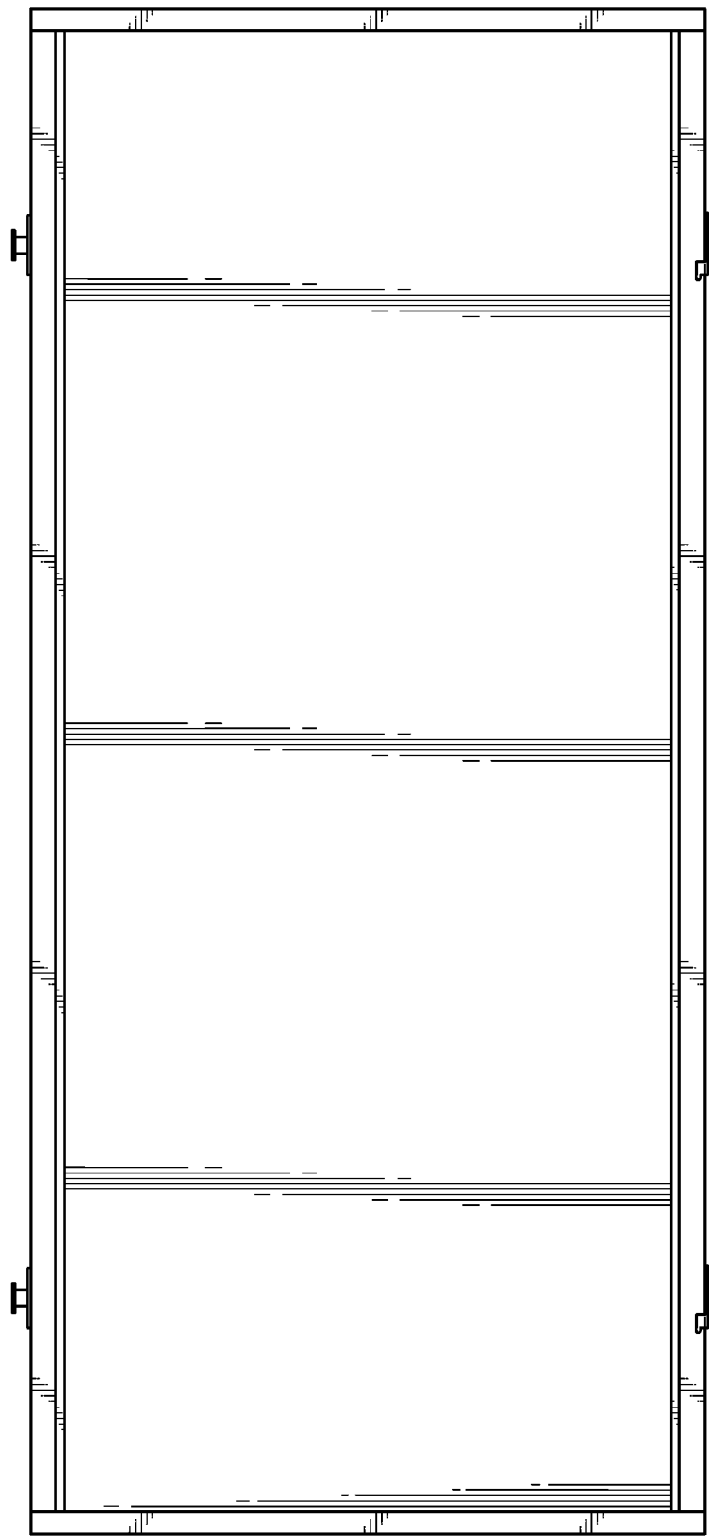
FIG. 12B is a bottom plan view of a door assembly having a single lens according to an exemplary embodiment.
Figure 12C:
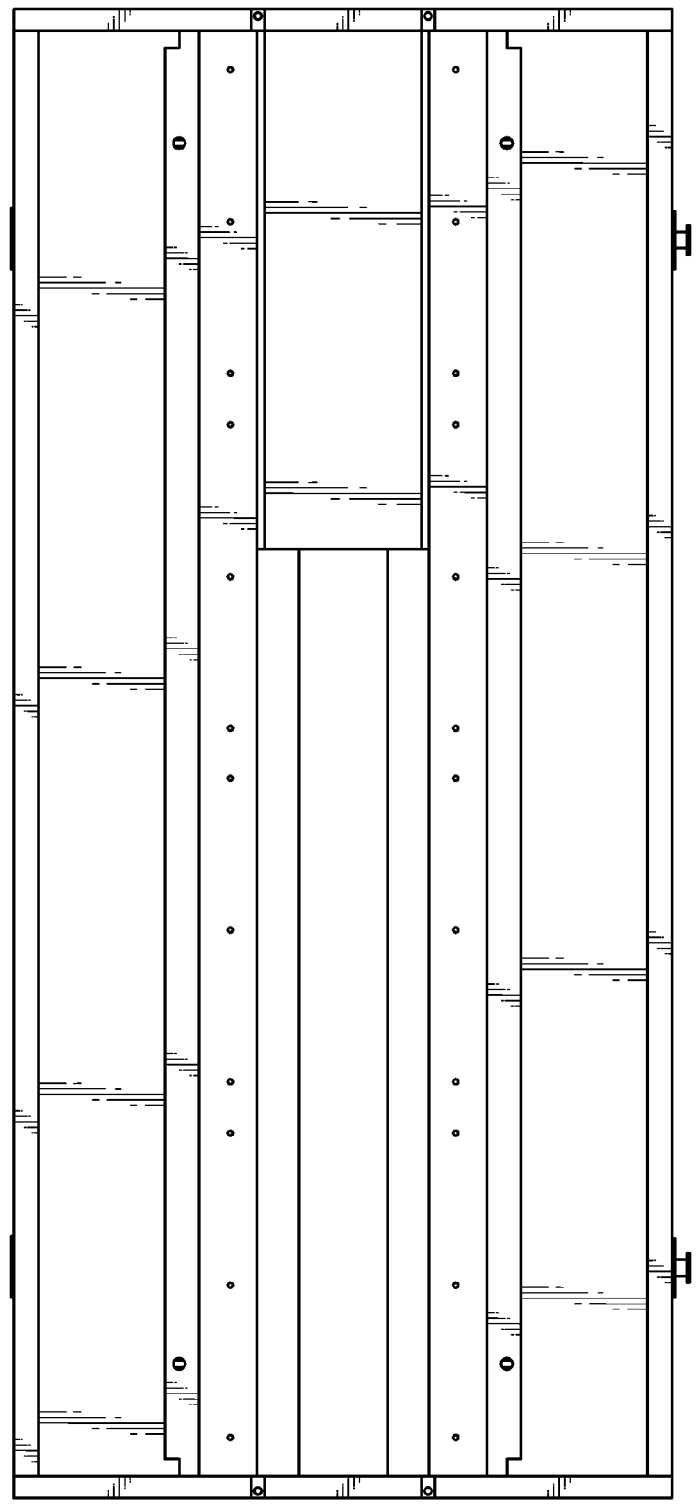
FIG. 12C is a top plan view of a door assembly having a single lens according to an exemplary embodiment.
Figure 12D:
FIG. 12D is a left elevation view of a door assembly having a single lens according to an exemplary embodiment.
Figure 12E:
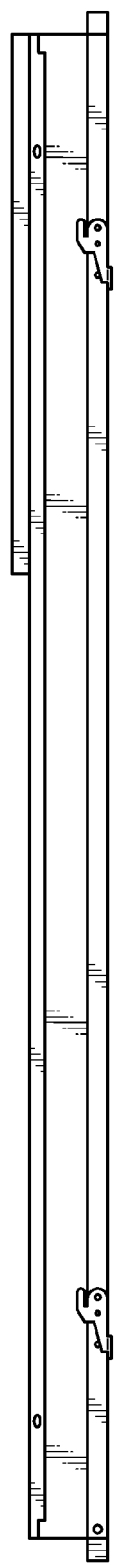
FIG. 12E is a right elevation view of a door assembly having a single lens according to an exemplary embodiment.
Figure 12F:
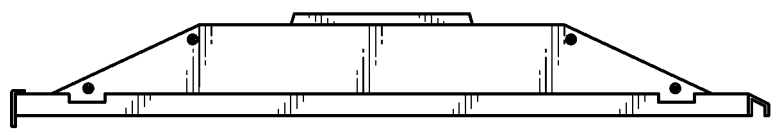
FIG. 12F is a front elevation view of a door assembly having a single lens according to an exemplary embodiment.
Figure 12G:
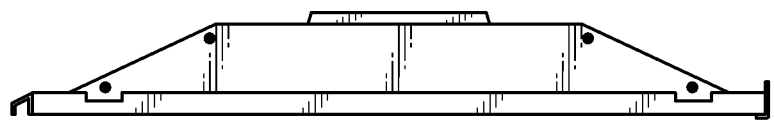
FIG. 12G is a rear elevation view of a door assembly having a single lens according to an exemplary embodiment.
Figure 13A:
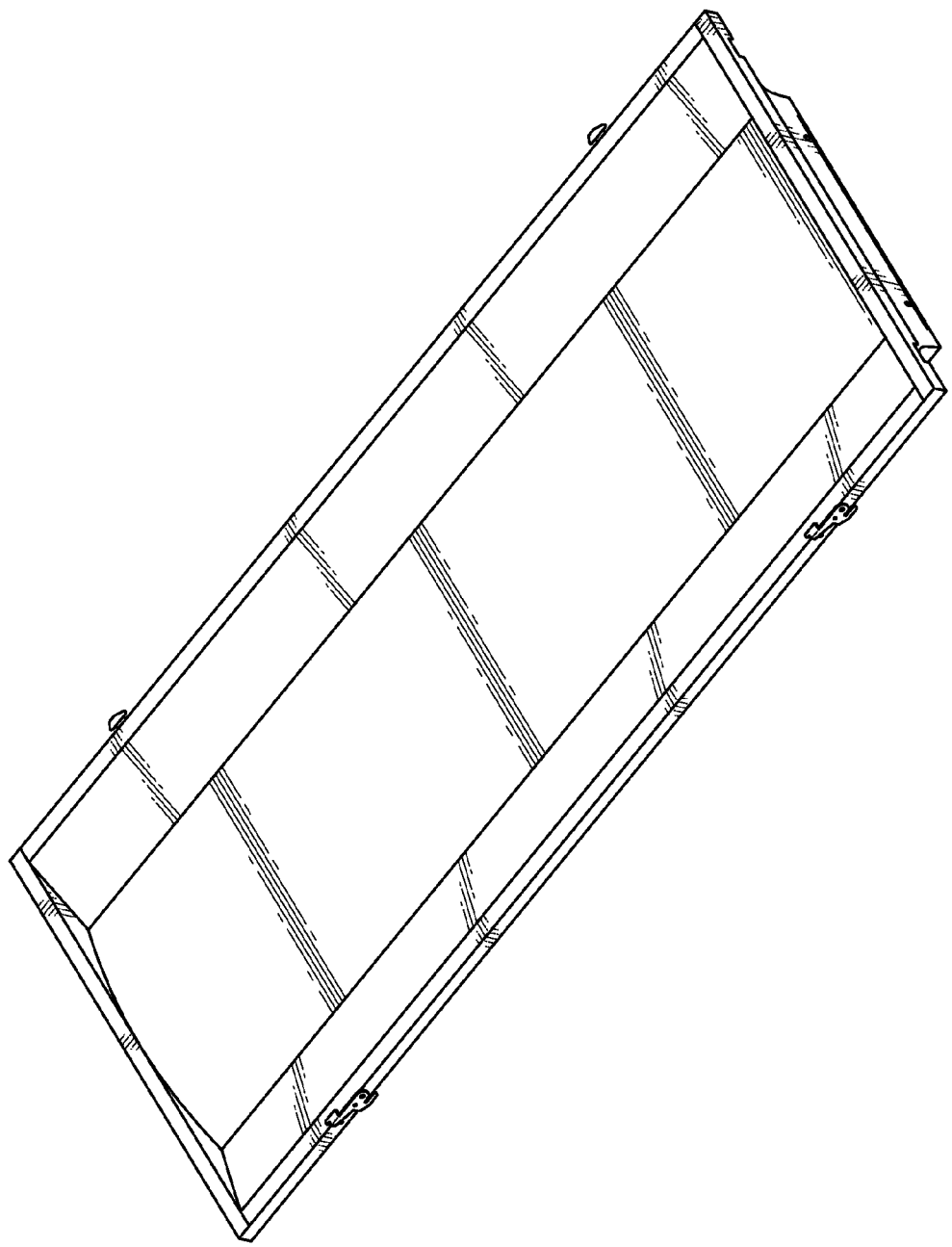
FIG. 13A is a bottom, rear, left perspective view of a door assembly having a contour lens according to an exemplary embodiment.
Figure 13B:
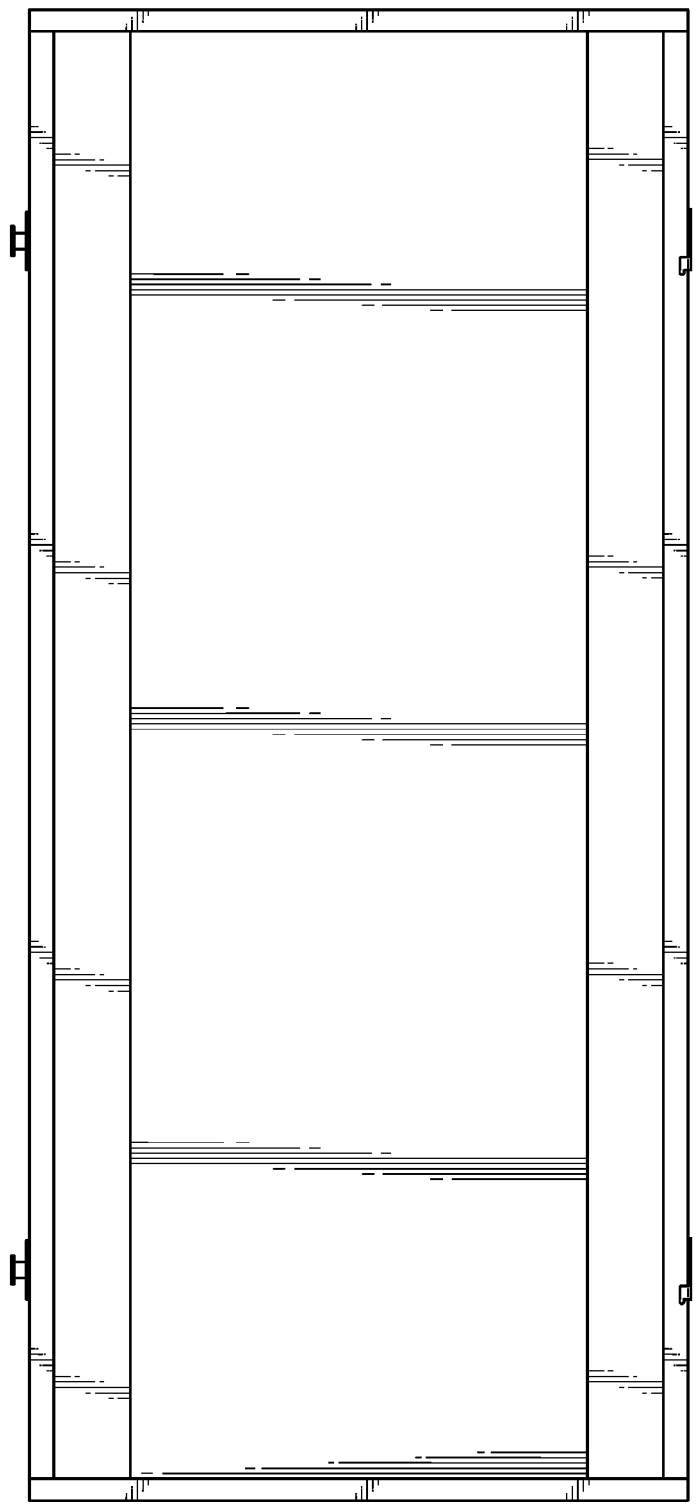
FIG. 13B is a bottom plan view of a door assembly having a contour lens according to an exemplary embodiment.
Figure 13C:
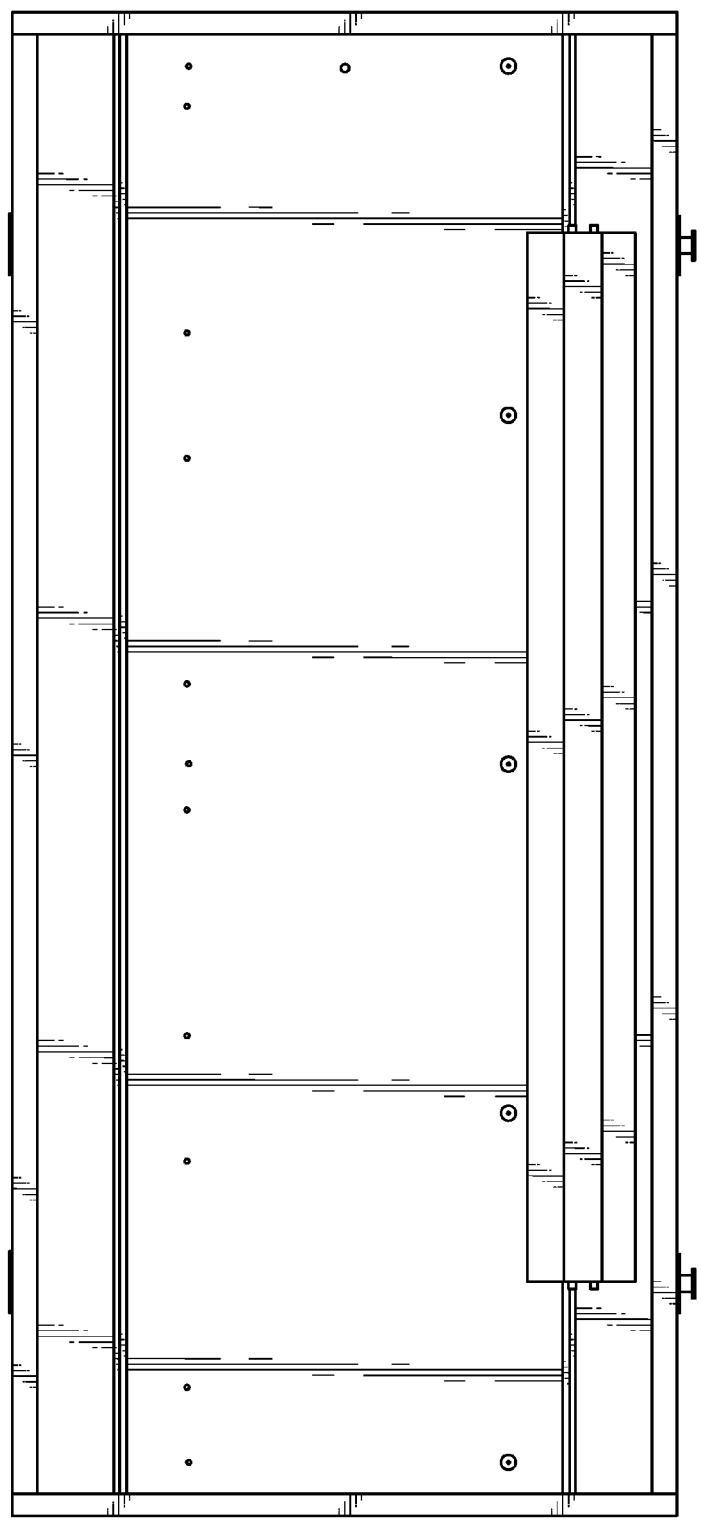
FIG. 13C is a top plan view of a door assembly having a contour lens according to an exemplary embodiment.
Figure 13D:
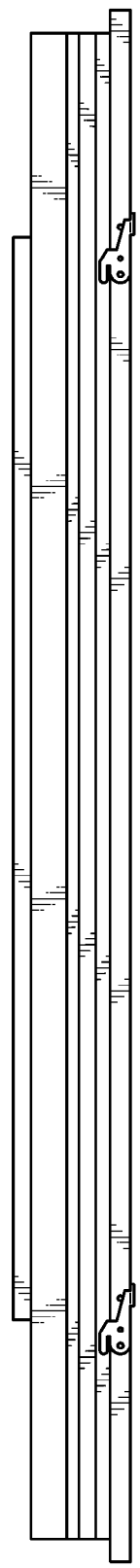
FIG. 13D is a left elevation view of a door assembly having a contour lens according to an exemplary embodiment.
Figure 13E:
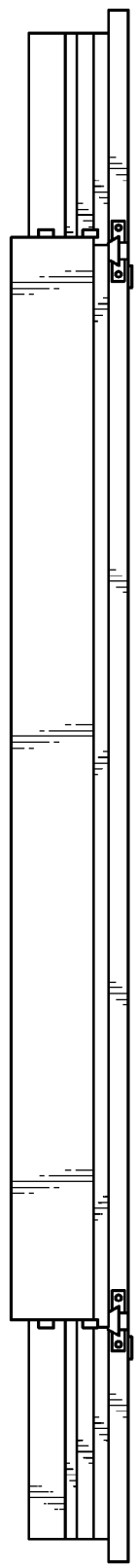
FIG. 13E is a right elevation view of a door assembly having a contour lens according to an exemplary embodiment.
Figure 13F:
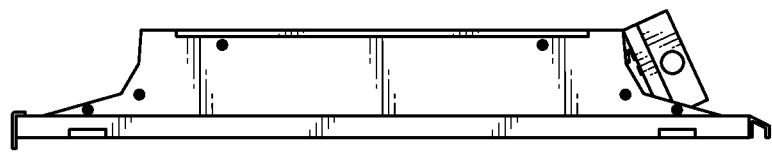
FIG. 13F is a front elevation view of a door assembly having a contour lens according to an exemplary embodiment.
Figure 13G:
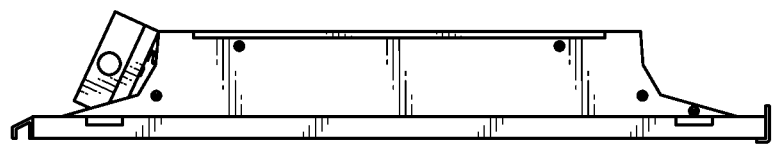
FIG. 13G is a rear elevation view of a door assembly having a contour lens according to an exemplary embodiment.
Figure 14A:
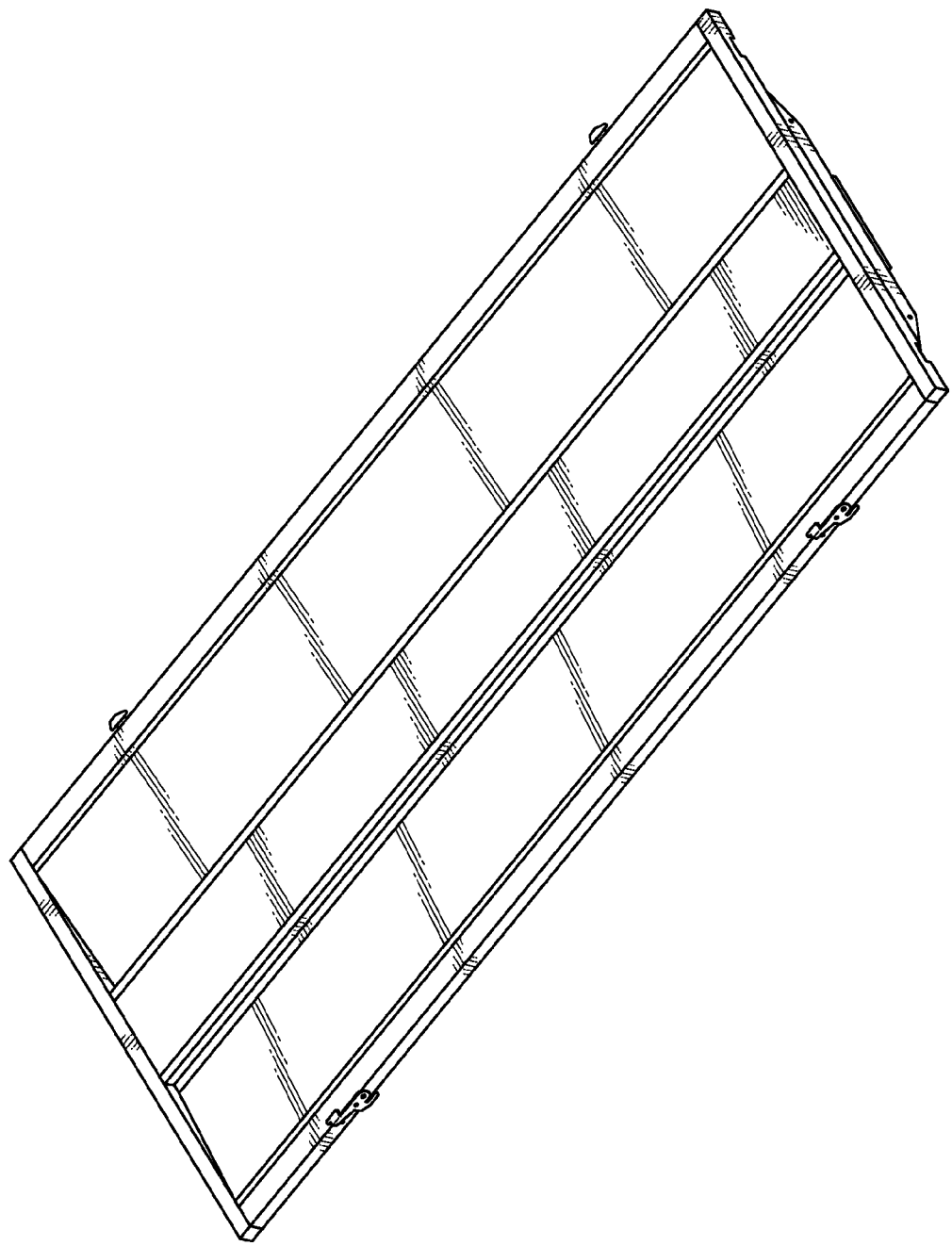
FIG. 14A is a bottom, rear, left perspective view of a door assembly having three lenses according to an exemplary embodiment.
Figure 14B:
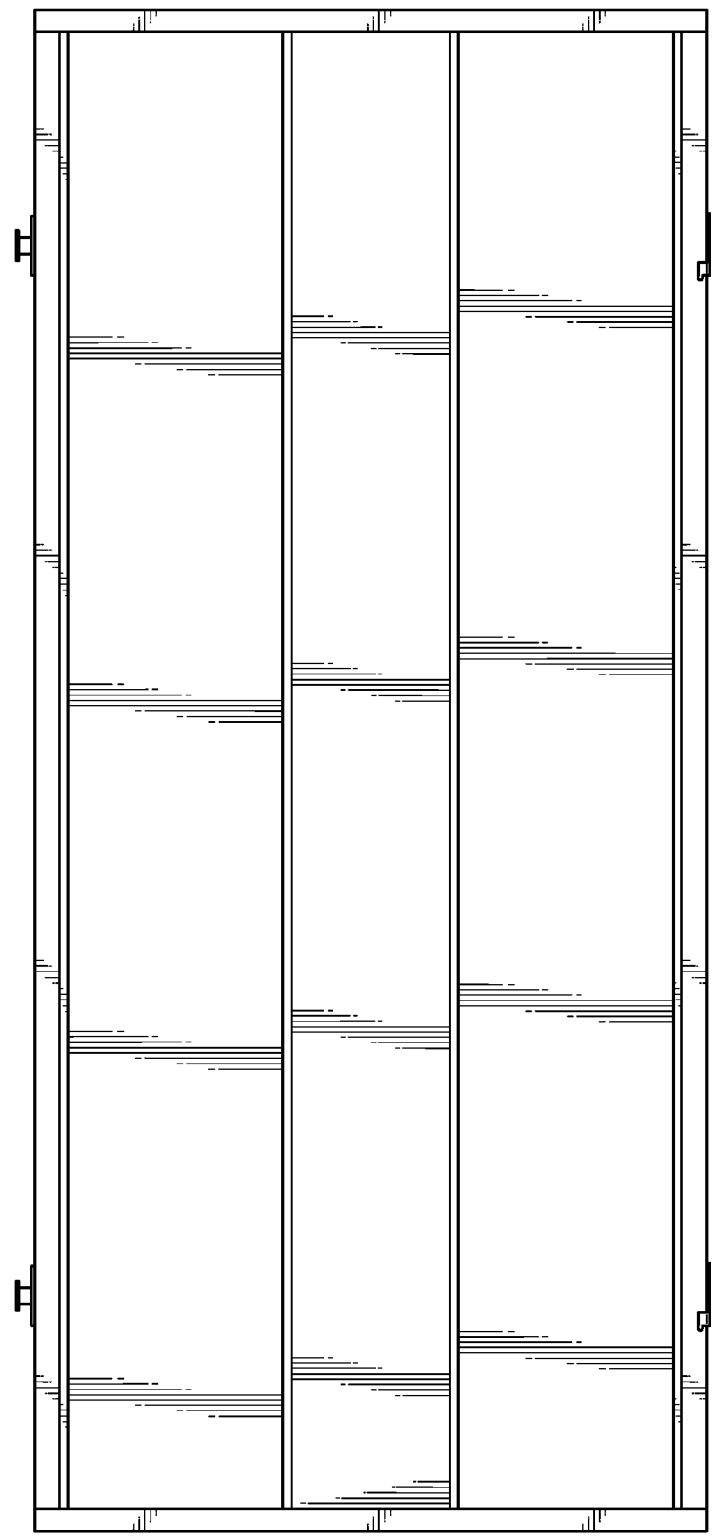
FIG. 14B is a bottom plan view of a door assembly having three lenses according to an exemplary embodiment.
Figure 14C:
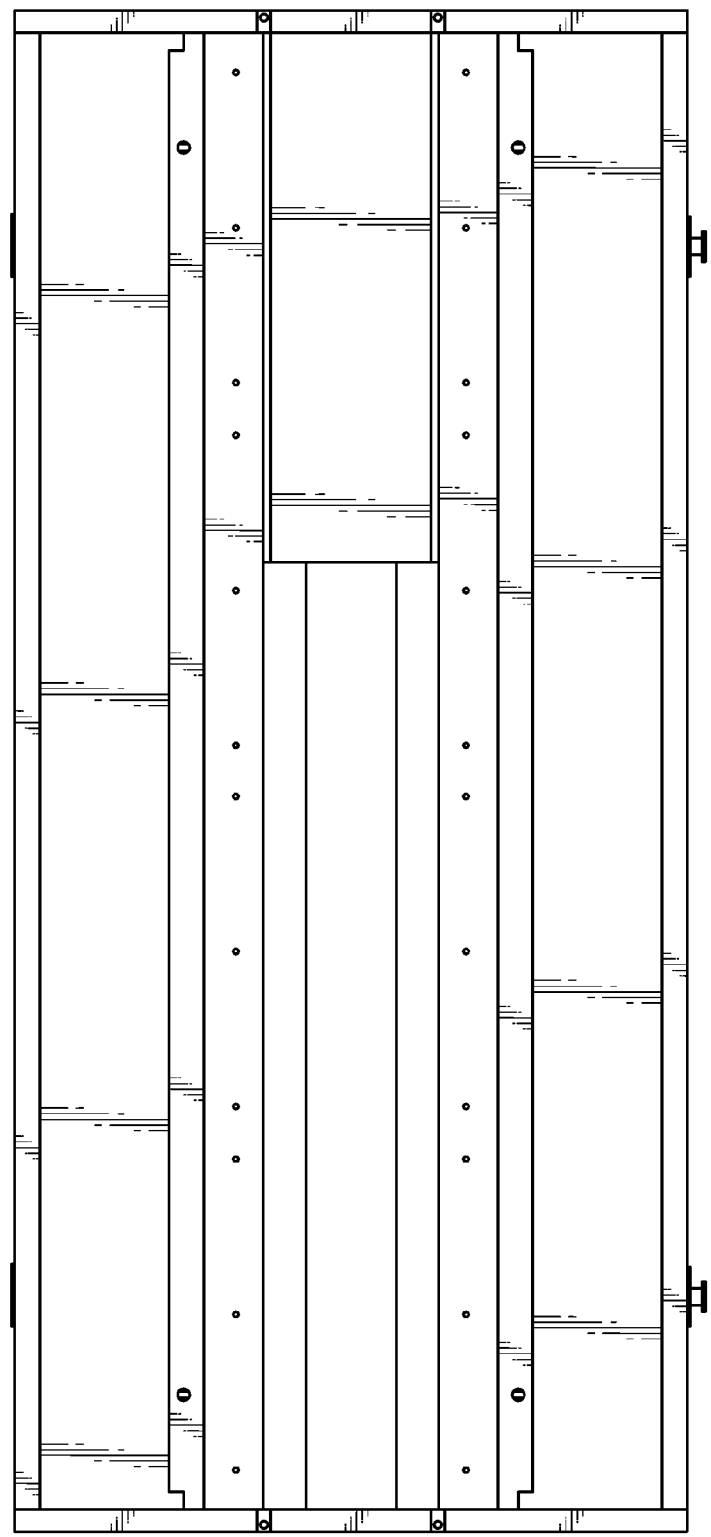
FIG. 14C is a top plan view of a door assembly having three lenses according to an exemplary embodiment.
Figure 14D:
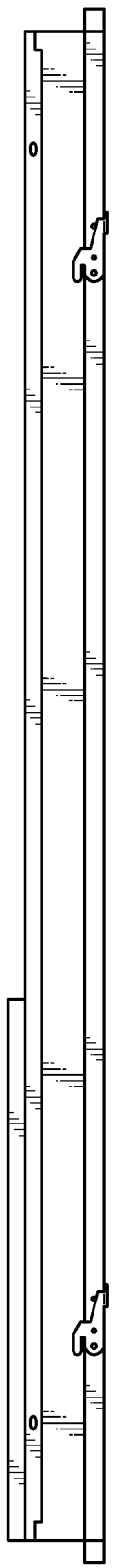
FIG. 14D is a left elevation view of a door assembly having three lenses according to an exemplary embodiment.
Figure 14E:
FIG. 14E is a right elevation view of a door assembly having three lenses according to an exemplary embodiment.
Figure 14F:
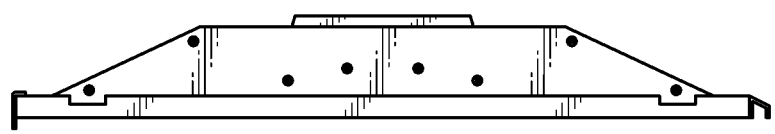
FIG. 14F is a front elevation view of a door assembly having three lenses according to an exemplary embodiment.
Figure 14G:
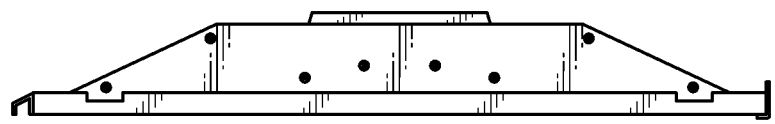
FIG. 14G is a rear elevation view of a door assembly having three lenses according to an exemplary embodiment.

Referring now to FIG. 11, components of door assembly electronics 1101 are illustrated according to one embodiment. Door assembly 101 can include a various door assembly electronics 1101 in various embodiments. In various embodiments, door assembly electronics 1101 are located within cover 313, electronics housing 413 and electronics cover 415, or cover 515. In further embodiments, one or more components or portions thereof can be located partially or completely outside of a cover or housing. Door assembly electronics 1101 can control light output of LEDs included in door assembly 101, provide power to LEDs in door assembly 101, and/or perform other functions.

In some embodiments, door assembly electronics 1101 include a power supply 1111. Power supply 1111 can be one or more electrical supply wires which enter cover 313, electronics housing 413 and electronics cover 415, or cover 515. Power supply 1111 can include further components such as capacitors, modulators, transformers, batteries, and/or other components to regulate, alter, modify, or otherwise provide electrical power to door assembly electronics 1101 and/or LEDs in door assembly 101.

In some embodiments, door assembly electronics 1101 include driver 1109. Driver 1109 can be a driver for driving or otherwise providing power to LEDs within door assembly 101. Driver 1109 may be electrically coupled to one or more LEDs, LED strips, and/or other LEDs through wiring. The wiring may exit cover 313, electronics housing 413 and electronics cover 415, or cover 515. Driver 1109 can control electrical power supplied to the LEDs using techniques such as pulse width modulation and/or other techniques. Driver 1109, by controlling the supply of electrical power to the LEDs, can control the light output of the LEDs. Driver 1109 can control the intensity of the light output from the LEDs, control the color temperature of light output by the LEDs, dim the LEDs, turn on or off the LEDs, and/or otherwise alter or control the light output from the LEDs. Driver 1109 can be coupled to control circuit 1103. Driver 1109 can be controlled by control circuit 1103.

In some embodiments, door assembly electronics 1101 include control circuit 1103. Control circuit 1103 may contain circuitry, hardware, and/or software for facilitating and/or performing the functions described herein. The control circuit 1103 may handle inputs, process inputs, run programs, handle instructions, route information, control memory 1107, control a processor 1105, process data, generate outputs, communicate with other devices or hardware, and/or otherwise perform general or specific computing tasks. In some embodiments, the control circuit 233 includes a processor 1105 and/or memory 1107. Control circuit 1103 can perform functions such as controlling driver 1109 in response to inputs, receive inputs from transceiver 113, receive inputs locally (e.g., through a user interface, buttons, switches, etc.), receive inputs from sensor circuitry 1115, control sensor circuitry 1115, control transceiver 1113 (e.g., send or receive communications using transceiver 1113), and/or perform other functions related to door assembly 101 and/or other light fixtures or devices.

Processor 1105 may be implemented as a general-purpose processor, an application specific integrated circuit (ASIC), one or more field programmable gate arrays (FPGAs), a digital-signal-processor (DSP), a group of processing components, or other suitable electronic processing components. Memory 1107 is one or more devices (e.g. RAM, ROM, Flash Memory, hard disk storage, etc.) for storing data and/or computer code for facilitating the various processes described herein. Memory 1107 may be or include non-transient volatile memory or non-volatile memory. Memory 1107 may include database components, object code components, script components, or any other type of information structure for supporting various activities and information structures described herein. Memory 1107 may be communicably connected to processor 1105 and provide computer code or instructions to processor 1105 for executing the processes described herein. Memory 1107 and/or the control circuit 1103 may facilitate the functions described herein using one or more programming techniques, data manipulation techniques, and/or processing techniques such as using algorithms, routines, lookup tables, arrays, searching, databases, comparisons, instructions, etc.

In some embodiments, door assembly electronics 1101 include transceiver 1113. Transceiver 1113 may be a wireless transceiver used to send and/or receive wireless communications. For example, transceiver 1113 may be a transceiver which sends and/or receives radio frequency transmissions using protocols and/or hardware related to WiFi, Zigbee, Bluetooth, or other types of communication. In other embodiments, transceiver 1113 uses communication techniques other than the use of radio frequency transmissions. For example, transceiver 1113 may use ultrasound, optical, infrared, and/or other communications techniques. Transceiver 1113 can provide control signals to control circuit 1103. In response to control signals (e.g., sent from a control device such as a mobile phone, computer, remote, or other device), control circuit 1103 can control the light output of door assembly 101 using driver 1109. For example, control circuit 1103 can adjust the light intensity, color temperature, turn on or off LEDs, or otherwise change the light output of door assembly 101 using driver 1109.

In some embodiments, control circuit 1103 can control transceiver 1113 in order to transmit communication signals. Control circuit 1103 can transmit information, using transceiver 1113, related to the functions of door assembly 101, the light output of door assembly 101, and/or sensor information received by sensor circuitry 1115. For example, control circuit 1103 can cause the transition of information, using transceiver 1113, including diagnostic information, whether door assembly 101 is currently on or off, the light intensity being produced by door assembly 101, whether motion has been detected by sensor circuitry 1115, and/or other information. In some embodiments, transceiver 1113 transmits this and/or other information to mobile phones, computers, remotes, and/or other devices. In further embodiments, transceiver 1113 transmits this information to one or more other door assemblies 101.

In some embodiments, door assembly 1101 includes sensor circuitry 1115. Sensor circuitry 1115 can be controlled by control circuit 1103. Sensor circuitry 1115 can also provide sensor information and/or control signals to control circuit 1103. Sensor circuitry may include one or more logic modules 1117, memory 1119, and/or sensors 1121. Sensor circuitry can use these and/or other components to provide door assembly electronics 1101 information regarding the environment in which door assembly 101 operates. For example, sensor circuitry 1115 can detect motion with a motion sensor. In response to detecting motion (e.g., using a motion sensor 1121 and processing the data using memory 1119 and/or logic module 1117), sensor circuitry 1115 can provide the information and/or a control signal to control circuit 1103 which causes control circuit 1103 to take action (e.g., turning on one or more LEDs, adjusting the intensity and/or color temperature of the light output, etc.). As an additional example, sensor circuitry 1115 can determine the intensity or amount of light surrounding door assembly 101. In response to determining the amount or intensity of light (e.g., using a light sensors 1121, memory 1119, a threshold value and/or logic module 1117), sensor circuitry 1115 can provide the information and/or a control signal to control circuit 1103 which causes control circuit 1103 to take action (e.g., adjust the light output using driver 1109 to compensate for low light by increasing the light output, decrease the light output in response to high levels of ambient light, etc.).

Sensor circuitry 1115 may contain circuitry, hardware, and/or software for facilitating and/or performing the functions described herein. Sensor circuitry 1115 may handle inputs, process inputs, run programs, handle instructions, route information, control memory 1119, control or use a logic module 1117, process data, generate outputs, communicate with other devices or hardware, and/or otherwise perform general or specific computing tasks. Sensor circuitry 1115 can be or include an application specific integrated circuit (ASIC), one or more field programmable gate arrays (FPGAs), a digital-signal-processor (DSP), a group of processing components, or other suitable electronic processing components. Memory 1119 is one or more devices (e.g. RAM, ROM, Flash Memory, hard disk storage, etc.) for storing data and/or computer code for facilitating the various processes described herein. Memory 1119 may be or include non-transient volatile memory or non-volatile memory. Memory 1119 may include database components, object code components, script components, or any other type of information structure for supporting various activities and information structures described herein. Memory 1119 may provide computer code or instructions for executing the processes described herein. Memory 1119 and/or the sensor circuitry 1115 may facilitate the functions described herein using one or more programming techniques, data manipulation techniques, and/or processing techniques such as using algorithms, routines, lookup tables, arrays, searching, databases, comparisons, instructions, etc.

Logic module 1117 may be implemented as hardware and/or software. Logic module 1117 may be stored in or use memory 1119. Logic module 1117 can provide code or instructions for carrying out or facilitating the functions of sensor circuitry 1115 described herein. Alternatively, logic module can carry out these functions directly. Logic module 1117 can be used to perform tasks such as comparing sensor data to threshold values, determining if movement has occurred using a variety of techniques, measuring ambient light, comparing ambient light measurements to threshold values, formatting control signals for control circuit 1103, and/or perform other tasks or functions to facilitate the operation of door assembly 101 as described herein.

In some embodiments, sensor circuitry 1115 includes one or more sensors 1121. Sensors 1121 can be any type of sensor. In one embodiment, sensor 1121 is or includes a motion sensor. For example, sensor 1121 may be or include an infrared motion sensor, ultrasound motion sensor, projected capacitance motion sensor, and/or other type of motion sensor. In other embodiments, sensor 1121 can be or include a light sensor. For example, sensor 1121 may be or include a photodetector, bolometer, photoresister, or other light sensor. In still further embodiments, sensor 1121 can be or include other types of sensors such as temperature sensors, humidity sensors, and/or other sensors. Sensor 1121 may be located partially or wholly outside of cover 313, electronics housing 413 and electronics cover 415, or cover 515.

Referring now to FIGS. 12A-12G, door assembly 101 is illustrated according to one embodiment in which door assembly 101 includes a single lens. A bottom, rear, left perspective view, bottom plan view, top plan view, left elevation view, right elevation view, front elevation view, and rear elevation view are illustrated by FIGS. 12A-12G respectively. The single lens can provide light output from door assembly 101 having specific characteristics as previously described herein. In some embodiments, the single lens further provides an aesthetically pleasing design. Various embodiments have single lenses of varying configurations, shapes, and/or other characteristics.

Referring now to FIGS. 13A-13G, door assembly 101 is illustrated according to one embodiment in which door assembly 101 includes a contour lens. A bottom, rear, left perspective view, bottom plan view, top plan view, left elevation view, right elevation view, front elevation view, and rear elevation view are illustrated by FIGS. 13A-13G respectively. The contour lens can provide light output from door assembly 101 having specific characteristics as previously described herein. In some embodiments, the contour lens further provides an aesthetically pleasing design. Various embodiments have contour lenses of varying configurations, shapes, and/or other characteristics.

Referring now to FIGS. 14A-14G, door assembly 101 is illustrated according to one embodiment in which door assembly 101 includes a three lenses. A bottom, rear, left perspective view, bottom plan view, top plan view, left elevation view, right elevation view, front elevation view, and rear elevation view are illustrated by FIGS. 14A-14G respectively. The three lenses can provide light output from door assembly 101 having specific characteristics as previously described herein. In some embodiments, the three lenses further provides an aesthetically pleasing design. Various embodiments have three lenses of varying configurations, shapes, and/or other characteristics.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A retrofitting kit for retrofitting an existing troffer light fixture having a troffer housing, comprising:
an adaptor bracket including:
a channel configured to rest on a T-bar of a ceiling system, and further configured to be located between the T-bar and the troffer housing, the channel including (a) horizontal portion extending along the length of the adapter bracket, (b) a first vertical portion coupled to a first side of the horizontal portion, and (c) a second vertical portion coupled to an opposing second side of the horizontal portion, wherein the channel defines an open slot configured to receive and retain a portion of the troffer housing between the first vertical portion and the second vertical portion thereby facilitating a retrofit installation;
a slot configured to receive a portion of a troffer door assembly; and
a latch surface configured to engage with a latch, and
a door assembly including:
a latch configured to engage the latch surface of the adaptor bracket;
a hinge configured to interface with the slot of the adaptor bracket;
a housing including the latch and the hinge; and
a light source within the housing.

2. The system of claim 1, wherein the slot is configured to accept either the hinge or the latch of the troffer door assembly.

3. The system of claim 2, wherein the adaptor bracket includes two slots equally spaced from the end of the adaptor bracket.

4. The system of claim 3, further comprising a second adaptor bracket, wherein the adaptor bracket and the second adaptor bracket are configured to be placed on separate T-bars on opposite sides of the troffer housing, and wherein the slots of either of the adaptor bracket and the second adaptor bracket receive the hinges of the troffer door assembly and the slots of the other adaptor bracket receive the latches of the door assembly.

5. The system of claim 1, wherein the second vertical portion defines a lip configured to prevent the adaptor bracket from moving horizontally in relation to the T-bar, and wherein the lip is in contact with the troffer housing.

6. The system of claim 1, wherein the adaptor bracket includes a hook portion which engages a vertical portion of the T-bar.

7. The system of claim 1, wherein the lighting source includes at least one light emitting diode.

8. The system of claim 1, wherein door assembly includes at least one of a plate lens and a curved lens.

9. The system of claim 1, wherein the door assembly further comprises a center lens, a first side lens, and a second side lens.

10. An adaptor bracket for retrofitting an existing troffer light fixture, comprising:
- a channel configured to rest on a T-bar of a ceiling system, and further configured to be located between the T-bar and a troffer housing of the existing troffer light fixture, the channel including (a) a horizontal portion extending along the length of the adapter bracket, (b) a first vertical portion coupled to a first side of the horizontal portion, and (c) a second vertical portion coupled to an opposing second side of the horizontal portion, wherein the channel defines an open slot configured to receive and retain a portion of the troffer housing between the first vertical portion and the second vertical portion thereby facilitating a retrofit installation;
- a slot configured to receive a portion of a troffer door assembly; and
- a latch surface configured to engage with a latch of the troffer door assembly.

11. The system of claim 10, wherein the slot is configured to accept either the hinge or the latch of the troffer door assembly.

12. The system of claim 11, wherein the adaptor bracket includes two slots equally spaced from the end of the adaptor bracket.

13. The system of claim 12, further comprising a second adaptor bracket, wherein the adaptor bracket and the second adaptor bracket are configured to be placed on separate T-bars on opposite sides of the troffer housing, and wherein the slots of either of the adaptor bracket and the second adaptor bracket receive the hinges of the troffer door assembly and the slots of the other adaptor bracket receive the latches of the door assembly.

14. The system of claim 10, wherein the second vertical portion defines a lip configured to prevent the adaptor bracket from moving horizontally in relation to the T-bar, and wherein the lip is in contact with the troffer housing.

15. The system of claim 10, wherein the adaptor bracket includes a hook portion which engages a vertical portion of the T-bar.

16. The system of claim 10, wherein the adaptor bracket includes a tab.

17. A method for retrofitting an existing troffer light fixture having a troffer housing using a door assembly, comprising:
- installing an adaptor bracket between the troffer housing of the existing troffer light fixture and a T-bar of a ceiling system, the adapter bracket having a channel that includes (a) a horizontal portion extending along the length of the adapter bracket, (b) a first vertical portion coupled to a first side of the horizontal portion, and (c) a second vertical portion coupled to an opposing second side of the horizontal portion, wherein installing the adapter bracket includes inserting a portion of the troffer housing of the existing light fixture into the channel such that the troffer housing is received and retained between the first vertical portion and the second vertical portion;
- removing a door of the existing troffer light fixture;
- hanging the door assembly from the adaptor bracket;
- disconnecting the wiring from a power source to the existing troffer light fixture;
- wiring the door assembly to the wiring from the power source;
- closing the door assembly; and
- latching the door assembly.

18. The method of claim 17, further comprising disconnecting power to the existing troffer light fixture.

19. The method of claim 17, further comprising:
- removing one or more components of the existing troffer light fixture in response to determining that there is in sufficient clearance for the door assembly.

20. The method of claim 17, wherein no tools are used.

* * * * *